United States Patent
Navas et al.

(10) Patent No.: US 12,444,027 B2
(45) Date of Patent: Oct. 14, 2025

(54) PROCESSES TO CREATE A DOCU-NARRATIVE, INCLUDING EVIDENTIARY QUALITY IMAGES AND EVIDENTIARY OBJECTS WITHIN THE IMAGES, AND AN IMAGE CHAIN OF CUSTODY, WITH MULTI-LEVEL AUTHENTICATION AND CERTIFICATION

(71) Applicant: EarthCam Inc., Upper Saddle River, NJ (US)

(72) Inventors: Juan Navas, Fair Lawn, NJ (US); Brian Cury, Alpine, NJ (US)

(73) Assignee: EarthCam Inc., Upper Saddle River, NJ (US)

( * ) Notice: Subject to any disclaimer, the term of this patent is extended or adjusted under 35 U.S.C. 154(b) by 361 days.

(21) Appl. No.: 18/199,949

(22) Filed: May 20, 2023

(65) Prior Publication Data
US 2024/0386530 A1 Nov. 21, 2024

(51) Int. Cl.
G06T 5/70 (2024.01)
G06T 5/50 (2006.01)
G06T 5/77 (2024.01)

(52) U.S. Cl.
CPC .................. G06T 5/70 (2024.01); G06T 5/50 (2013.01); G06T 5/77 (2024.01)

(58) Field of Classification Search
CPC .... G06T 5/70; G06T 5/50; G06T 5/77; G06T 5/20; G06T 2207/10016; G06T 2207/10032; G06T 2207/30232; G06T 2207/30236; G06T 2207/30181; G06T 2207/30108; G06T 2207/30112; G06T 2207/30196; G06T 2207/30201; G06T 2207/30212; G06T 2207/30221; G06T 2207/30242; G06T 2207/30248; G06T 3/4046; G06T 5/60; G06T 9/002;
(Continued)

(56) References Cited

U.S. PATENT DOCUMENTS 6,947,866 B2  9/2005  Staab
6,948,070 B1  9/2005  Ginter et al.
(Continued)

FOREIGN PATENT DOCUMENTS

KR  20210083148 A * 7/2021 ........... G06V 30/413
WO  WO-2020021228 A1 * 1/2020 ........... H04L 9/3239

*Primary Examiner* — Jose L Couso
(74) *Attorney, Agent, or Firm* — John L. DeAngelis; Wolter Van Dyke; Davis, Pllc

(57) ABSTRACT

A method for producing a visual record, referred to as a docu-narrative, of events at a location. The record comprises still and video images that are acquired by appropriately configured hardware. A benchmark focus and resolution are determined for an image acquisition device. Changes to the images are tightly controlled and authenticated, certified, and/or verified such that the docu-narrative includes all versions of the images and provides a chain-of-custody record. Image quality and image accuracy are significant attributes of the visual record, where accuracy is determined based on differences between an image of an object and a ground truth object within the image. Image characteristics can also be altered so that each image appears consistent with a previous and a next image; all such alterations are recorded. A target model detection spec is used to detect specific objects within an image.

36 Claims, 37 Drawing Sheets

(58) Field of Classification Search
CPC . G06T 2207/20076; G06T 2207/20081; G06T 2207/20084; G06F 21/6209; G06F 21/30; G06F 21/64; G06F 2221/2101; G06F 2221/2115; G06F 2221/2135; G06F 2221/2151; G06F 18/214; G06F 18/22; G06F 18/241; G06F 18/24; G06F 18/2411; G06F 18/2415; G06F 30/27; G06V 10/993; G06V 10/778; G06V 20/52; G06V 2201/07; G06V 20/10; G06V 20/13; G06V 20/17; G06V 20/53; G06V 20/54; G06V 20/56; G06V 20/58; G06V 20/59; G06V 20/69; G06V 10/454; G06V 10/54; G06V 10/774; G06V 10/82; G06V 20/41; G06V 30/18057; G06V 20/698; G06V 30/19173; G06Q 10/10; G06Q 50/18; G06Q 10/06; G06Q 40/08; G06Q 50/10; G07C 5/085; G07C 5/0891; G07F 9/026; G08G 1/20; G08G 1/091; G08G 1/205; G08G 5/26; G16H 10/60; H04N 7/18; H04N 7/181; H04N 7/183; H04N 7/185; H04N 7/188; H04N 21/2347; H04N 21/2541; H04N 21/25875; H04N 21/4405; H04N 21/4627; H04N 21/835; H04N 7/17309; H04N 23/66; H04N 23/661; H04L 2209/60; H04L 2263/101; H04L 63/08; H04L 63/20; H04L 9/32; H04M 3/5116; H04W 4/90; G09B 5/065; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06K 7/1482; Y10S 128/925

See application file for complete search history.

(56) References Cited

U.S. PATENT DOCUMENTS

| | | | |
|---|---|---|---|
| 7,051,212 B2 | 5/2006 | Grinter et al. | |
| 7,069,451 B1 | 6/2006 | Grinter et al. | |
| 7,095,854 B1 | 8/2006 | Grinter et al. | |
| 7,108,662 B2 | 9/2006 | Miller et al. | |
| 7,124,302 B2 | 10/2006 | Grinter et al. | |
| 7,133,845 B1 | 11/2006 | Grinter et al. | |
| 7,236,596 B2 * | 6/2007 | Prokoski | H04L 9/3297 380/258 |
| 7,246,104 B2 | 7/2007 | Stickler | |
| 7,703,000 B2 | 4/2010 | Barrie et al. | |
| 7,792,791 B2 | 9/2010 | Smolen et al. | |
| 7,811,825 B2 | 10/2010 | Fauver et al. | |
| 7,995,940 B2 | 8/2011 | Hosier et al. | |
| 8,213,713 B2 | 7/2012 | Adachi et al. | |
| 8,526,766 B2 | 9/2013 | Poor | |
| 8,935,714 B2 | 1/2015 | Frazier et al. | |
| 9,285,858 B2 | 3/2016 | Klassen et al. | |
| 9,412,176 B2 | 8/2016 | Song et al. | |
| 9,584,701 B2 | 2/2017 | Kelly | |
| 9,607,411 B2 | 3/2017 | Ouzts et al. | |
| 9,697,233 B2 | 7/2017 | Di et al. | |
| 9,749,526 B2 * | 8/2017 | Chuang | H04N 23/698 |
| 9,852,393 B2 | 12/2017 | Walden | |
| 10,069,694 B1 | 9/2018 | Schwartz et al. | |
| 10,101,884 B2 | 10/2018 | Dipin | |
| 10,110,937 B2 | 10/2018 | Gilbert et al. | |
| 10,303,985 B2 | 5/2019 | Ozaki et al. | |
| 10,325,511 B2 | 6/2019 | Clar et al. | |
| 10,419,790 B2 | 9/2019 | Gersten | |
| 10,521,847 B2 | 12/2019 | Gardyne et al. | |
| 10,579,897 B2 | 3/2020 | Redmon et al. | |
| 10,691,193 B2 | 6/2020 | Wu | |
| 10,700,946 B2 | 6/2020 | Kojukhov et al. | |
| 10,872,412 B2 | 12/2020 | Wang | |
| 10,997,746 B2 | 5/2021 | He et al. | |
| 11,184,303 B2 | 11/2021 | Deac | |
| 11,297,500 B2 | 4/2022 | Jain | |
| 11,350,015 B2 | 5/2022 | Kelly | |
| 11,429,818 B2 | 8/2022 | Yang et al. | |
| 11,508,383 B2 | 11/2022 | Kim et al. | |
| 11,521,072 B2 | 12/2022 | Revaud et al. | |
| 11,592,289 B2 | 2/2023 | Boarino et al. | |
| 11,627,356 B2 | 4/2023 | Orlowski | |
| 11,646,896 B1 | 5/2023 | Crosby et al. | |
| 11,720,790 B2 | 8/2023 | Cho et al. | |
| 11,823,438 B2 | 11/2023 | Cheng et al. | |
| 2011/0286584 A1 * | 11/2011 | Angel | H04M 3/42221 379/88.02 |
| 2012/0169842 A1 * | 7/2012 | Chuang | H04N 7/181 348/E7.001 |
| 2014/0058730 A1 * | 2/2014 | Costa | H04W 4/90 704/235 |
| 2019/0319948 A1 * | 10/2019 | Triola | H04L 9/3247 |
| 2020/0014528 A1 * | 1/2020 | Nandakumar | H04L 63/123 |
| 2020/0043229 A1 * | 2/2020 | Jin | G08G 5/74 |
| 2020/0159891 A1 * | 5/2020 | Patel | G06F 21/16 |
| 2020/0336907 A1 * | 10/2020 | Jain | H04L 9/3236 |
| 2020/0409383 A1 * | 12/2020 | Maunder | G06V 20/52 |
| 2023/0094544 A1 * | 3/2023 | Paripally | G06F 21/64 713/168 |

* cited by examiner

Fig. 6A

Client Request Form (123)

| Client Information | |
|---|---|
| Client Name | |
| Client contact name | |
| Client contact title | |
| Client contact telephone | |
| Client contact email | |
| Client Address | |
| Client billing PO | |
| Client billing address | |
| Client AP contact name | |
| Client AP contact telephone | |
| Client AP contact email | |
| Client Credit Status | |
| Client Location | |
| Client Project Start Date | |

| Client Location Information | |
|---|---|
| Location start date | |
| Location description | |
| Location address | |
| Location Hardware | |
| Camera location | |
| Camera Identification | |

| Docu-Narrative Request Date | | | |
|---|---|---|---|
| Docu-Narrative start date | | Operator ID | |
| Docu-Narrative end date | | Operator ID | |

| Docu-Narrative Length of Time | | | |
|---|---|---|---|
| Docu-Narrative length of time request | | Operator ID | |
| Docu-Narrative length of time actual | | Operator ID | |

Fig. 6B

| EC-F Docu-Narrative Standards | | | | | |
|---|---|---|---|---|---|
| N Batch Images Tensor | | Operator ID | | | |
| Color Channels Tensor | | Operator ID | | | |
| High, Width Tensor | | Operator ID | | | |

| Rubric | Rubric ID# | Score | Operator ID |
|---|---|---|---|
| Docu-Vault Performance Test score rubric | 103 | | |
| Docu-Vault Security Assessment Score rubric | 105 | | |
| Hardware Test Case Score rubric | 211 | | |
| Hardware test case for use on a Docu-Vault | 213 | | |
| Apply a hardware test case to a Docu-Vault | 215 | | |
| Determine width and height of an images for use with EC-F | 305 | | |
| Select images for input into EC-F | 401 | | |
| Determine if another Epoch is required in EC-F | 421 | | |
| Determine if the average precision is adequate in EC-F | 513 | | |
| Create criteria for augmenting images | 601 | | |
| Augmentation Complete | 629 | | |
| Create criteria for batch size normalization | 701 | | |
| The normalized test batch runtime is adequate | 707 | | |
| Residual layers and accuracy score | 803 | | |
| Acceptable Throughput Rate | 903 | | |
| Create criteria for using filters in EC-OD | 1003 | | |
| Determine filter performance on an image | 1007 | | |
| Determine the resolution of the images | 1103 | | |
| Determine speed of inference of the images | 1105 | | |
| Determine the accuracy of the images | 1107 | | |
| Criteria to compare GPU with image resolution + (speed of inference vs accuracy) of the images | 1109 | | |
| parent and child images are appropriate to be uploaded to the Weights and Biases Docu-Vault | 1201 | | |
| the Weights and Biases characteristics of the images in the parent and child records are an acceptable representation of the image weights and bias which must be detected and meet the Weights and Biases Criteria | 1203 | | |
| the accurate representation of the images required for the Docu-Narrative. | 1205 | | |
| if the Weights and Biases Sample Size is large enough to provide an accurate representation of the total population of images for the Client Location in the Augmented Images Docu-Vault. | 1205 | | |
| Determine if the average precision is adequate in EC-OD | 1307 | | |

Fig. 6C

| Image Chain of Custody Log | | | |
|---|---|---|---|
| *Image Chain of Custody Log Checkpoint* | *Process #* | *Operator ID* | *Date/Time* |
| Selected Docu-Vault Candidates have been selected and the selection process is completed. | 101 | | |
| Docu-Vault Performance Tests on the Selected Docu-Vault Candidates have been completed. | 103 | | |
| Docu-Vault Security Assessment Score on the Selected Docu-Vault Candidates have been completed. | 105 | | |
| Libraires in the Accepted EC-F Docu-Vaults have been input to EC-F. | 115 | | |
| Hardware Specifications for the hardware associated with the Client project have been input to the Hardware Specifications Docu-Vault. | 201 | | |
| Hardware Characteristics, for the hardware associated with the Client project, have been input to the Hardware Characteristics Docu-Vault. | 207 | | |
| Hardware Test Case Form was uploaded to the Hardware Settings Docu-Vault. | 211 | | |
| A test run priority number assigned to the Hardware Test Case Forms to indicate the sequence in which the Hardware Test Cases will be used with a Docu-Vault. | 213 | | |
| The Hardware Test Case and Identification Number used for the Hardware Settings for EC-F. | 215 | | |
| The Hardware Settings Form was uploaded to the Hardware Settings Docu-Vault. | 217 | | |
| The hardware settings from the Hardware Settings Form were entered into the EC-F hardware settings form | 221 | | |
| The 'N' Tensor value for the EC-F tensor settings. | 301 | | |
| The number of color channels were entered into the EC-F Tensor settings form. | 303 | | |
| The number of pixels were entered into height and width values in the EC-F Tensor settings form. | 305 | | |
| The acceptable images were copied to the Images for Input to EC-F Docu-Vault. | 401 | | |
| The NOT acceptable images were copied to the Images NOT Input to EC-F Docu-Vault. | 403 | | |

Fig. 6D

| | | | |
|---|---|---|---|
| The NOT acceptable images were input to EC-F for image detection. | 407 | | |
| The Ground Truth Images were uploaded to the Ground Truth Images Docu-Vault. | 415 | | |
| The Ground Truth Images were compared to the Detection Images and the appropriate EC-F training procedure was applied to the image. | 413 | | |
| Another EC-F Epoch was initiated | 421 | | |
| The EC-F Epoch was stopped. | 421 | | |
| The prediction score from EC-F. | 501 | | |
| The EC-F prediction scores be converted to EC-F Class Labels. | 503 | | |
| The confusion matrix for the TN, FN, TP, FP values. | 505 | | |
| The precision and recall metrics were calculated. | 507 | | |
| The area under the precision-recall curve was calculated. | 509 | | |
| The average precision score is not adequate, and EC-F another Epoch was initiated. | 513 | | |
| The average precision score is adequate, and EC-F the Epoch was stopped. | 513 | | |
| The augmentation criteria and rubric were uploaded to the Augmentation Criteria Docu-Vault. | 600 | | |
| The Detection Images and Augmentation Criteria were copied to the Augmented Images Docu-Vault. | 605 | | |
| The blurred image of the target image was created, and the blurred image was uploaded to the Augmented Images Docu-Vault. | 607 | | |
| The blurred image was associated with the Target Image in the Augmented Images Docu-Vault (623). | 609 | | |
| The image with noise of the target image was created, and the image with noise was uploaded to the Augmented Images Docu-Vault. | 611 | | |
| When the image with contrast was associated with the Target Image in the Augmented Images Docu-Vault (623). | 613 | | |
| When an image with a change in contrast of the target image was created, and the image with a change in contrast was uploaded to the Augmented Images Docu-Vault. | 615 | | |
| When the image with the change in contrast was associated with the Target Image in the Augmented Images Docu-Vault (623) | 617 | | |
| When an image with a change in saturation of the target image was created, and the image with a change in saturation was uploaded to the Augmented Images Docu-Vault. | 619 | | |

Fig. 6E

| | | | |
|---|---|---|---|
| When the image with the change in saturation was associated with the Target Image in the Augmented Images Docu-Vault (623). | 621 | | |
| When an image with a flip of the target image was created, and the image with a change in contract was uploaded to the Augmented Images Docu-Vault. | 625 | | |
| When the image with a flip was associated with the Target Image in the Augmented Images Docu-Vault (623). | 627 | | |
| When the mirror image of the target image was created, and the mirror image was uploaded to the Augmented Images Docu-Vault. | 631 | | |
| When the normalization criteria were uploaded to the Normalization Criteria Docu-Vault. | 701 | | |
| When the parent and child records were uploaded to the Normalized Test Batch Docu-Vault. | 703 | | |
| When the parent and child records were restructured and indexed to meet the Normalization Criteria and were uploaded to the Normalized Test Batch Docu-Vault. | 705 | | |
| When amount of time to run the parent and child records from the Normalized Test Batch Docu-Vault (713) in EC-IC is adequate and meets the Normalization Criteria the operator stops the batch size normalization process. | 707 | | |
| When the Residual Layers Accuracy Score is adequate, in the Residual Layers Accuracy Docu-Vault (713). | 801 | | |
| When the parent and child record images meet the requirements of the Residual Layers Criteria for the parent and child records associated with the Client location, the operator begins the process or optimizing images for EC-OD. | 803 | | |
| When the EC-OD Specifications were uploaded to the EC-OD Specifications Docu-Vault (907) for the Client Location. | 901 | | |
| When the EC-OD Setup Acceptance Criteria Score for the acceptable throughput rate, and image accuracy and image performance was uploaded to the EC-OD Setup Acceptance Criteria Docu-Vault (909). | 905 | | |
| When the Filter and Filter Specifications record was uploaded to the EC-OD Filters Docu-Vault (1101). | 1001 | | |
| When the EC-OD Filter Criteria Record was uploaded to the EC-OD Docu-Vault (1009). | 1003 | | |
| When parent and child image records with the selected EC-OD Filter were uploaded to the Augmented Images Docu-Vault (623). | 1005 | | |
| When the operator exits process 1000 and initiates process 1100. | 1007 | | |
| When the Graphic Processing Unit Specifications are uploaded to the GPU Specifications Docu-Vault (1113) | 1101 | | |

Fig. 6F

| | | | |
|---|---|---|---|
| When the Graphic Processing Unit Characteristics are uploaded to the GPU Characteristics Docu-Vault (1115) | 1101 | | |
| When the GPU Image Resolution Score for the parent and child records are uploaded to the Augmented Records Docu-Vault (623). | 1103 | | |
| When GPU Image Inference Score for the parent and child records are uploaded to the Augmented Records Docu-Vault (623). | 1105 | | |
| When parent and child image GPU Image Accuracy Score to the parent and child records from the Augmented Records Docu-Vault (623). | 1107 | | |
| When the parent and child image GPU Characteristic Criteria Score is uploaded to the parent and child records in the Augmented Records Docu-Vault (623) | 1109 | | |
| When the operator exits process 1100 and initiates process 1200. | 1111 | | |
| When the parent and child records are uploaded to the Weights and Biases Docu-Vault (1207). | 1201 | | |
| When an operator exits process 1203. | 1203 | | |
| When an operator exits process 1200. | 1205 | | |
| When the precision and recall metrics were calculated for EC-OD. | 1301 | | |
| When the average precision is calculated for EC-OD. | 1305 | | |
| When the average precision score is not adequate in EC-OD and another Epoch was initiated. | 1307 | | |
| When the average precision score is adequate in EC-OD and the Epoch was stopped. | 1307 | | |
| When all checkpoints have been authenticated. | 1307 | | |
| When all checkpoints have been authenticated. | 1307 | | |
| When Docu-Narrative is complete | 1815 | | |
| When Docu-Narrative is delivered to Client | 1815 | | |
| When Client acknowledges receipt of Docu-Narrative | 1815 | | |
| When Client confirms ability to access and open Docu-Narrative | 1815 | | |
| | | | |

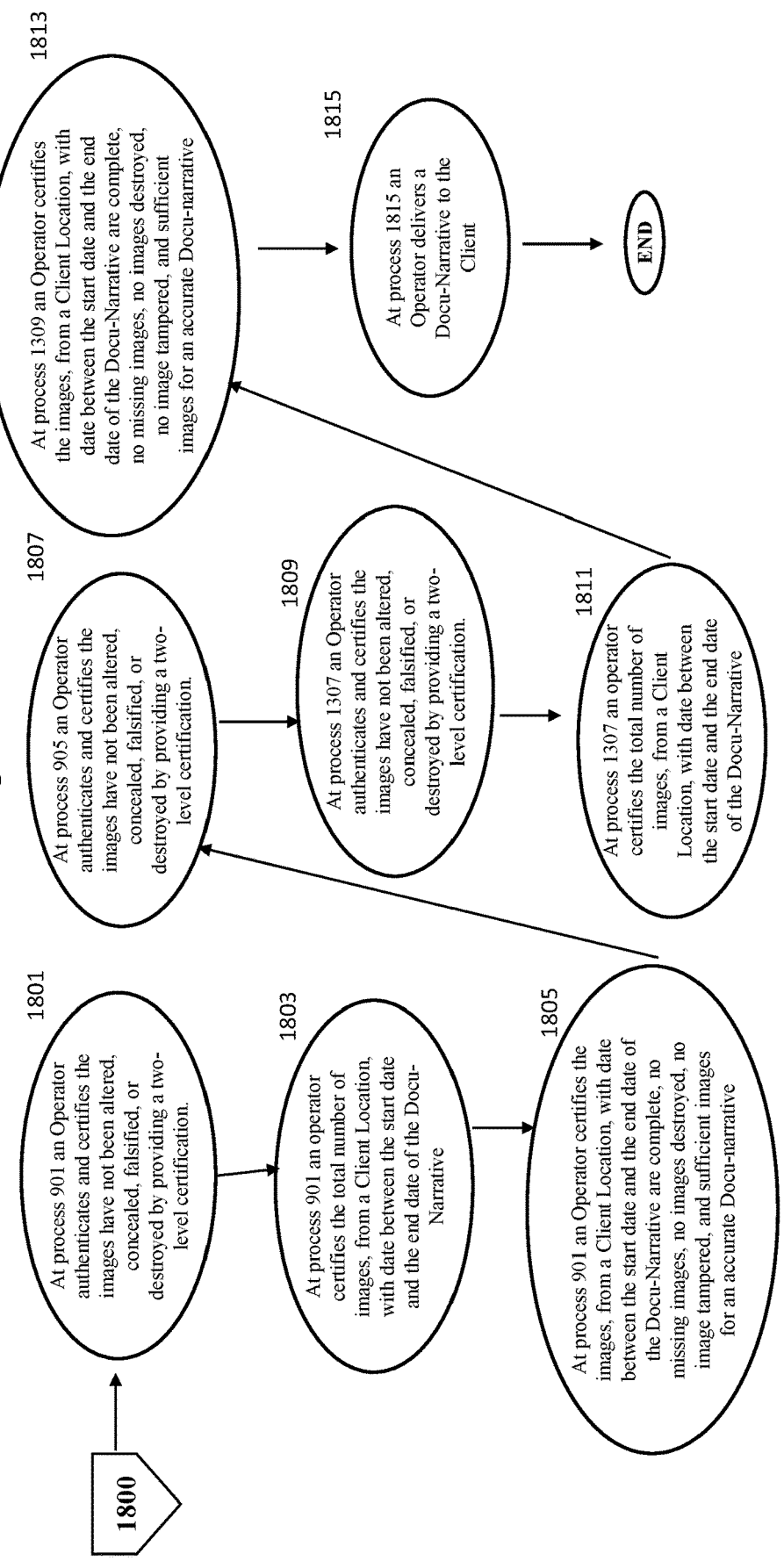

Fig. 26A

Image Chain of Custody Two-Level Certification Form

This form ensures an evidentiary testimonial of the events that occurred at the client location, during the Docu-Narrative start and end dates, from images taken of the client location. The chain of custody ensures images included in the Docu-Narrative are relevant, accurate, and have sufficient weight (a measure of the credibility of the image and the image components) to be admitted into the Docu-Narrative. It documents, but is not limited to, the acquisition, custody, control, transfer, analysis, and disposition, of the images in a Docu-Narrative.

| Docu-Narrative Start Date | |
|---|---|
| Docu-Narrative End Date | |
| Client Name | |
| Client ID Number | |
| Client Location | |
| Client Location ID | |
| Camera ID | |
| Camera Location | |

| Control # | Process Number | Description | Operator 1 ID & date and time | Operator 2 ID & date and time |
|---|---|---|---|---|
| 1601 | 101 | Operator creates an Image Chain of Custody Two Level Certification Form (1900). Operator confirms the Docu-Narrative start and end date and time; confirms the Client identification, confirms the Client Location; confirms the camera location and identification. | | |
| 1603 | 101 | Operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification. | | |
| 1605 | 101 | Operator certifies the total number of images, from a Client Location, with an image creation date between the start date and time of the Docu-Narrative and the end date and time of the Docu-Narrative to establish the total number of images for the image chain of custody. | | |

Fig. 26B

| 1606 | 101 | Operator creates a two-level certification that the images in the Accepted EC-F Docu-Vault for the Client Location with an image creation date between Docu-Narrative start date and time and the Docu-Narrative end date and time are complete, there are no missing images, no images were destroyed, no image was tampered, and there were sufficient images to create an accurate Docu-Narrative. | | |
|---|---|---|---|---|
| 1607 | 101 | Operator logs and certifies the selected Docu-Vault images that are associated with the Client Location with an image creation date between Docu-Narrative start date and time and the Docu-Narrative end date and time. | | |
| 1609 | 401 | Operator certifies, with a two-level certification, the camera manufacturer and model number are the same as the manufacturer and model number in the Hardware Specifications Docu-Vault (203) for the images in Docu-Narrative from the start date and time and the Docu-Narrative end date and time are accurate, and complete. | | |
| 1611 | 401 | Operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification. | | |
| 1613 | 401 | Operator certifies the total number of images, from a Client Location, with date between the start date and the end date of the Docu-Narrative | | |
| 1615 | 401 | Operator certifies, with a two-level certification, the resolution of the images in Docu-Narrative from the start date and time and the Docu-Narrative end date and time is equivalent to the benchmark resolution from the Hardware Settings Docu-Vault (219). | | |

Fig. 26C

| 1617 | 413 | Operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification. | | |
|---|---|---|---|---|
| 1619 | 413 | Operator certifies, with a two-level certification, the resolution and bounded boundaries of the images in Detection Images Docu-Vault (425) for the Docu-Narrative from the start date and time and the Docu-Narrative end date and time are equivalent to the resolution and bounded boundaries in the Ground Truth Images located in the Ground Truth Docu-Vault (417). | | |
| 1621 | 513 | Operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification. | | |
| 1623 | 513 | Operator creates a two-level certification that the images for the Client Location with an image creation date between Docu-Narrative start date and time and the Docu-Narrative end date and time are complete, there are no missing images, no images were destroyed, no image was tampered, and there were sufficient images to create an accurate Docu-Narrative | | |
| 1701 | 513 | Operator certifies the total number of images with an image creation date between the start date and time of the Docu-Narrative and the end date and time of the Docu-Narrative. | | |
| 1703 | 601 | Operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification. | | |

Fig. 26D

| 1704 | 601 | Operator produces a two-level certification identifying the filters used and the images in the Accepted EC-F Docu-Vault on which the filters were applied. | | |
|---|---|---|---|---|
| 1705 | 601 | Operator certifies the total number of images with an image creation date between the start date and time of the Docu-Narrative and the end date and time of the Docu-Narrative. | | |
| 1707 | 605 | Operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification. | | |
| 1709 | 605 | Operator produces a two-level certification identifying the augmentation images used, and the parent Detection Image which required the augmentation and the child image on which the augmentation images were applied. | | |
| 1711 | 605 | Operator produces a two-level certification identifying the child images created for each parent image and the family identification number used. | | |
| 1713 | 605 | Operator certifies the total number of images with an image creation date between the start date and time of the Docu-Narrative and the end date and time of the Docu-Narrative. | | |
| 1715 | 605 | Operator creates a two-level certification that the images for the Client Location with an image creation date between Docu-Narrative start date and time and the Docu-Narrative end date and time are complete, there are no missing images, no images were destroyed, no image was tampered, and there were sufficient images to create an accurate Docu-Narrative | | |
| 1717 | 803 | Operator certifies the total number of images with an image creation date between the start date and time of the Docu-Narrative and the end date and time of the Docu-Narrative. | | |

Fig. 26E

| 1719 | 803 | Operator creates a two-level certification that the images for the Client Location with an image creation date between Docu-Narrative start date and time and the Docu-Narrative end date and time are complete, there are no missing images, no images were destroyed, no image was tampered, and there were sufficient images to create an accurate Docu-Narrative | | |
|---|---|---|---|---|
| 1801 | 901 | Operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification. | | |
| 1803 | 901 | Operator certifies the total number of images with an image creation date between the start date and time of the Docu-Narrative and the end date and time of the Docu-Narrative. | | |
| 1805 | 901 | Operator creates a two-level certification that the images for the Client Location with an image creation date between Docu-Narrative start date and time and the Docu-Narrative end date and time are complete, there are no missing images, no images were destroyed, no image was tampered, and there were sufficient images to create an accurate Docu-Narrative | | |
| 1807 | 905 | Operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification. | | |

Fig. 26F

| 1809 | 1307 | Operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification. | | |
|---|---|---|---|---|
| 1811 | 1307 | Operator certifies the total number of images with an image creation date between the start date and time of the Docu-Narrative and the end date and time of the Docu-Narrative. | | |
| 1813 | 1307 | Operator creates a two-level certification that the images for the Client Location with an image creation date between Docu-Narrative start date and time and the Docu-Narrative end date and time are complete, there are no missing images, no images were destroyed, no image was tampered, and there were sufficient images to create an accurate Docu-Narrative | | |
| 1815 | 1815 | Operator creates a two-level certification that a Docu-Narrative is complete with an image creation date between Docu-Narrative start date and time and the Docu-Narrative end date and time are complete, there are no missing images, no images were destroyed, no image was tampered, and there were sufficient images to create an accurate Docu-Narrative. | | |
| 1815 | 1815 | Operator creates a two-level certification that a Docu-Narrative the Client received the Docu-Narrative and was able to access and view the Docu-Narrative | | |

Legend

PROCESSES TO CREATE A DOCU-NARRATIVE, INCLUDING EVIDENTIARY QUALITY IMAGES AND EVIDENTIARY OBJECTS WITHIN THE IMAGES, AND AN IMAGE CHAIN OF CUSTODY, WITH MULTI-LEVEL AUTHENTICATION AND CERTIFICATION

FIELD OF THE INVENTION

The present invention relates generally to images of a specific site, and more specifically to evidentiary quality images of the site, which embody chain-of-custody, authentication, and certification protocols.

BACKGROUND OF THE INVENTION

Each year, there are worker fatalities at construction sites. In 2019, 1,016 workers at construction sites died according to Federal OSHA data. Each year, approximately 1.1% of construction workers suffer an injury serious enough that they miss work, according to the Bureau of Labor Statistics.

To date, accurate, reliable, and consistently complete images or time-lapse videos of an entire construction site or a piece of construction equipment have not been available. For example, the body of a water truck and dump truck could be confused in an image. The bodies are similar in size and dimension. However, the image of a dump truck, in its entirety, is unlike the image of a water truck in its entirety. Often the two pieces of equipment would be inaccurately or only partially displayed (for example, due to obstructions on the camera lens) in prior art time-lapse videos.

Providing highly accurate evidentiary quality images is essential for monitoring construction site activities, for example. In addition to serving as an evidentiary record of site activities, they improve the safety of stakeholders at the site but quickly producing many tens of thousands of highly accurate evidentiary quality images with forensic integrity (i.e., meeting judicial standards of evidentiary quality) of site objects and activities is not possible manually and has not been done before.

Determining a viable sample size for a large population of images has not been done before. Images are different from other homogenous population like males 50-55 years old, married and living in New York State. Images taken of the same object, outdoors, are not homogeneous. Determining a meaningful sample size for a large population of images taken of the same object, outdoors, has not been done before. Weather conditions like snow, rain and fog will make the images dissimilar. Determining the sample size of a large number of images of the same object outdoors has not been done before to create an evidentiary and probative image chain of custody and with forensic reliability.

Manual image augmentation may be required to, for example, remove obstructions of the camera lens that in turn obstruct segments of an image. But manual augmentation is time-consuming and costly and impacts the evidentiary quality of the final image. Thus, service providers produce inconsistent, unreliable, and poor-quality images with less than full frame objects within the images. Such poor-quality images could not be used to provide accurate evidence of site activities nor do the images have forensic integrity.

SUMMARY OF THE INVENTION

The present invention employs software-based tools and techniques to create a Docu-Narrative of events at a site, in many cases, at a construction site. Unlike a simple prior art time-lapse video of activities at the site, a Docu-Narrative, created according to the present invention, is an historical, recorded, visual, narrative documentary of events that occur at a client's location during a specific period of time. The Docu-Narrative is subject to rigorous, secure chain of custody and probative protections and procedures such that it can be relied upon as presenting truthful information.

A Docu-Vault is a secure datastore for images used in a Docu-Narrative. Items in the Docu-Vault are protected using advanced data protection techniques and physical security. The data security for the Docu-Vault is provided by, but is not limited to, data encryption, secured socket certificates, digital authentication, access rights management with multiple authentication layers and backup systems.

a Docu-vault is the name for datastore, data library, file store etc. It is a physical segment of a hard disk which is attached to a CPU. The CPU is located in a secure, fire retarded server room in EarthCam headquarters. EarthCam, Inc. is the assignee of the present invention.

The physical security for the Docu-Vault server site includes, but is not limited to, alarmed access points, climate control, fire suppression, moisture detection, access limitations to secure personnel, lack of external windows, and a vault-like environment.

The present invention uses a variety of resources to produce the Docu-Narrative. Some of the resources include, but are not limited to, camera equipment, computer equipment, cuss equipment, software tools and instruction sets, EarthCam proprietary hardware equipment and software tools and instructions sets. An EC-SADN is an EarthCam proprietary instruction set, algorithms, methods, procedures, processes used to produce a Docu-Narrative. Operators or technicians operate these various resources to generate the Docu-Narrative.

Deep learning systems, to be described herein, are trained to record, document, and augment the image (when necessary and accomplished automatically) to create the Docu-Narrative. Unlike a simple prior art time-lapse video, a Docu-Narrative is accurate, definitive, and reliable. A Docu-Narrative is a visual, evidentiary testimonial of the events that occurred at a client location during a specific period of time. It presents the reality of what happened at the location as a series of images. Unlike a simple time-lapse video, a Docu-Narrative includes an image and probative chain of custody to ensure images included in the Docu-Narrative are relevant, accurate, and have sufficient weight (a measure of the credibility of the image and the image components) to be admitted into an evidentiary Docu-Narrative. Prior art time-lapse videos, which are merely a collection of successive images, do not document the acquisition, custody, control, transfer, analysis, and disposition, etc. of the images included in the time-lapse video. And they do not include methods to protect the forensic integrity of the images, such as authentication techniques to determine whether an image has been altered, concealed, falsified, or destroyed with the intent to interfere with the entirety of an image chain of custody. Nor do they include methods to track, log and identify augmentation of parent images and child images to ensure the forensic integrity of an image and the entirety of an image chain of custody.

A Docu-Narrative is an accurate, definitive, and reliable, visual, evidentiary documentary narrative testimonial which includes an image chain of custody. Such a narrative documentary of events which occur at a construction site, civil engineering site, or large client location during a specific period of time aids the safety and wellbeing of stakeholders at construction civil engineering sites. It also provides a cost-effective tool for mitigating construction site theft and construction errors.

A Docu-Narrative of events occurring at a site verifies compliance with government agency construction requirements and can be used as evidence in litigation. For the first time, custodians of image Docu-Vaults can audit and certify that the images included in a Docu-Narrative are associated with the client location and were created within the Docu-Narrative start date and time and the Docu-Narrative end date and time.

The principal methods used to create the Docu-Narrative include, but are not limited to, the following:

(1) EC-F, a unique EarthCam formatting instruction set, and process. EC-F is used to achieve, but not limited to achieving, the optimum tensor size for an image (i.e., image characteristics), evaluate image weight scores, and calculate the image mean average precision. Tensors are like matrices. They are generally 3 dimensional. The $1^{st}$ dimension is for the number of color channels in the image. Dimensions 2 and 3 are for the number pixels in the image height and width.

(2) EC-IC, a unique EarthCam image classification instruction set and process. Relative to the present invention, EC-IC performs the following tasks, but not limited to the following tasks, augments images, normalizes images and an image batch size, and optimizes residual layers in an image. An image batch is a collection of images from a client location, including, but not limited to, images acquired from the Docu-narrative start date and start time to the Docu-narrative end date and end time.

Augmenting an image is the process of removing anomalous objects, such as lens dirt from the image. Normalizing images is the process of managing image properties so an image appears consistent with the previous image and with the next image. An optimum image batch size is the maximum number of images in a group of images which can be treated in a process in the fastest amount of time. Residual layers represent an index for the differences between images, in an image before and after correction.

(3) EC-OD is a unique EarthCam object detection instruction set, process, and algorithms. EC-OD provides real-time object detection and identification, e.g., for distinguishing traffic signals from people in an image. EC-OD is used to establish a good identification of objects in images, but not limited to establishing good identification of objects in images.

The EarthCam processes, procedures and proprietary instruction sets as described below have been used exclusively only by EarthCam to produce a Docu-Narrative for EarthCam clients.

BRIEF DESCRIPTION OF THE FIGURES

FIGS. 6A-6F illustrate the EarthCam Client Request Form.

FIGS. 22-25 illustrate the Image Chain of Custody Process.

FIGS. 26A-26F illustrate the Image Chain of Custody Two-Level Certification Form.

DETAILED DESCRIPTION OF THE INVENTION

Generally, the method and system of the invention begins by evaluating images stored in a Docu-Vault to determine whether they are suitable for use in a Docu-Narrative. A Docu-Vault is a digital storage media including a physical segment of a hard disk, but not limited to a segment of a hard disk, which is assigned to a specific client location. The hard disk is attached to a central processing unit CPU. For one application of the invention, the CPU is located in a secure, fire retarded server room in EarthCam headquarters.

Figure 1:
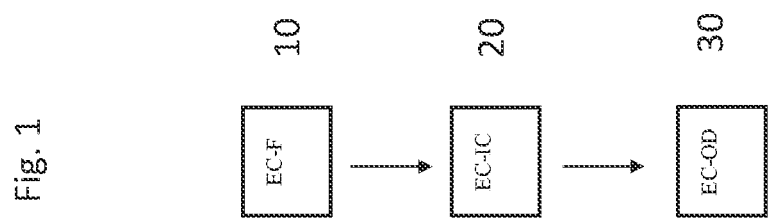
FIG. 1 illustrates the integration of the EC-F process, the EC-IC process, and the EC-OD process.

The CPU executes the various processes described herein, including processes governed by instruction sets EC-F, EC-IC, and EC-OD. FIG. 1 illustrates the serial execution of these three instruction sets.

Figure 2:
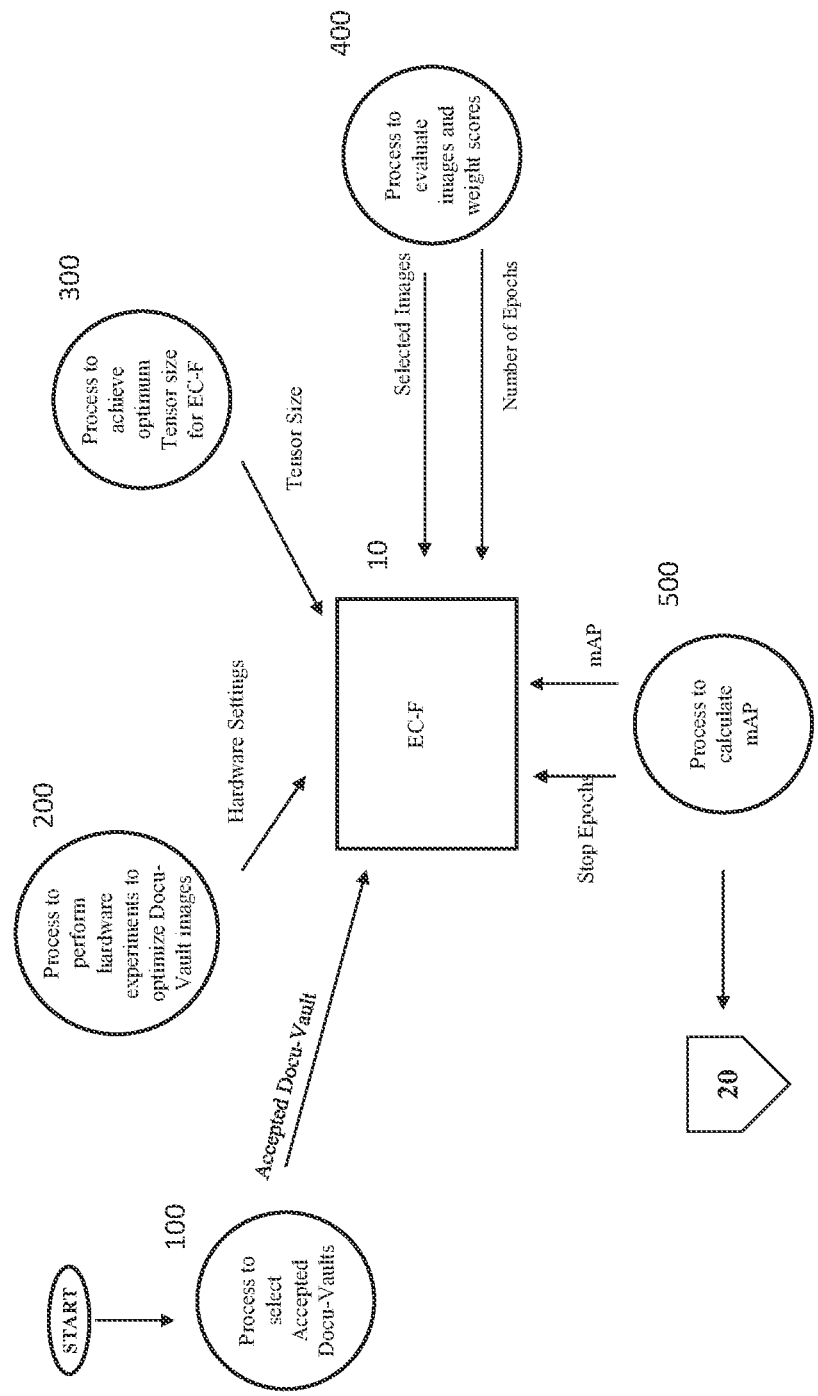
FIG. 2 illustrates processes for EC-F.
Figure 3:
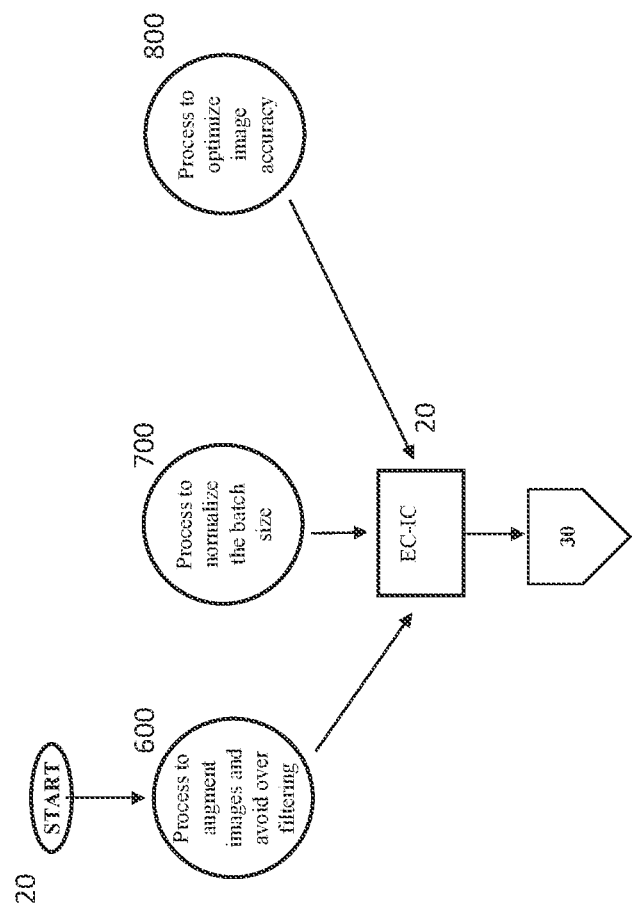
FIG. 3 illustrates the processes for Optimizing the Image Output of EC-IC.
Figure 4:
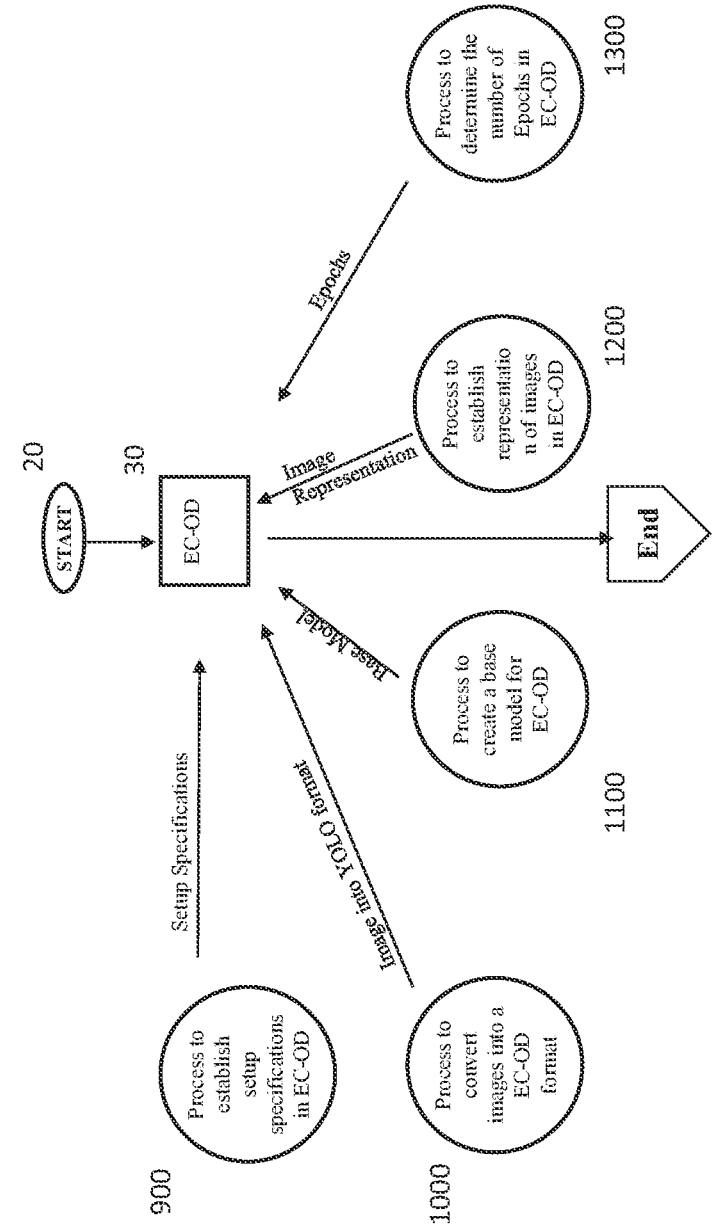
FIG. 4 illustrates the processes for Optimizing EC-OD.

As can be seen in FIG. 2, the EC-F instruction set comprises processes 100, 200, 300, 400, and 500, each described in greater detail below. As can be seen in FIG. 3, the EC-IC instruction set comprises processes 600, 700, and 800 as further described below. And finally, as can be seen in FIG. 4, the EC-OD instruction set comprises processes 900, 1000, 1100, 1200, and 1300. Each process is described below.

Each Fig. is identified below with the process numbers described in conjunction with that Fig. The processes are identified by a circle with the number of that process set forth inside or adjacent the circle.

Figure 5:
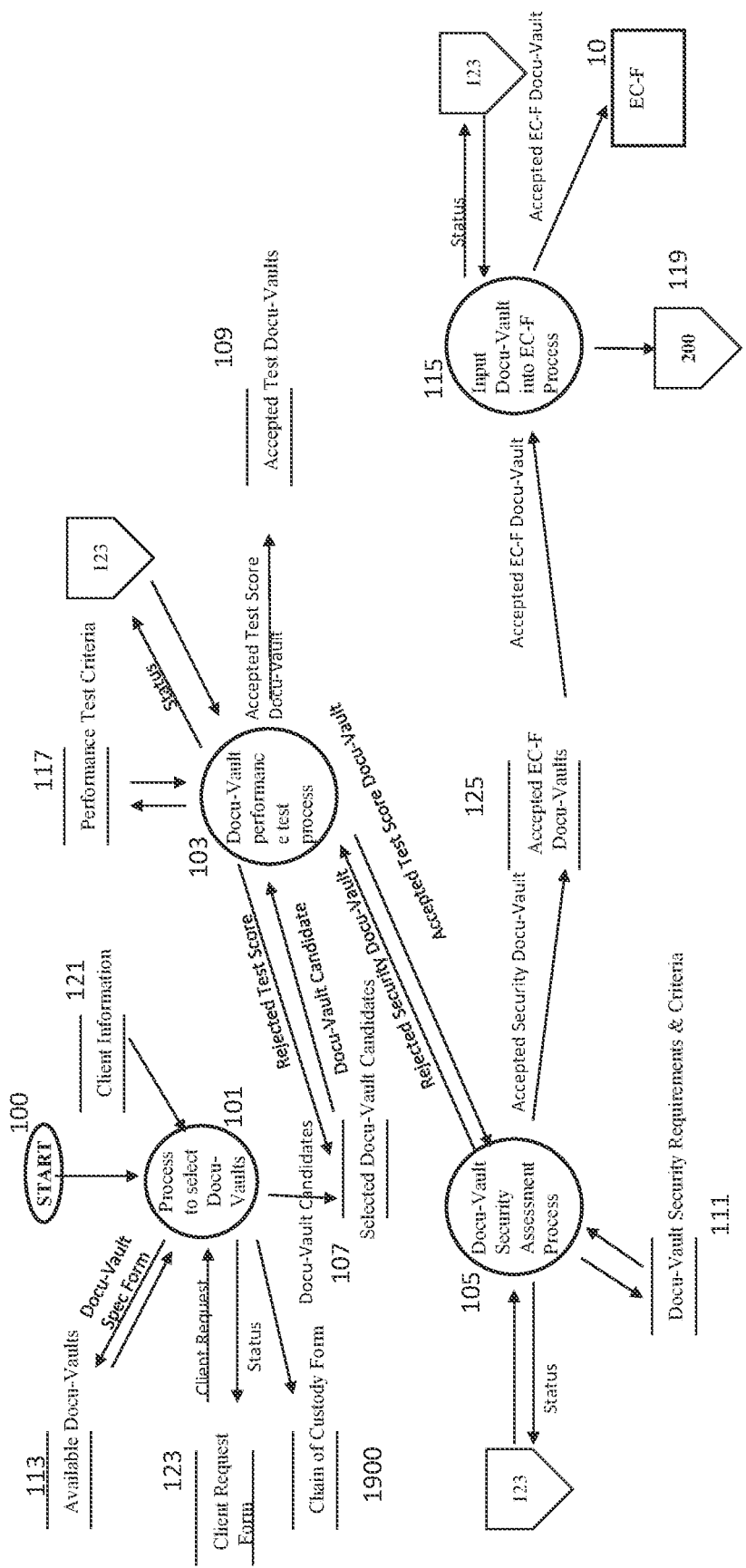
FIG. 5 illustrates the processes for Selecting Accepted Docu-Vaults for EC-F.

FIG. 5 includes process reference numbers 101, 103, 105, and 115.

FIGS. 6A-6F describe the Client Request Form, frequently referred to in conjunction with the various processes described herein.

Figure 7:
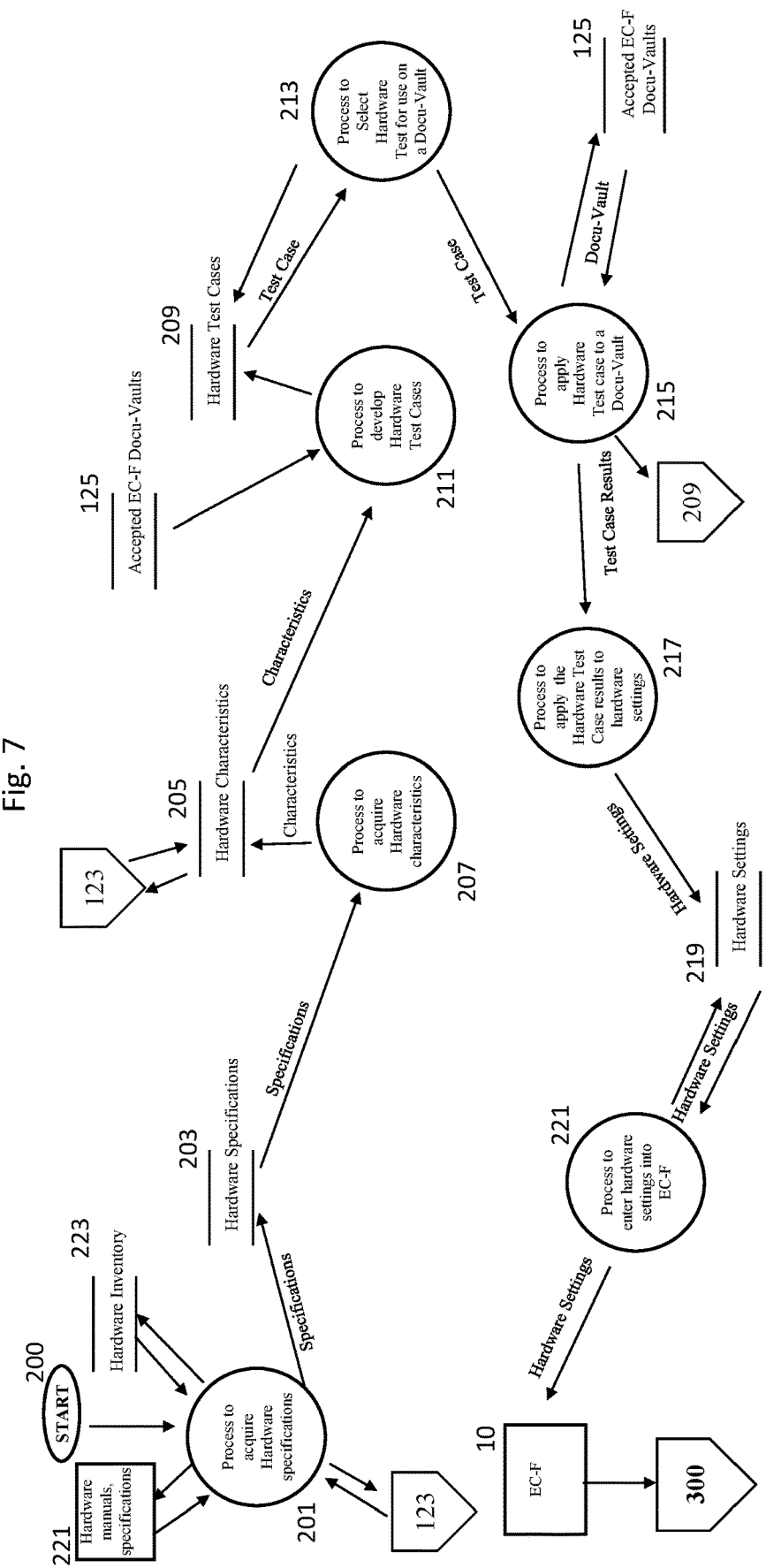
FIG. 7 illustrates the processes for Hardware. Experiments to Optimize Docu-Vault Images for EC-F.

FIG. 7 includes process reference numbers 201, 207, 211, 213, 215, 217, and 221.

Figure 8:
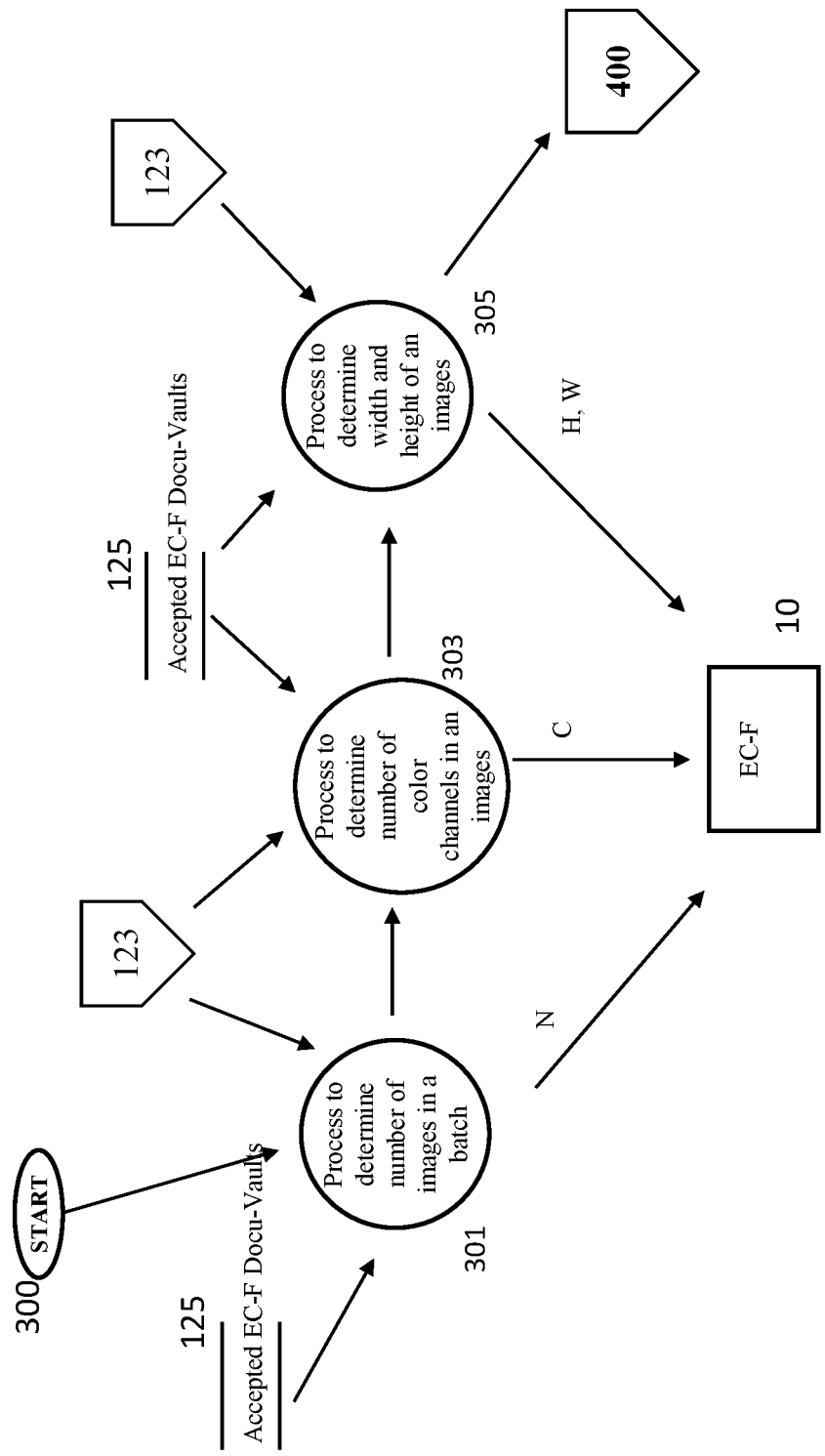
FIG. 8 illustrates the processes to Process to Achieve the Optimum Tensor Size for EC-F.

FIG. 8 includes process reference numbers 301, 303, and 305.

Figure 9:
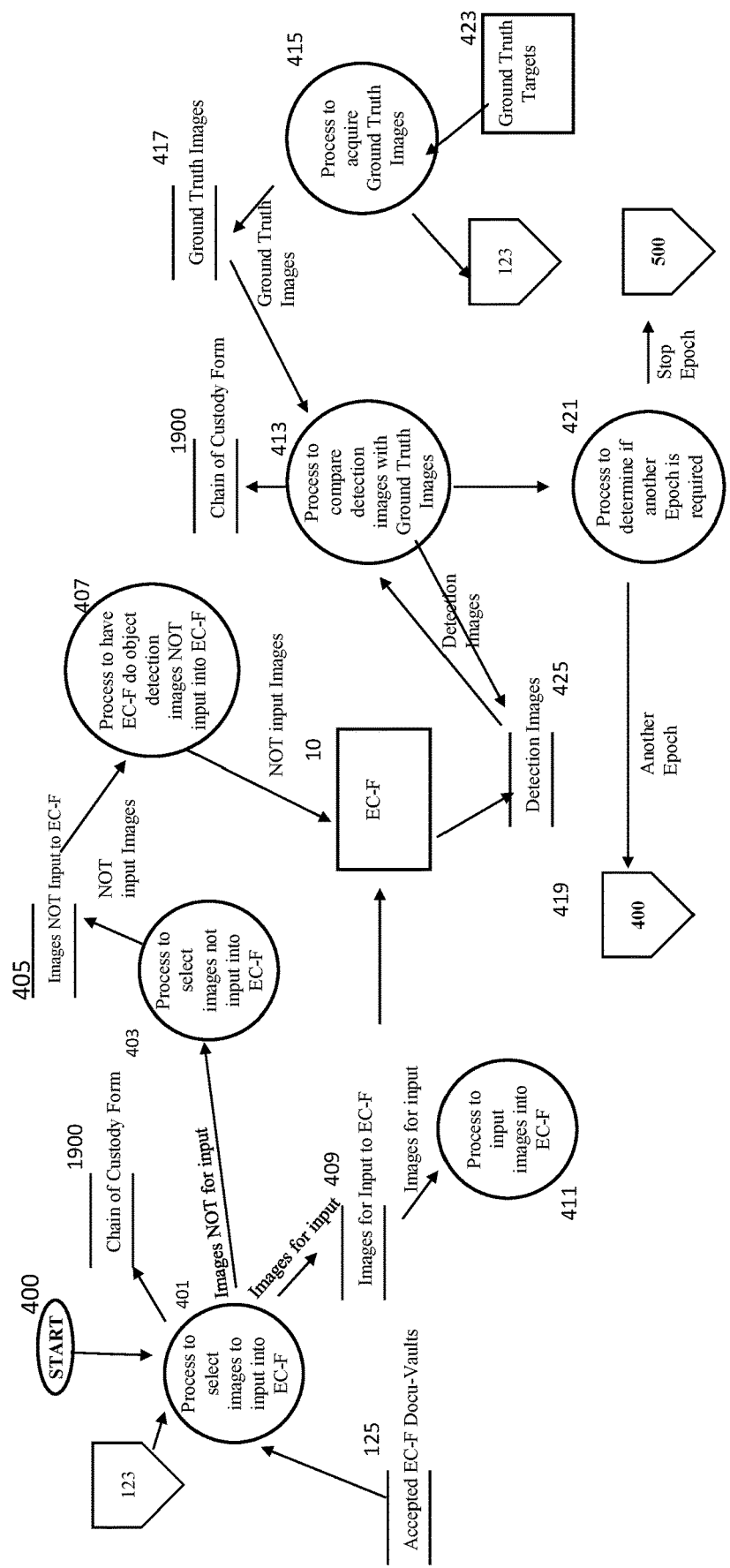
FIG. 9 illustrates the processes to Evaluate Images and Weight Scores for EC-F.

FIG. 9 includes process reference numbers 401, 403, 407, 411, 413, 415, and 421.

Figure 10:
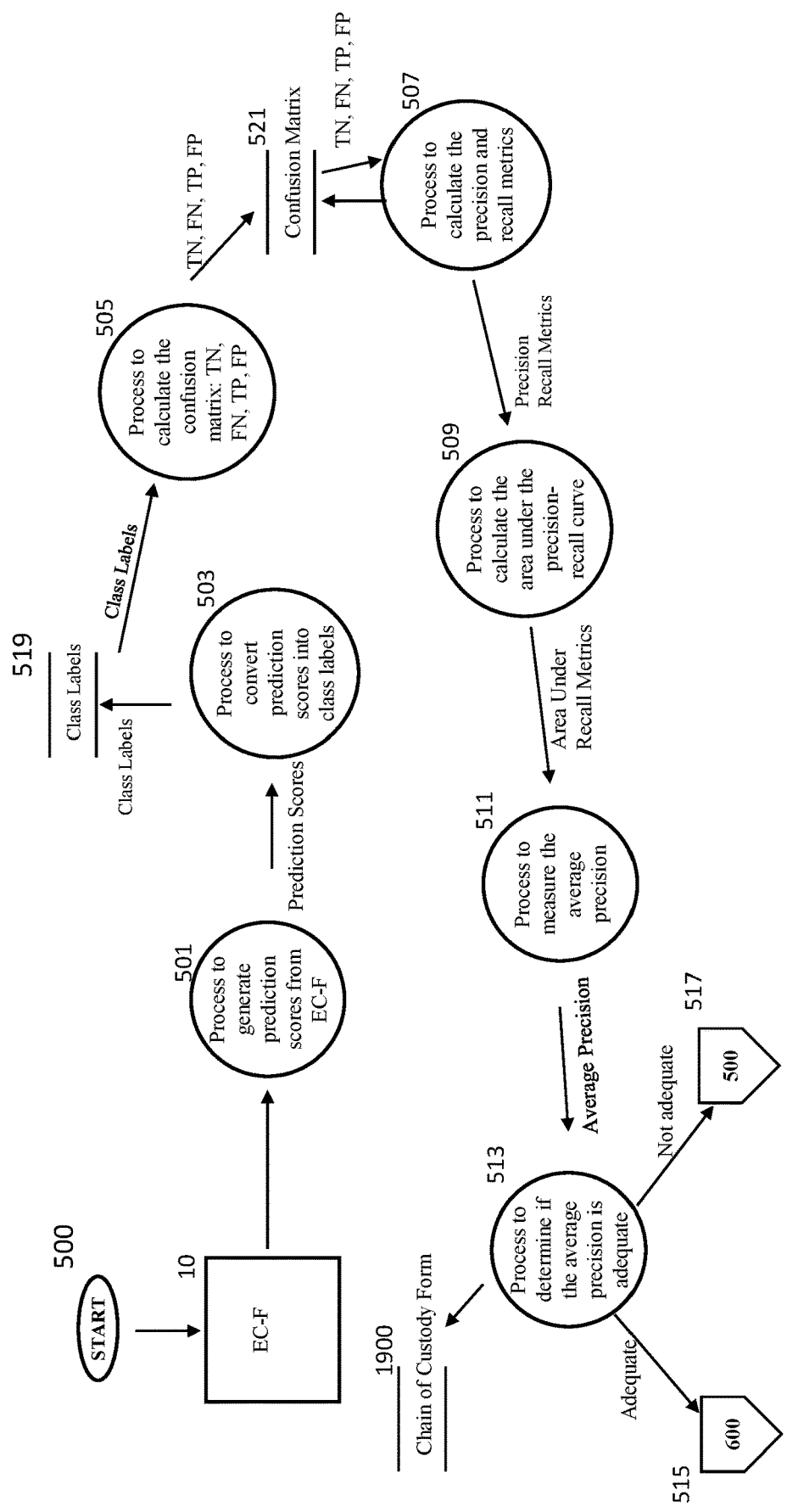
FIG. 10 illustrates the processes to calculate mAP (mean average precision) and stop Epochs in EC-F.

FIG. 10 includes process reference numbers 501, 503, 505, 507, 509, 511, and 513.

Figure 11:
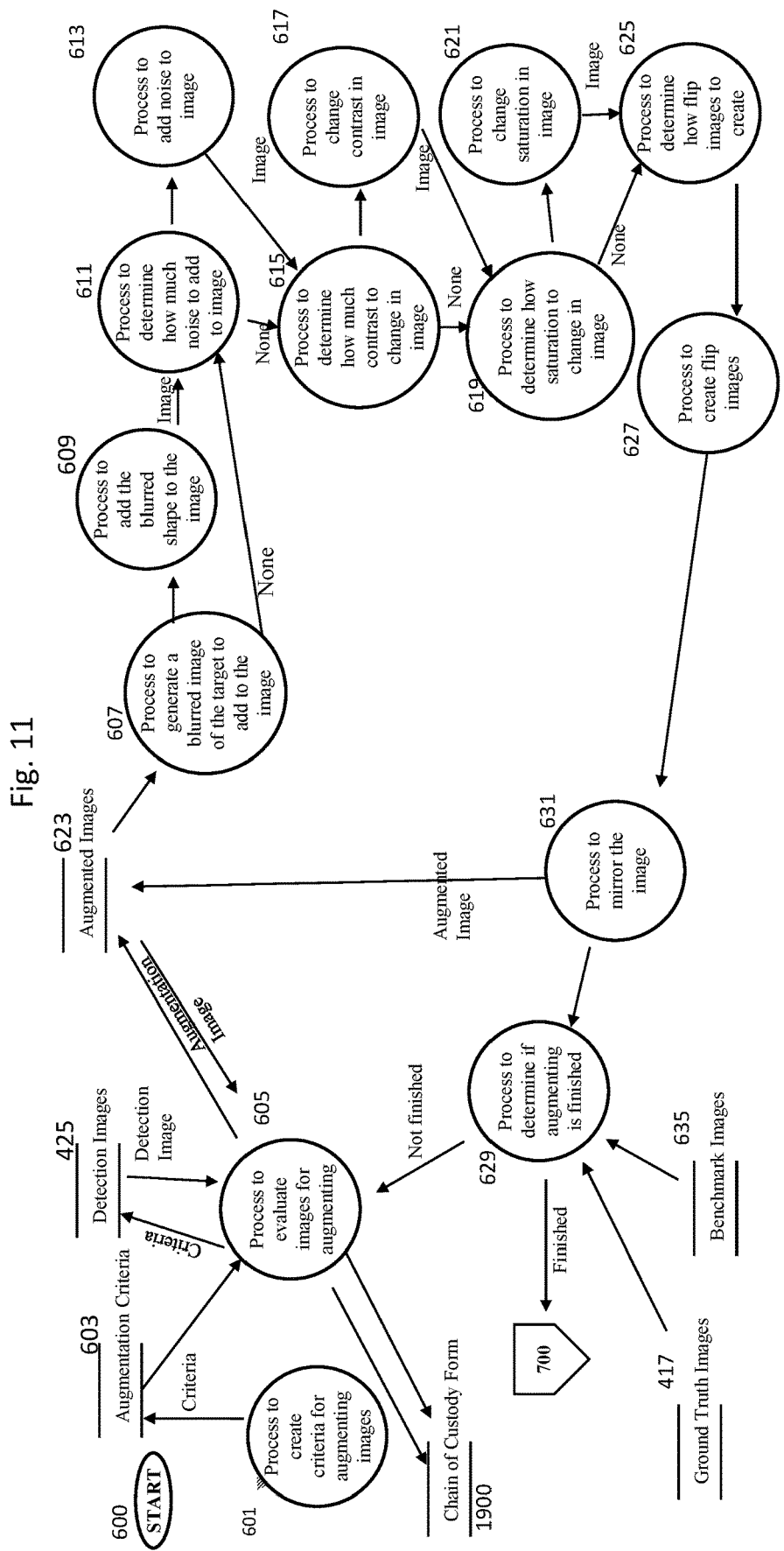
FIG. 11 illustrates the processes to Augment Images for use in EC-IC.

FIG. 11 includes process reference numbers 601, 605, 607, 609, 611, 613, 615, 617, 619, 621, 625, 627, 629, and 631.

Figure 12:
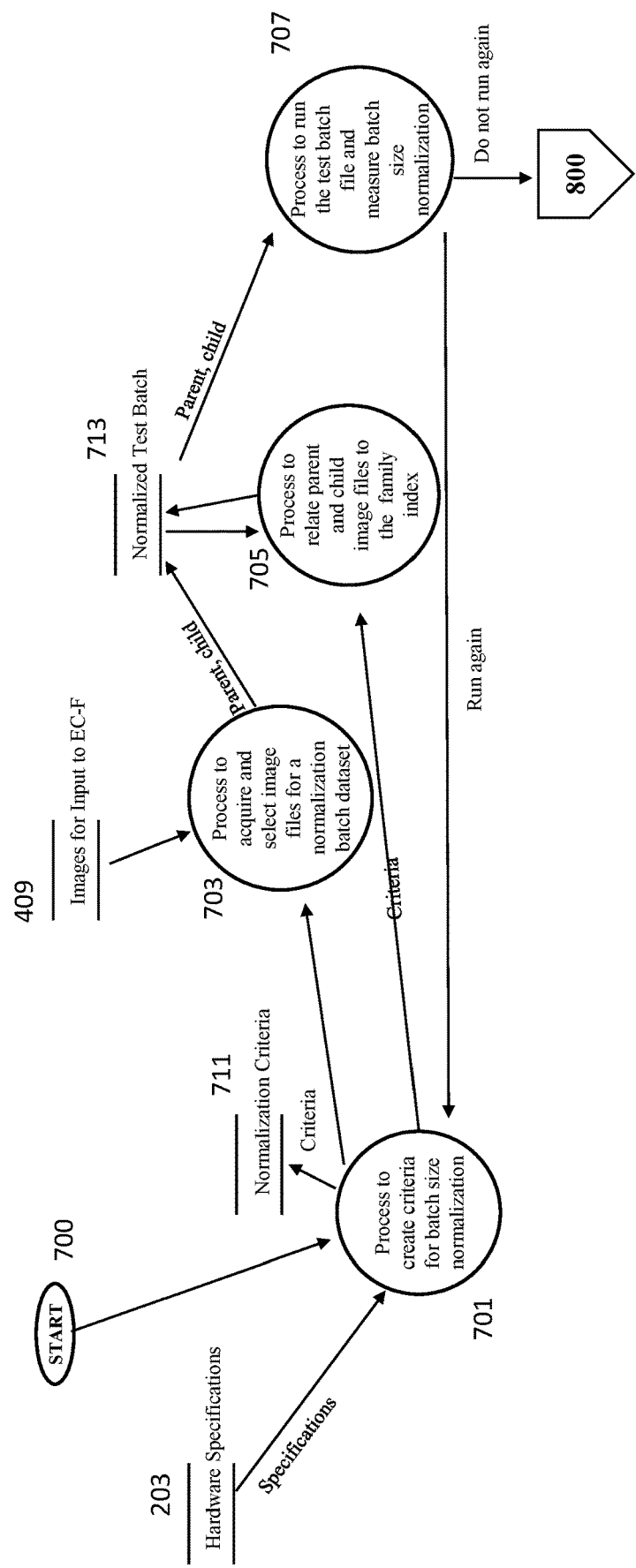
FIG. 12 illustrates the processes to Normalize the Batch Size In EC-IC.

FIG. 12 includes process reference numbers 701, 703, 705, and 707.

Figure 13:
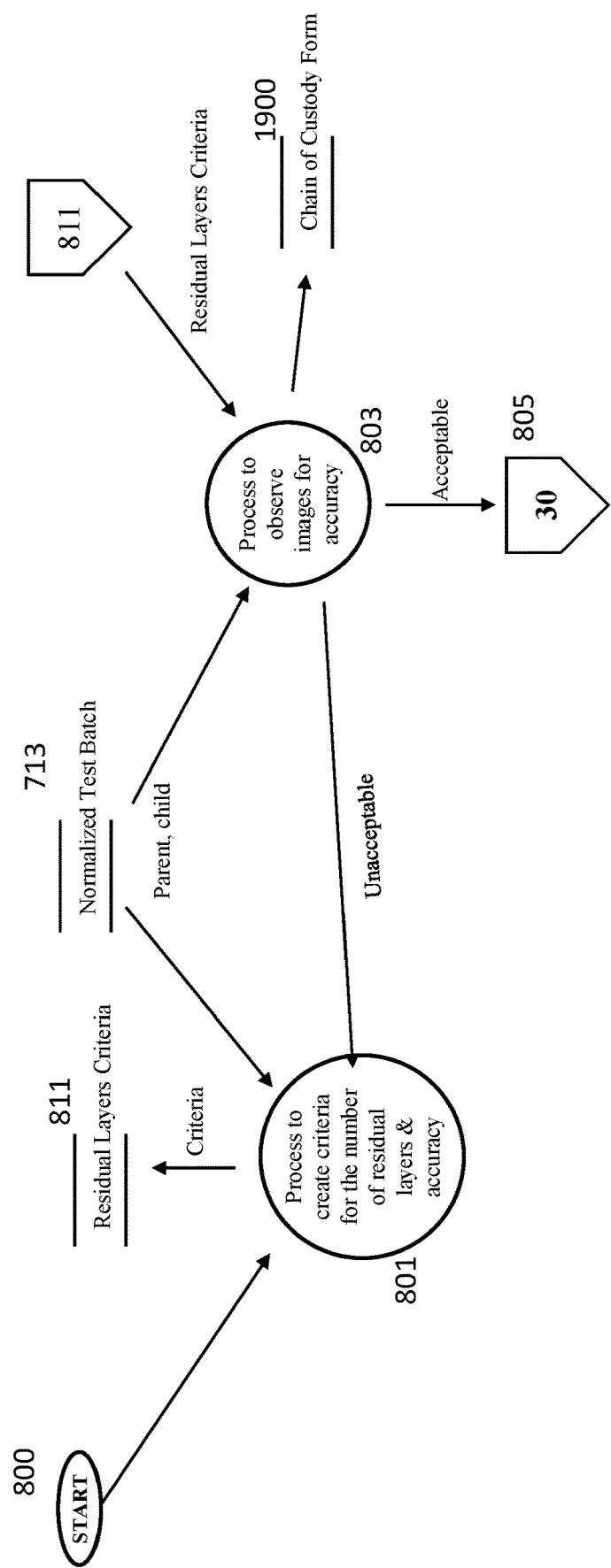
FIG. 13 illustrates the processes Optimize Residual Layers in EC-IC.

FIG. 13 includes process reference numbers 801 and 803.

Figure 14:
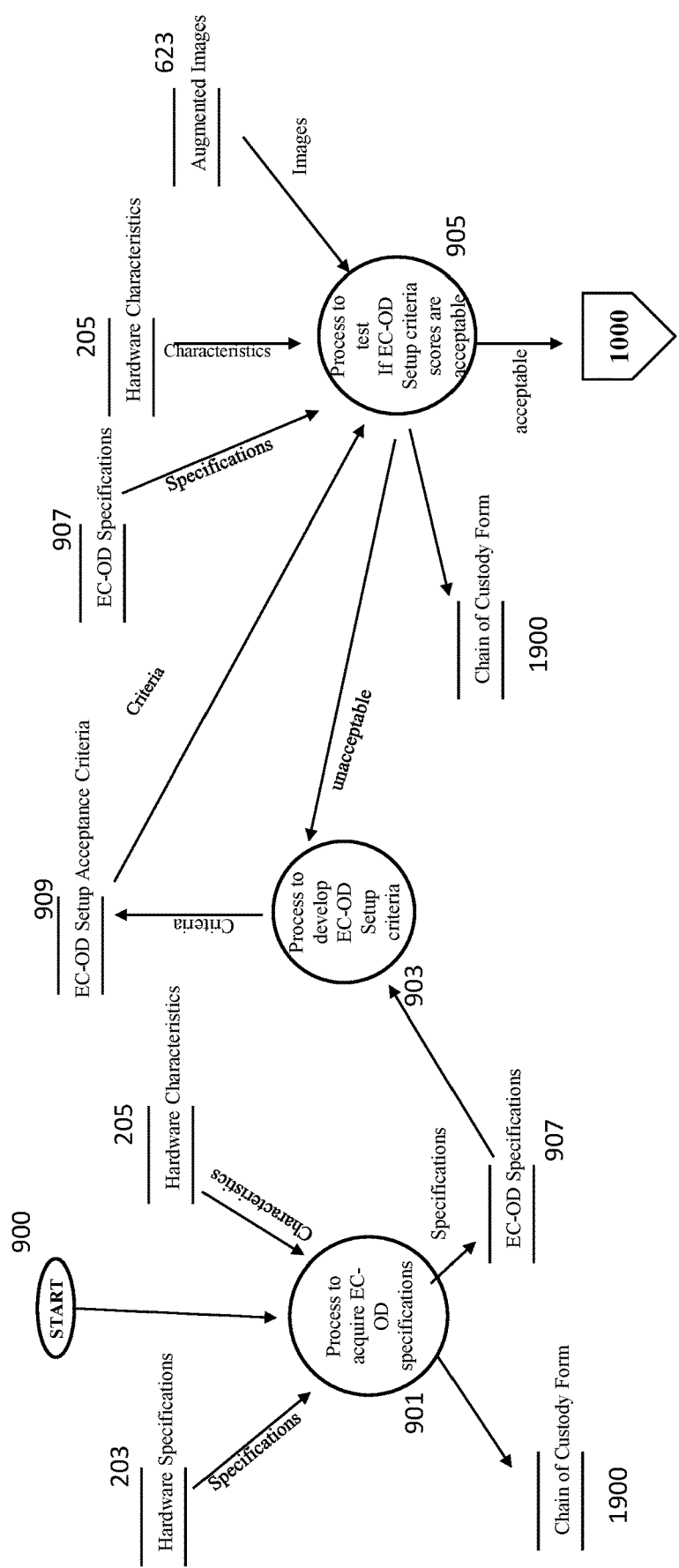
FIG. 14 illustrates the processes to Establish Setup Specifications in EC-OD.

FIG. 14 includes process reference numbers 901, 903, and 905.

Figure 15:
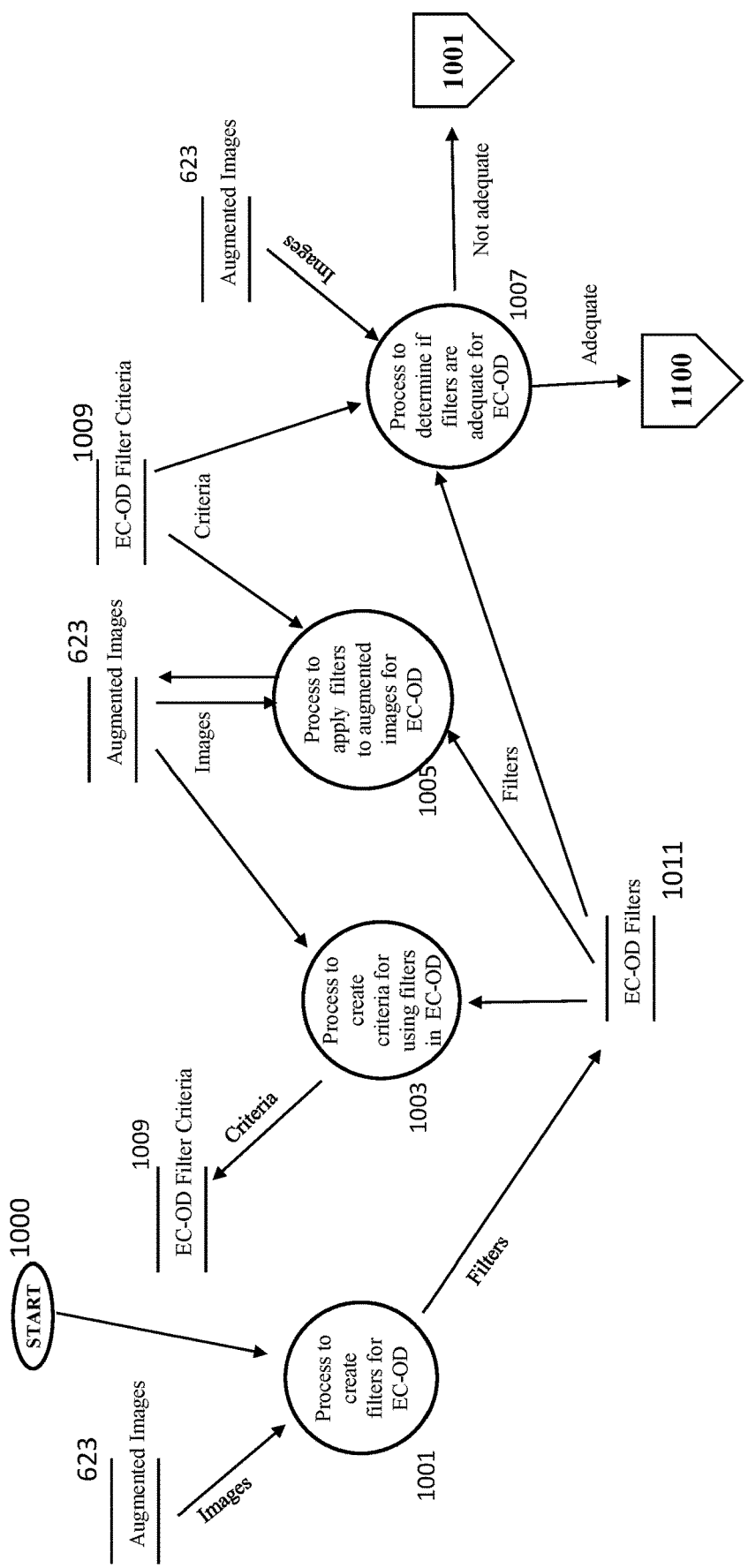
FIG. 15 illustrates the processes to Convert Images into a Format for EC-OD.

FIG. 15 includes process reference numbers 1001, 1003, 1005, and 1007.

Figure 16:
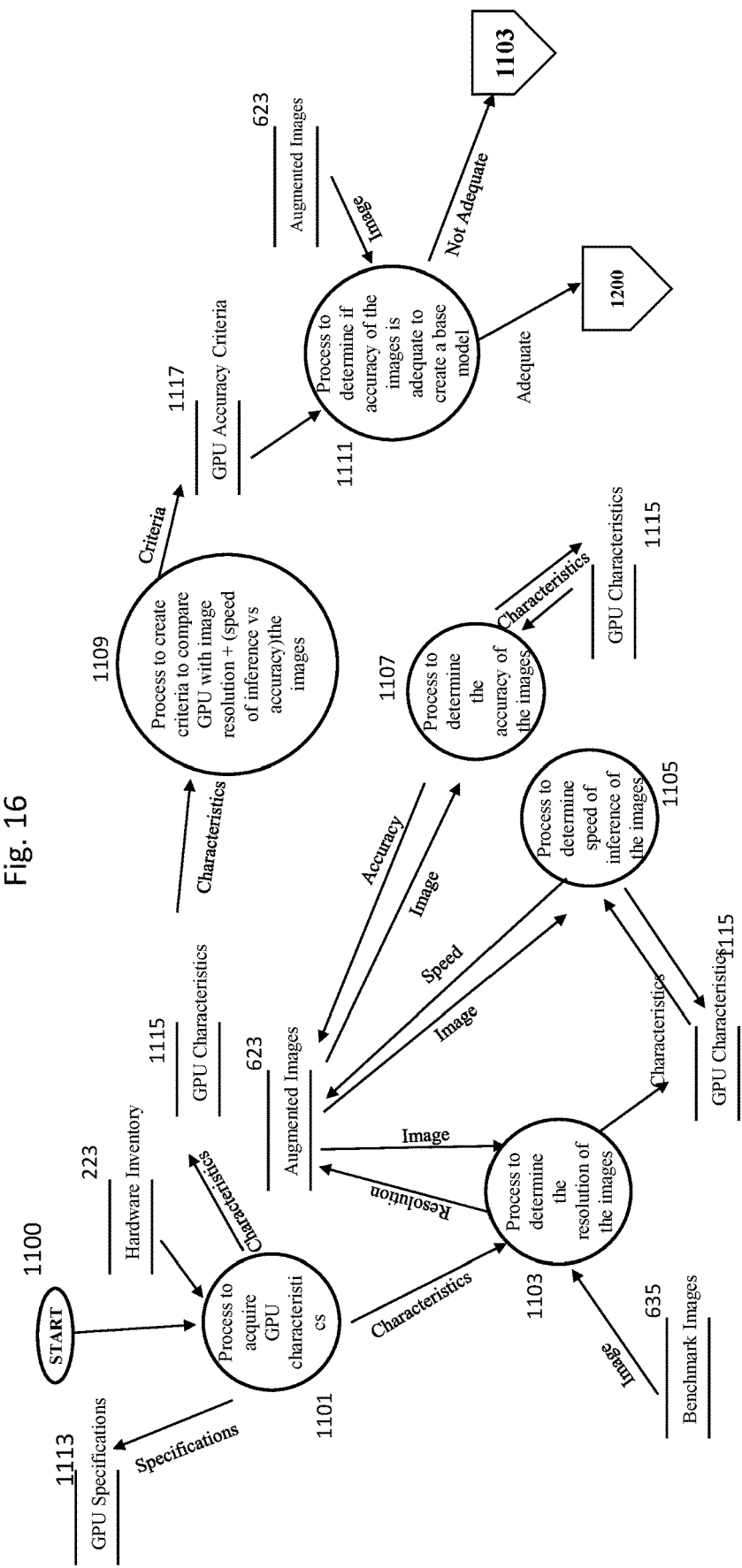
FIG. 16 illustrates the processes to Create a Base Model in EC-OD.

FIG. 16 includes process reference numbers 1101, 1103, 1105, 1107, 1109, and 1111.

Figure 17:
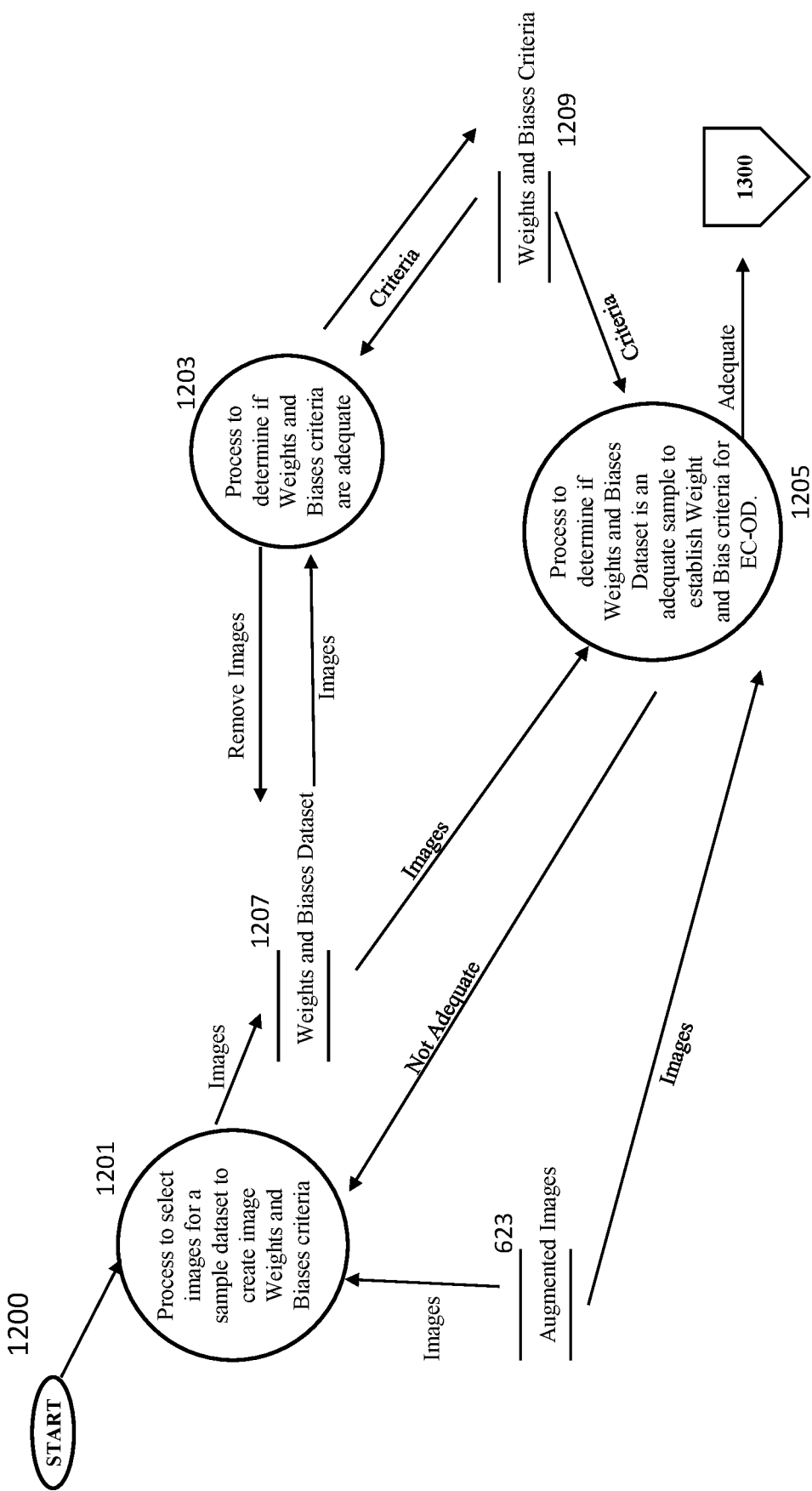
FIG. 17 illustrates the processes to Establish Accepted Representation of Images in EC-OD.

FIG. 17 includes process reference numbers 1201, 1203, and 1205.

Figure 18:
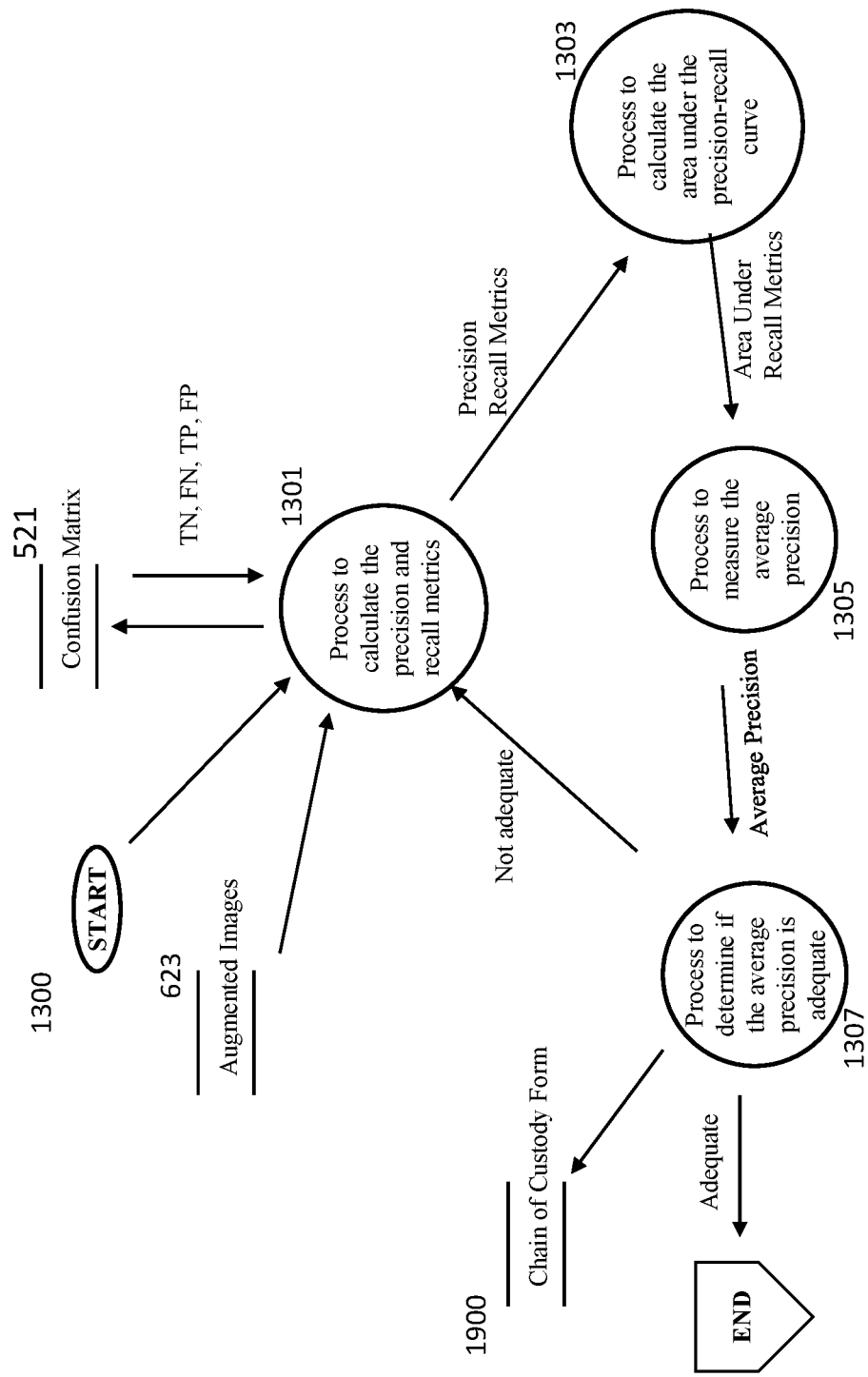
FIG. 18 illustrates the processes Determine the Number of Epochs in EC-OD.

FIG. 18 includes process reference numbers 1301, 1303, 1305, and 1307.

Figure 19:
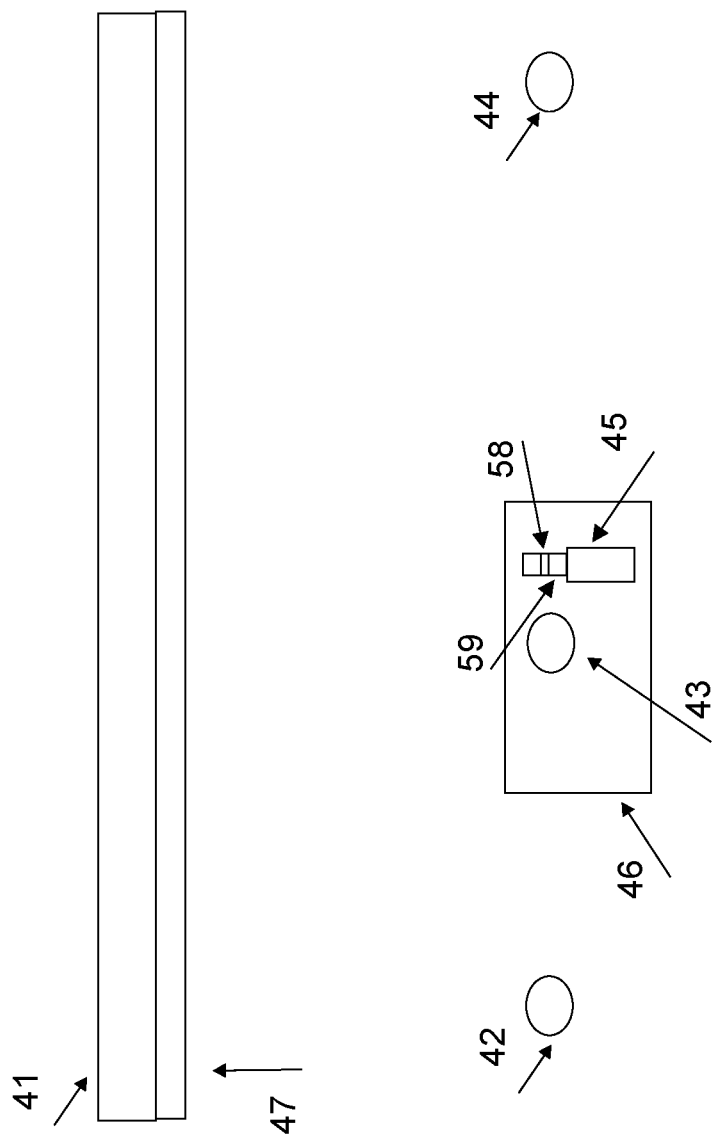
FIGS. 19-21 illustrate the Resolution and Focus Device to Set the Benchmark Resolution for a Camera.
Figure 20:
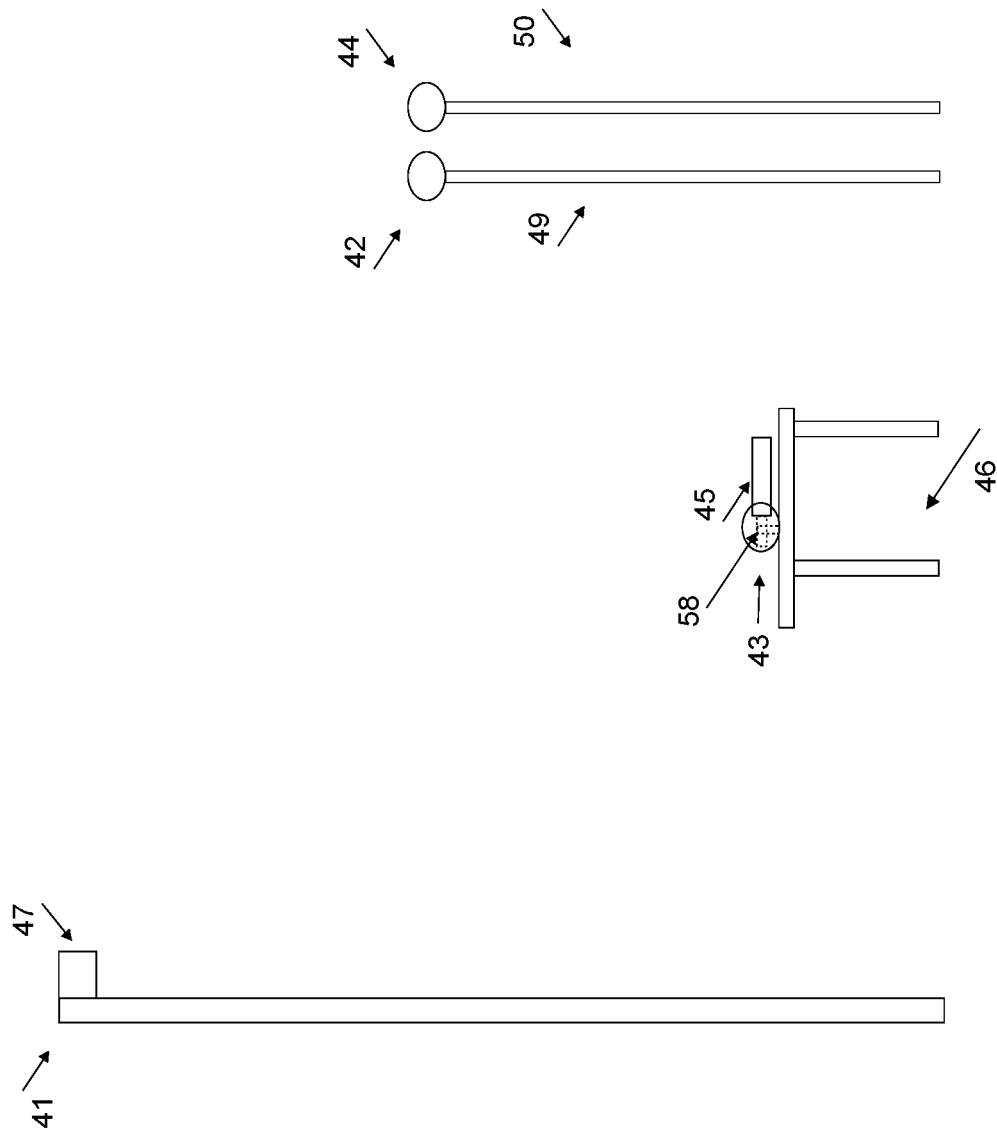
Figure 21:
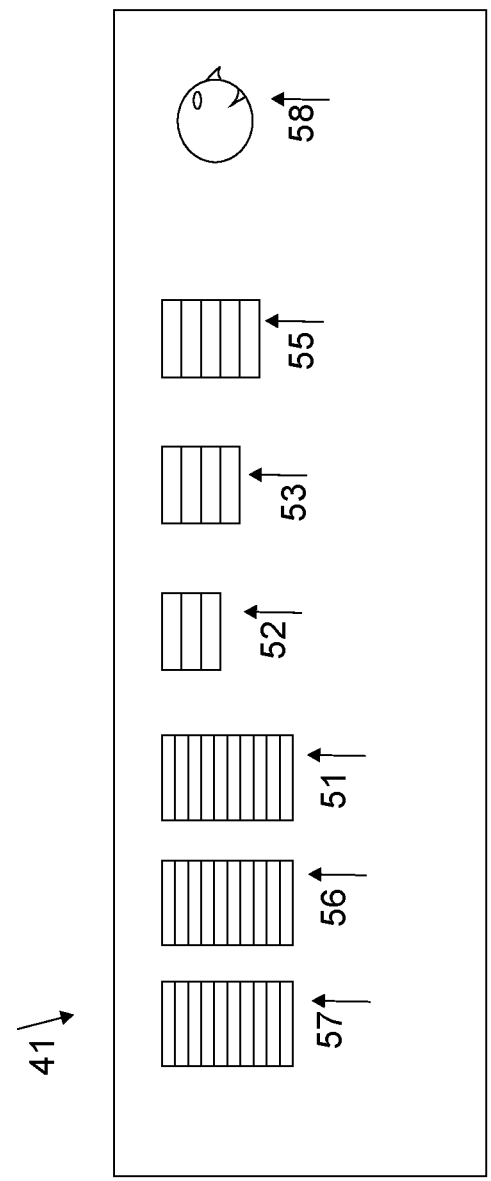

FIGS. 19-21 illustrate the resolution and focus device that is used to set the benchmark resolution for a camera.

Figure 22:
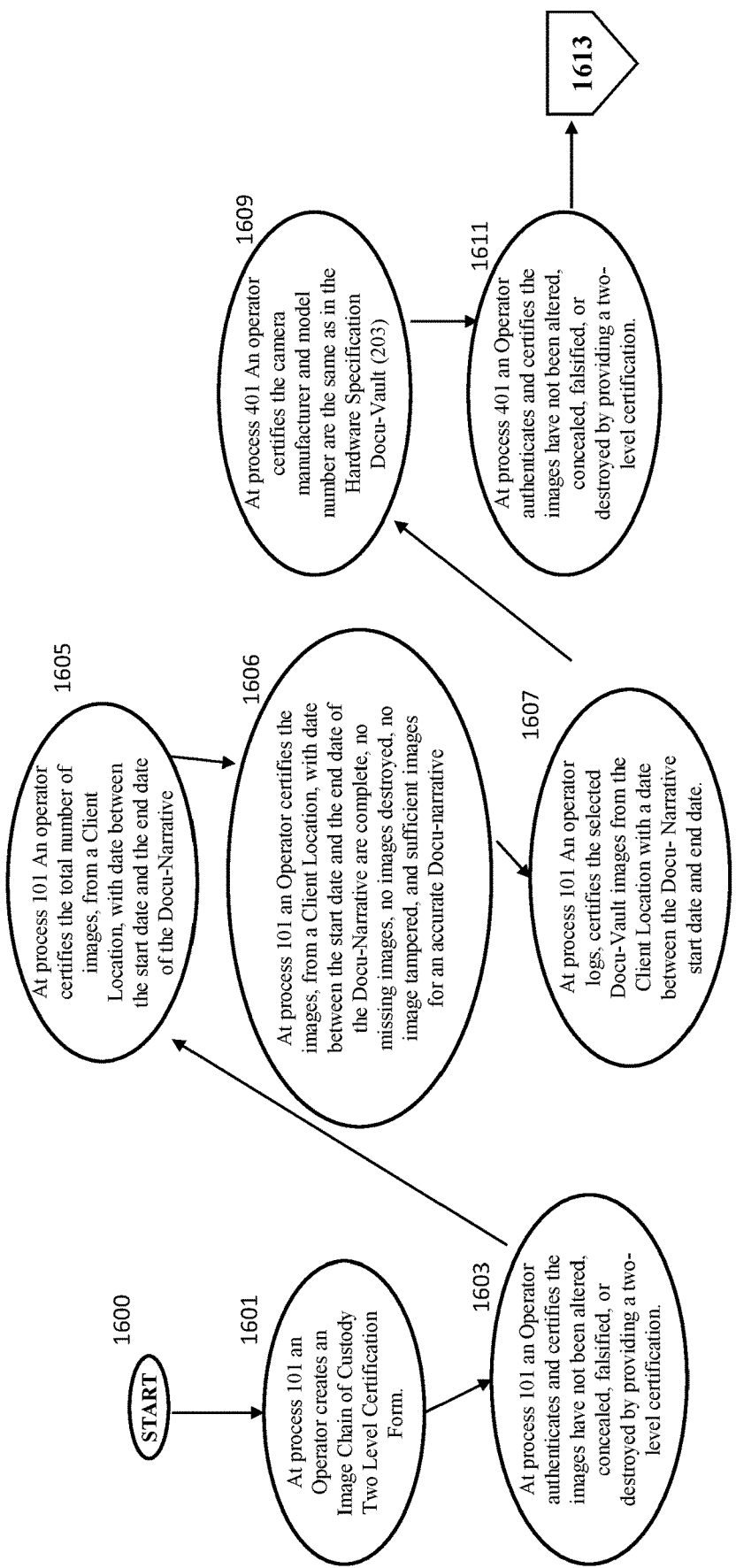

FIG. 22 includes process reference numbers 1601, 1603, 1605, 1606, 1607, 1609, and 1611.

Figure 23:
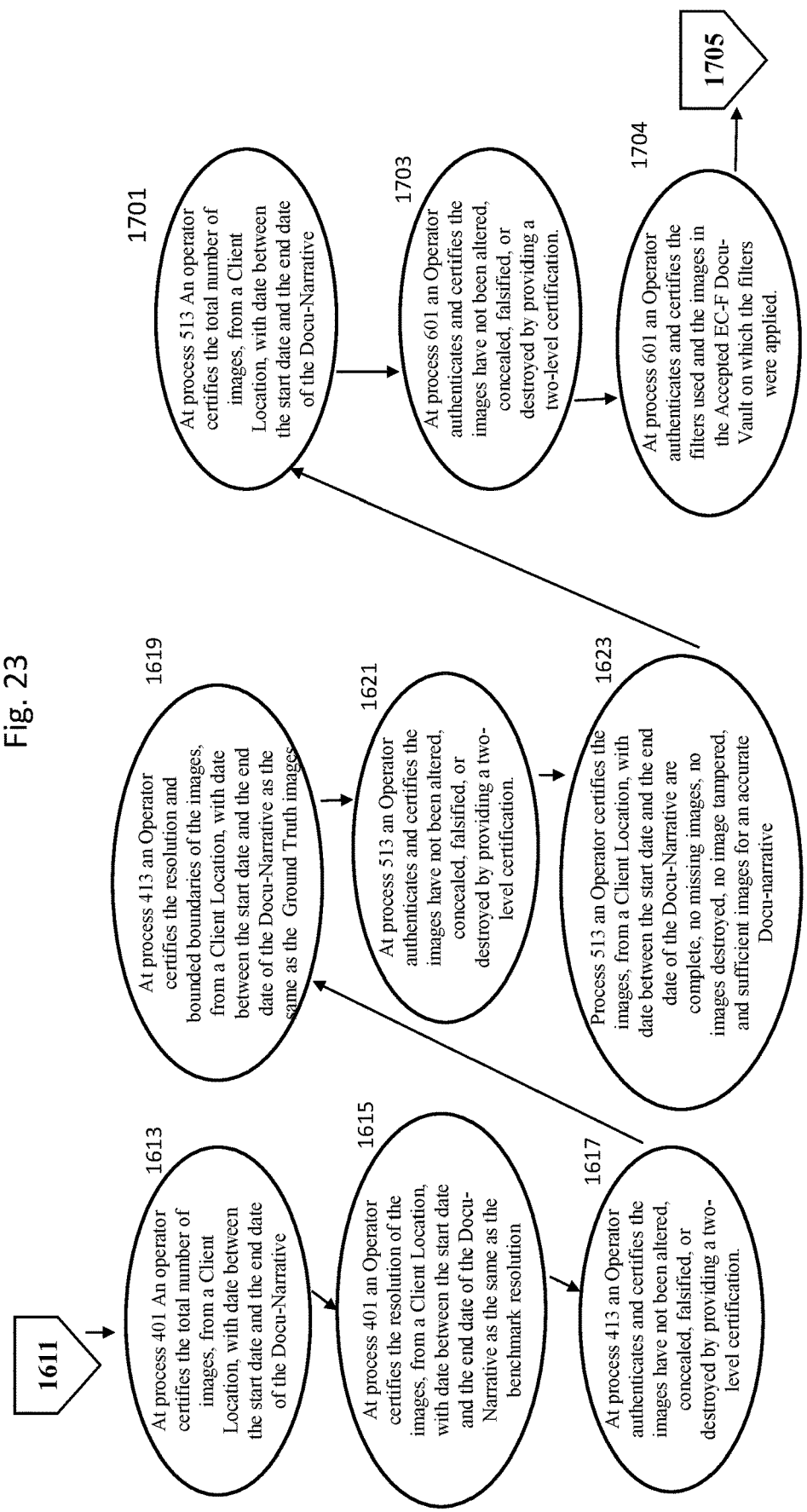

FIG. 23 includes process reference numbers 1613, 1615, 1617, 1619, 1621, 1623, 1701, 1703, and 1704.

Figure 24:
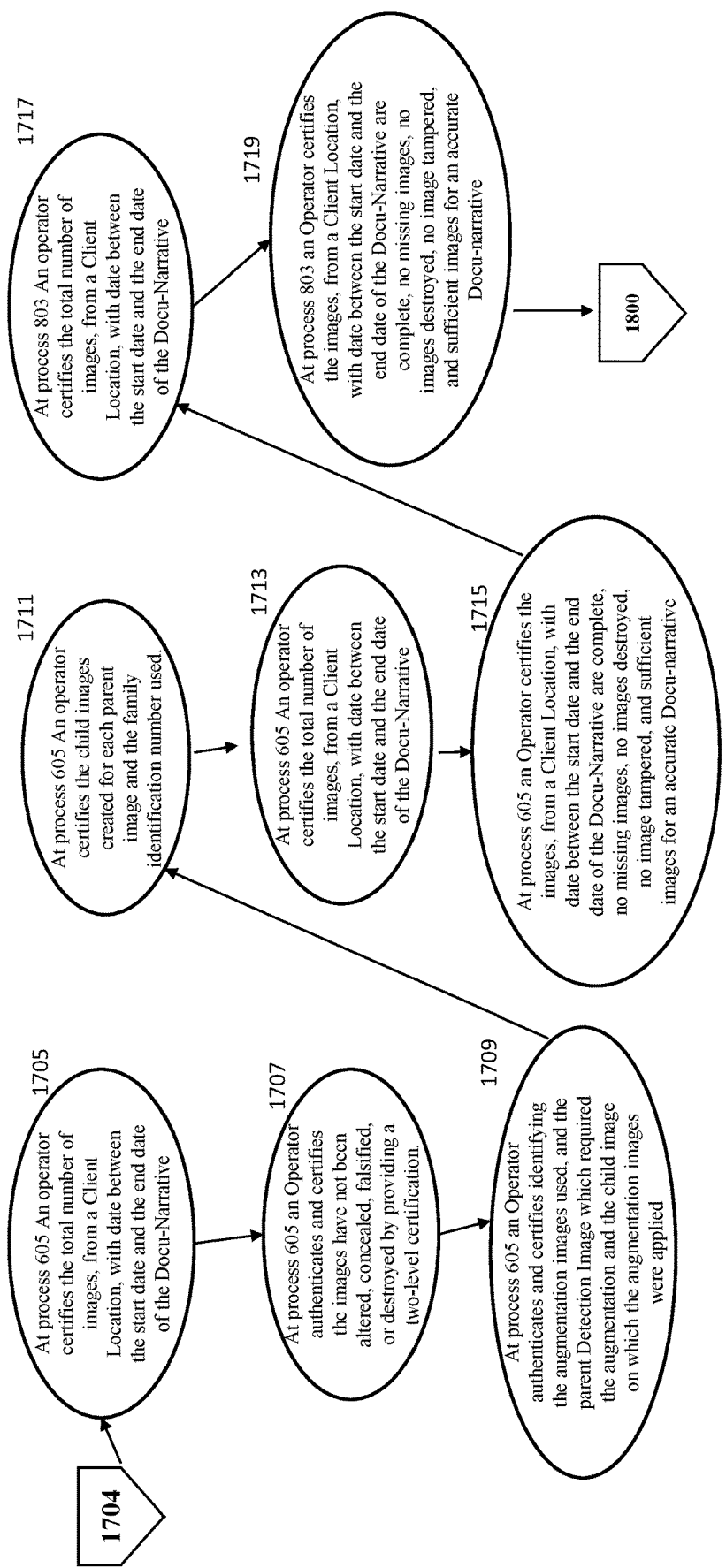
Figure 27:
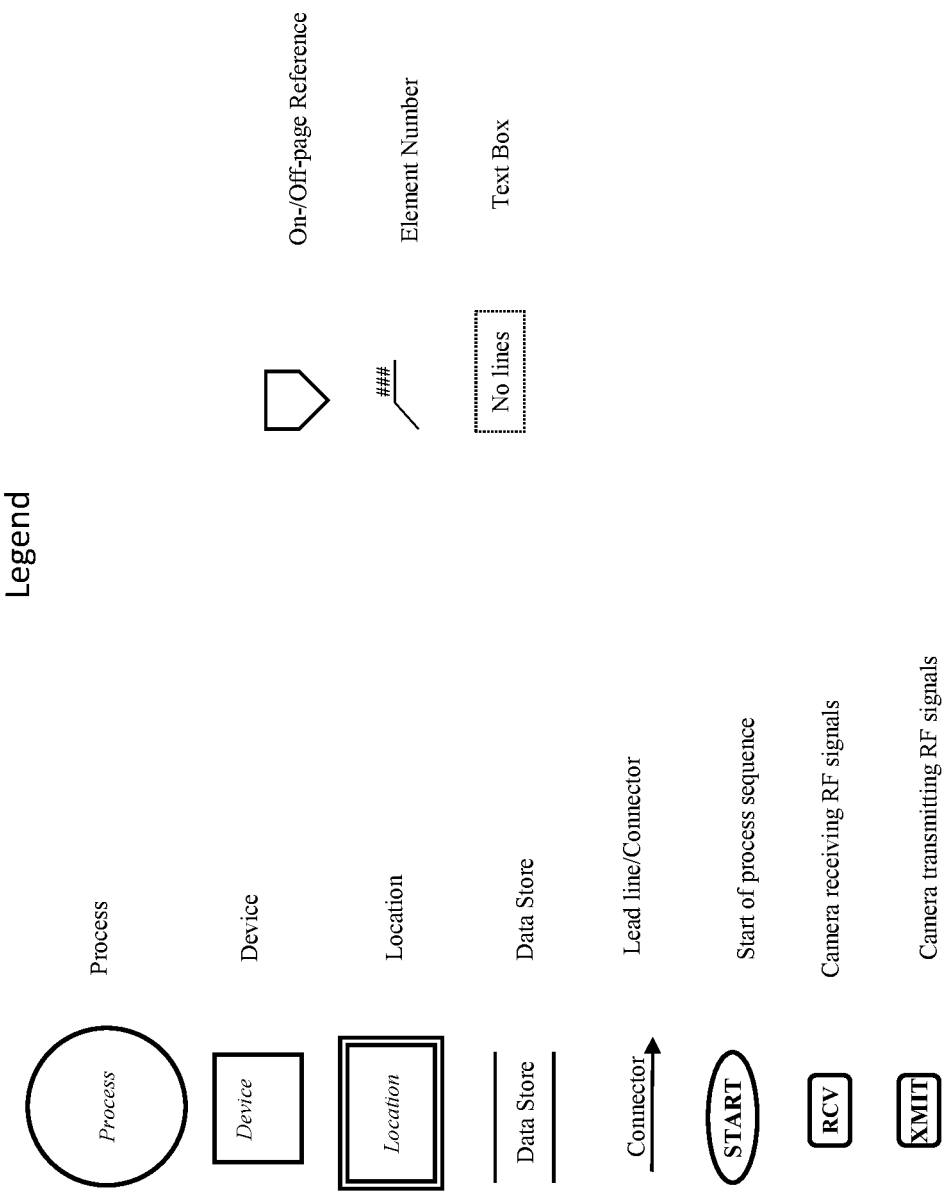
FIG. 27 is a legend illustrating the symbols used in the Figs. of the specification.

FIG. 24 includes process reference numbers 1705, 1707, 1709, 1711,1713, 1715, 1717, and 1719.

FIG. 25 includes process reference numbers 1801, 1803, 1805, 1807, 1809, 1811, and 1813.

FIGS. 26A-26F illustrates the Legend. It includes symbols for a process, a device, a location, a datastore, a lead line or connector, a start of a process, a camera receiving RF signals, a camera transmitting RF signals, on/off page reference, an element number, and a textbox.

EC-F Instruction Set

Each process within the EC-F instruction set 10 is shown generally in FIG. 2 and described in greater detail herein with reference to the process number. The processes include but are not limited to:

A process to select accepted Docu-Vaults for input into EC-F (100). that is process 100 of the EC-F instruction set. A process to perform hardware experiments to optimize images stored in a Docu-Vault for use by EC-F (200). A process to achieve the optimum tensor size for EC-F (300). A process to evaluate images and weight scores for EC-F (400). A process to calculate the map (mean average precision) and determine whether another epoch is required or the epochs can be terminated. (500). An epoch is a process iteration in which one or more values associated with an image are updated.

Images are entered into EC-F for developing and training learning models within EC-F. EC-F is used to achieve, but not limited to achieving, the optimum hardware settings, the optimum tensor size for an image (i.e., image characteristics), evaluation of image weight scores, and calculation of the image mean average precision.

Process 100 to Select Accepted Docu-Vaults for Input into EC-F

Process 100 selects the Docu-Vaults, and the images contained in the Docu-Vaults, which will be used in creating the Docu-Narrative.

Each process within the process 100 is shown generally in FIG. 2 and described in greater detail herein with reference to the process number. The processes include but are not limited to:

A process to select Docu-Vaults for a Docu Narrative of a client location (101). A process for conducting performance tests on Docu-Vaults (103). A process to determine a security assessment for a Docu-Vault (105). A process to input Docu-Vaults into EC-F (115).

Process 101 to Select Docu-Vaults (Images from the Docu-Vaults)

Process 101 is a method to select Docu-Vaults for a Docu-Narrative includes, but is not limited to, the following processes and procedures.

A manager enters the Client Identification and Contact Information, the Client Location Information, Docu-Narrative Request Data and the Docu-Narrative Length of Time on the Client Request Form (FIGS. 6A-6F). A manager authorizes the start date and time and the end date and time of a Docu-Narrative. A manager certifies the start and end date of the Docu-Narrative by signing and approving the Client Request Form (FIGS. 6A-6F).

An operator receives a management-approved Client Request Form (FIGS. 6A-6F), for a Docu-Narrative of the Client's location. An operator reviews the information including but not limited to, the client identification information (121), client location, the type of location, Docu-Narrative start date and time, Docu-Narrative end date and time, location environmental issues, camera identification number and camera type to be used at the location, and any special images required for the client location.

An operator uploads the Client Request Form to the Client Request Form Docu-Vault (123). The Client Request Form is identified with a unique Client Request Form Identification Number. The unique Client Request Form Identification Number incorporates a numeric chronological feature, and a multi-level and hierarchical sequence numbering feature. Using this information, an operator creates a Docu-Vault Specification Form which sets forth the capacity and speed for the Docu-Vault.

An operator queries the Available Docu-Vaults (113) to select Docu-Vaults which meet the requirements in the Docu-Vault Specification Form. The Available Docu-Vaults contains, but is not limited to, images of the Client location, other Client locations, environmental images, and other special images.

Using a unique Available Docu-Vault Identification Number, an operator identifies a Docu-Vault to be used for a Docu-Narrative, among the Available Docu-Vaults.

An operator reviews Docu Vault images for appropriateness, usefulness and value as selected from the Available Docu-Vaults using Docu-Vault Selection Standards contained in the Docu-Vault Specification Form (113).

An operator uses an EarthCam EC-SADN instruction set and an EarthCam procedure to ensure images, from a Client Location, from the start date and time of the Docu-Narrative to the end date and time of the Docu-Narrative have not been altered, concealed, falsified, or destroyed.

An Operator creates a probative Image Chain of Custody Two Level Certification Form (FIGS. 26A-26F). An Operator confirms the Docu-Narrative start and end date and time; confirms the Client identification, confirms the Client Location; confirms the camera location and identification (1600-1601).

An operator authenticates and certifies the image chain of custody for the images, from a client location, with an image creation date between the start date and time of the Docu- Narrative and the end date and time of the Docu-Narrative. Operator authenticates and certifies the images have not been altered, concealed, falsified, or destroyed by providing a two-level certification using a probative Image Chain of Custody Two Level Certification Form (FIG. 26A-26F and processes 1600-1603.

An operator certifies the total number of images, from a Client Location, with an image creation date between the start date and time of the Docu-Narrative and the end date and time of the Docu-Narrative to establish the total number of images for the image chain of custody using a probative Image Chain of Custody Two Level Certification Form (FIGS. 26A-26F and processes 1600-1605.

An operator creates a two-level certification that the images in the Accepted EC-F Docu-Vault for the Client Location with an image creation date between Docu-Narrative start date and time and the Docu-Narrative end date and time are complete, there are no missing images, no images were destroyed, no image was tampered, and there were sufficient images to create an accurate Docu-Narrative using a probative Image Chain of Custody Two Level Certification Form (FIGS. 26A-26F and processes 1600-1606.

An operator logs and certifies the selected Docu-Vault images that are associated with the Client Location with an image creation date between Docu-Narrative start date and time and the Docu-Narrative end date and time using a probative Image Chain of Custody Two Level Certification Form (FIGS. 26A-26F and processes 1600-1607.

An operator calculates the total number of images, from a Client Location, with an image creation date between the start date and time of the Docu-Narrative and the end date and time of the Docu-Narrative to be able to estimate the volume of images which must be processed and time for processing. The total number of images to be used in the Docu-Narrative, (i.e., 30,000, 100,000, 1,000,000), provides an operator with an estimate of the Docu-Vault size, capacity and speed.

An operator reviews the images in the Images for Input into EC-F Docu-Vault (400-409). Such images to be used in subsequent EC-F processes.

An operator authenticates, reviews the images for environmental conditions including but not limited to fog, heat distortion, rain, snow, and humidity.

An operator reviews the images, from the Client Location, with an image creation date between the start date and time of the Docu-Narrative and the end date and time of the Docu-Narrative, for time-of-day lighting conditions.

An operator reviews the Client Request Form 123 in FIGS. 6A-6F for the requirement for the length of viewing time for the Docu-Narrative to determine if the length of viewing time fits the Client's request for the Docu-Narrative length of time.

An operator determines the minimum and maximum number of images needed to satisfy the Client's requirement for the length of viewing time for the Docu-Narrative and still maintain the forensic integrity and the entirety of the Image Chain of Custody for the Docu-Narrative.

An operator determines the frame factor for the Docu-Narrative considering, but not limited to environmental conditions, time of day, the time of activity at the Client Location, type of hardware, and image resolution. An operator determines the frame rate and still maintains the forensic integrity and the entirety of the Image Chain of Custody for the Docu-Narrative. Frame Rate is the frequency or rate at which consecutive images are displayed. The frame rate impacts the style and realistic viewing experience of a Docu-Narrative.

An operator copies the selected Docu-Vaults from the Available Docu-Vault to the Selected Docu-Vault Candidates Docu-Vault (107). The image Docu-Vaults copied to the Selected Docu-Vault Candidates Docu-Vault are identified with a unique Selected Docu-Vault Candidates Identification Number.

The unique Selected Docu-Vault Candidates Identification Number incorporates a numeric chronological feature, and a multi-level and hierarchical sequence numbering feature.

An operator updates the Client Request Form (FIGS. 6A-6F) to indicate the Selected Docu-Vault Candidates have been selected and the selection process is completed.

Process 103 for Conducting Performance Tests on the Docu-Vault Images

The process to apply Docu-Vault performance tests on the selected Docu-Vaults includes, but is not limited to, the following.

An operator receives the Client Request Form (FIGS. 6A-6F) indicating the Docu-Vault selection process is complete and the Selected Docu-Vault Candidates are in the Docu Vault Candidates Docu-Vault and ready for Docu-Vault Performance Testing.

An operator reviews the Docu-Vault Selection Standards contained the Docu-Vault Specification Form. The Docu-Vault Selection Standards provide a general guide for establishing a testing sequence for an image batch to be used in a Docu-Narrative. Using the Docu-Vault Selection Standards as a guide, an operator establishes a testing sequence for the Selected Docu-Vault Candidates. Additionally, an operator creates Performance Test Criteria for each test in the testing sequence. An operator updates Performance Test Criteria Docu-Vault (117) with the testing sequence, and the Performance Test Criteria for each test and for each Selected Docu-Vault Candidate.

An operator establishes a Docu-Vault Performance Test Rubric, rules, and algorithm for determining if the Selected Docu-Vault Candidate passed the Performance Test. An operator updates the Performance Test Criteria Docu-Vault with the Docu-Vault Performance Test Score. The rubric may be metric, digital, subjective or any combination. The rubric, rules, algorithm provide an operator with a method for grading the outcome of algorithm for determining if the Selected Docu-Vault Candidate passed a Performance Test and determining if a Docu-Vault Performance Test Score is acceptable. An operator uses a value of 10, but not limited to 10 to indicate a score which is acceptable. An operator uses a value of 1, but not limited to 1 to indicate a score which is not adequate. An operator updates the Performance Test Criteria Docu-Vault with the grade for the outcome for determining if the Selected Docu-Vault Candidate passed the Performance Test.

An operator updates the Client Request Form (FIGS. 6A-6F) with the rubric score and certifies the score.

An operator updates the Client Request Form to indicate the Docu-Vault Performance Tests on the Selected Docu-Vault Candidates have been completed and have been input to the Accepted Test DV Docu-Vault.

Process 105 for Conducting Docu-Vault Security Assessment

The process to complete the security assessment of a Docu-Vault includes, but is not limited to, the following.

An operator receives the Client Request Form (FIGS. 6A-6F) indicating the Docu-Vault performance testing process is complete and the Accepted Test Docu-Vaults (109) are ready for the Docu-Vault Security Assessment.

An operator reviews the Docu-Vault Performance Test scores for each Accepted Test Docu-Vault.

An operator accesses the Security Requirements & Criteria Docu-Vault to retrieve the security requirements and criteria guides for an Accepted Test Docu-Vault. The security requirements and criteria guides may include, but are not limited to, Client name, Client identification, Client location identification, Docu-Narrative start date and time, Docu-Narrative end date and time, camera identification, operator identification, start image sequence number, end image sequence number, and total number of images. An Operator creates the requirements and criteria for the security assessment of each Accepted Test Docu-Vault and stores the requirements and criteria in the Security Requirements & Criteria Docu-Vault. Using the Security Requirements & Criteria Docu-Vault, an operator retrieves the security requirements and criteria for the Accepted Test Docu-Vault and establishes a sequence for executing the security assessments.

An operator establishes a Docu-Vault Security Assessment Rubric, rules, and algorithm for determining the security assessment of an Accepted Test Docu-Vault. An operator updates the Accepted Test Docu-Vault with a Docu-Vault Security Assessment Score. The rubric may be metric, digital, subjective or any combination. The rubric, rules, algorithm provide an operator with a method for grading the outcome for determining the security assessment of an Accepted Test Docu-Vault and determining if a Docu-Vault Security Assessment Score is acceptable. An operator uses a value of 10, but not limited to 10 to indicate a score which is acceptable. An operator uses a value of 1, but not limited to 1 to indicate a score which is not adequate. An operator updates the Accepted Test Docu-Vault with the grade for the outcome for determining the security assessment of an Accepted Test Docu-Vault.

An operator updates the Client Request Form (FIGS. 6A-6F) with the rubric score and certifies the score.

An operator copies the Accepted Test Docu-Vaults with an acceptable Docu-Vault Security Assessment Score from the Accepted Test Docu-Vaults into the Accepted EC-F Docu-Vaults (125).

An operator updates the Client Request Form to indicate the Docu-Vault Security Assessment Score on the Selected Docu-Vault Candidates have been completed.

Process 115 for Input the Docu-Vaults into EC-F

The process for an operator to assess the Docu-Vault Selection Process is complete.

An operator receives the Client Request Form (FIGS. 6A-6F) indicating the Docu-Vault Security Assessment process is complete, and the Accepted EC-F Docu-Vaults (125) are ready for input into EC-F.

An operator copies the Docu-Vaults with an acceptable Docu-Vault Security Assessment Score from the Accepted EC-F Docu-Vaults into EC-F.

An operator updates the Client Request Form to indicate the Libraries in the Accepted EC-F Docu-Vaults have been input to EC-F (10).

Process 200 to Perform Hardware Experiments to Optimize Docu-Vault Images for EC-F See FIG. 7. Each process is shown generally in FIG. 7 and described in greater detail herein with reference to the process number. The process including, but not limited to, acquiring hardware specifications (201), hardware characteristics (207), test cases (211) and applying them to Docu-Vault test images (215); A process to acquire hardware characteristics (205); A process to develop hardware test cases (209); A process to select a hardware test case for use with a Docu-Vault (213); A process to apply the hardware test case results to hardware settings 219); and a process to enter hardware settings into EC-F (221).

Process 201 to Acquire Hardware Specifications

The process to acquire the hardware specifications for a Docu-Vault includes, but is not limited to, the following.

An operator receives the Client Request Form (FIGS. 6A-6F) indicating the Libraries in the Accepted EC-F Docu-Vaults that have been input to EC-F (10) and requirements to acquire the hardware specifications for the hardware associated with the Client location and other hardware associated with the Client project.

An operator accesses the Hardware Inventory (223) and retrieves the identifying information for the hardware associated with the Client location and other hardware associated with the Client project.

An operator updates the Client Request Form (FIGS. 6A-6F) with the identifying information for the hardware associated with the Client location and other hardware associated with the Client project, using the identifying information associated with the hardware related to the Client.

An operator retrieves the required hardware specifications from the hardware datasheets, manuals, and factsheets. The hardware specifications are uploaded to the Hardware Specifications Docu-Vault (203) using a unique hardware identification number. The hardware specifications describe the specific features and components of the hardware.

An operator updates the Client Request Form (FIGS. 6A-6F) to indicate the Hardware Specifications for the hardware associated with the Client project have been input to the Hardware Specifications Docu-Vault.

Process 207 to Acquire Hardware Characteristics.

The process to acquire photographic and computing hardware characteristics for a Docu-Vault including, but not limited to, the following.

An operator receives the Client Request Form (FIGS. 6A-6F) indicating that the Hardware Specifications associated with the Client project have been input to the Hardware Specifications Docu-Vault and there is a need to create Hardware Characteristics related to the Hardware Specifications. Hardware characteristics describe aspects of the hardware specifications, including but not limited to capacity, speed, and mean time between failure.

An operator uploads the Hardware Characteristics describing the hardware associated with the Client project to the Hardware Characteristics Docu-Vault (205).

An operator updates the Client Request Form to indicate the Hardware Characteristics, for the hardware associated with the Client project, have been input to the Hardware Characteristics Docu-Vault.

Process 211 to Develop Hardware Test Cases

An operator receives the Client Request Form (FIGS. 6A-6F) indicating Hardware Characteristics associated with the hardware for the Client project have been input to the Hardware Characteristics Docu-Vault (205) and there is now a need to create Hardware Test Cases related to the Hardware Characteristics.

An operator reviews the images of the Accepted EC-F Docu-Vaults in the Accepted EC-F Docu-Vaults Docu-Vault (125). The hardware characteristics can affect the performance for how an operator may view the image files. The hardware characteristics can affect the performance for processing a test case. An operator selects the hardware characteristics which allows for rapid test case processing and image viewing.

An operator reviews the images in the Accepted EC-F Docu-Vaults for issues including, but not limited to, quality, resolution, environmental issues, and appropriateness. An operator determines if a change in hardware characteristics is necessary. If a change is necessary, an operator uploads a new set of hardware characteristics to the Hardware Characteristics Docu-Vault (205) and reviews the images and test case processing, again.

An operator reviews conditions including, but not limited to, the number of images in a Docu-Vault, the size of the individual images and the total size of the images in all Docu-Vaults needed to complete a Docu-Narrative including, but not limited to, an Accepted EC-F Docu-Vault.

An operator establishes a Hardware Test Case Rubric, rules, and algorithm for determining if a change in hardware characteristics is necessary. An operator updates the Hardware Characteristics Docu-Vault with a Hardware Test Case Score. The rubric may be metric, digital, subjective or any combination. The rubric, rules, algorithm provide an operator with a method for grading the outcome of the for determining if a change in hardware characteristics is necessary and determining if a Hardware Test Case Score is acceptable. An operator uses a value of 10, but not limited to 10 to indicate a score which is acceptable. An operator uses a value of 1, but not limited to 1, to indicate a score which is not adequate. An operator updates the Hardware Characteristics Docu-Vault with the grade for the outcome for determining if a change in hardware characteristics is necessary. An operator updates the Client Request Form (FIGS. 6A-6F) with the rubric score and certifies the score.

An operator develops multiple image Docu-Vault test sets to determine the hardware characteristics to process the images for a Docu-Narrative. but for use in a hardware test case. An image Docu-Vault test case includes images which an operator judges to be a representative sample of the total population of images included in a Docu-Vault of images related to a client identification, client location identification, Docu-Narrative start date and time, and Docu-Narrative stop date.

An operator will select images for the image Docu-Vault test set which approximate, but are not limited to, type of client, type of client location, type of client location activity, type camera used at client location, type of hardware used at client location, type of client location environment, image resolution, length of Docu-Narrative, size of client location image Docu-Vault.

An operator may use an image Docu-Vault test set as a benchmark for a Docu-Vault of images related to a client identification, client location identification, Docu-Narrative start date and time, and Docu-Narrative stop date.

An operator will select images from several image test Docu-Vaults and use them in tests with the hardware related to a client, client location identification, Docu-Narrative start date and time, and Docu-Narrative stop date.

An operator produces a benchmark resolution and focus image.

An operator uses a resolution and focus device 41 in FIG. 19 for determining the camera settings to set the benchmark resolution for the camera used at the Client Location. Such resolution and focus device is appropriate to the ground truth average body size of vehicles generally found at construction and civil engineering sites. Such device includes an image graphic chart which is similar in size to the average size of a vehicle body generally found at construction and civil engineering sites. The EarthCam resolution and focus device is used to create the Benchmark Image for the Client Location. The proprietary EarthCam resolution and focus device also provides the metrics to judge the resolution of images taken at the Client Location.

An operator stores the Benchmark Resolution and focus Image in the Hardware Settings Docu-Vault (219).

Several image Docu-Vaults test cases are used to determine the optimum hardware configuration for a Docu-Narrative test case before the Docu-Narrative is produced.

An operator updates the Client Request Form (FIGS. 6A-6F) with the Hardware Test Case rubric, rules, and algorithm and the Hardware Test Case Score. The rubric may be metric, digital, subjective or any combination as required by the issues and conditions, identified by an operator, with the images in an Accepted EC-F Docu-Vault. The rubric, rules, and algorithm provide an operator with a method for grading the outcome of the Hardware Test Case analysis and determining if an Accepted EC-F Docu-Vault is acceptable for use in a Hardware Test Case. An operator updates the Hardware Test Case Form with the Accepted EC-F Docu-Vaults and with the Hardware Test Case Score for each image issue and condition.

An operator accesses the Hardware Characteristics Docu-Vault (205) and retrieves Hardware Characteristics of the hardware associated with the Client location. As required by the Hardware Test Case Score, an operator also retrieves the hardware characteristics of hardware not currently associated the Client location but considered useful by an operator.

An operator completes a Hardware Test Case form and creates a Hardware Test Case. The form includes, but is not limited to, The Accepted EC-F Docu-Vault identification number, the Hardware Test Case rubric, rules, and algorithm and the Hardware Test Case Score, the Hardware identification numbers, the Hardware Test Case identification number. The Hardware Test Case Form is identified with a unique Hardware Test Case Form Identification Number. The unique The Hardware Test Case Form Identification Number incorporates a numeric chronological feature, and a multi-level and hierarchical sequence numbering feature Process 213 to Select a Hardware Test Case for Use on a Docu-Vault An operator receives the Client Request Form (FIGS. 6A-6F) indicating that the Hardware Test Cases associated with the Client project have been input to the Hardware Test Case Docu-Vault (209) and there is a need to select a Hardware Test Case for use with an image Docu-Vault.

An operator accesses the Hardware Test Case Docu-Vault and retrieves all the Hardware Test Cases associated with the Client location. An operator reviews the information in the Hardware Test Case Form including, but not limited to, the Hardware Test Case score, the Hardware Test Case rubric, rules, algorithm, hardware characteristics, hardware specifications, Docu-Vault image issues, and Docu-Vault conditions.

An operator evaluates the information in Hardware Test Case Forms, that is all the Hardware Test Case Forms associated with the Client location. An operator prioritizes the Hardware Test Case Forms based on the Hardware Test Case Rubric, rules, and algorithm and the Hardware Test Case Score.

The test case which may produce the fastest processing time with the most consistent images receives the highest test run value. The test case which may produce the slowest processing time with the least consistent images receives the lowest test run value. The rubric may be metric, digital, subjective or any combination as required by the issues and conditions, identified by an operator, with the images in an Accepted EC-F Docu-Vault.

An operator applies a test run priority number to the Hardware Test Case Forms to indicate the sequence in which the Hardware Test Cases will be used with a Docu-Vault.

An operator inputs the test run priority number to the Hardware Test Case Forms.

Process 215 to Apply a Hardware Test Case to a Docu-Vault

An operator receives the Client Request Form (FIGS. 6A-6F) indicating the Accepted EC-F Docu-Vaults associated with the Client project have been prioritized and there is a requirement to run the Hardware Test Cases with the Accepted EC-F Docu-Vaults (125) associated with the Client Location.

An operator selects the Hardware Test Case with the highest priority.

An operator runs the Hardware Test Case with each of the Accepted EC-F Docu-Vaults associated with the Client Location. The Hardware Test Case results are input to the Hardware Test Case Form and uploaded to the Hardware Test Cases Docu-Vault (209).

An operator evaluates the information in Hardware Test Case Form for the test results for all the forms associated with the Client location.

An operator establishes an Apply a Hardware Test Case Rubric, rules, and algorithm for determining the test case that is to be used for the Hardware Setting for EC-F. An operator updates the Hardware Test Cases Data-Vault with an Apply a Hardware Test Case Score. The rubric may be metric, digital, subjective or any combination. The rubric, rules, algorithm provide an operator with a method for grading the outcome for determining the test case that is to be used for a Hardware Setting for EC-F. and determining if an Apply a Hardware Test Case Score is acceptable. An operator uses a value of 10, but not limited to 10 to indicate a score which is acceptable. An operator uses a value of 1, but not limited to 1 to indicate a score which is not adequate. An operator updates the Hardware Test Cases Data-Vault with the grade for the outcome of the for determining the test case that is to be used for the Hardware Setting for EC-F.

An operator updates the Client Request Form (FIGS. 6A-6F) with the rubric score and certifies the score.

An operator uses the Hardware Test Case Identification Number to select the Hardware Test Case to be used for EC-F.

An operator indicates on the Hardware Test Case Form the test case that is to be used for the Hardware Setting for EC-F.

An operator identifies, on Client Request Form (FIGS. 6A-6F), the Hardware Test Case and Hardware Test Case Identification Number to be used for the Hardware Settings for EC-F.

Process 217 to Apply the Hardware Test Case Results to Hardware Settings

An operator receives the Client Request Form (FIGS. 6A-6F) indicating the Hardware Test Case, Hardware Test Case Identification Number, and Hardware Settings associated with the Accepted EC-F Docu-Vaults in the Accepted EC-F Docu-Vaults (125) associated with the Client Location.

An operator accesses the Hardware Test Case Docu-Vault (209) and retrieves the Hardware Test Case identified on the Client Request Form (FIGS. 6A-6F) as the test case to be used with EC-F (10).

An operator inputs the Hardware Settings, from the Hardware Test Case, into a Hardware Settings Form, stored on the Hardware Settings Docu-Vault (219). The Hardware Setting Form is identified with a unique Hardware Setting Form Identification Number. The unique The Hardware Setting Form Identification Number incorporates a numeric chronological feature, and a multi-level and hierarchical sequence numbering feature.

An operator time stamps the Client Request Form (FIGS. 6A-6F), with the date and time the Hardware Settings Form was uploaded to the Hardware Settings Docu-Vault.

Process 221 to Enter the Hardware Settings into EC-F

An operator receives the Client Request Form (FIGS. 6A-6F) indicating the Hardware Settings Form, Hardware Settings Form Identification Number for use with EC-F. An operator retrieves the Hardware Settings Form using the Hardware Settings Identification Number from the Hardware Settings Docu-Vault (219).

An operator accesses EC-F (10) and opens the EC-F Hardware Settings Form.

An operator identifies the Hardware Settings included in the Hardware Settings Form and enters the hardware settings into the EC-F Hardware Settings Form.

An operator time stamps the Client Request Form (FIGS. 6A-6F), with the date and time the hardware settings from the Hardware Settings Form were entered into the EC-F hardware settings form.

Process 300 to Achieve the Optimum Tensor Size for EC-F

See FIG. 8. Each process is shown generally in FIG. 8 and described in greater detail herein with reference to the process number. The processes include but are not limited to the following. A process to determine image value information and the number of images in a batch in EC-F, (301). A process to determine number of color channels in images for EC-F, (303). A process to determine width and height of an images for EC-F, (305).

Process 301 to Determine the Number of Images in a Batch in EC-F

An operator receives the Client Request Form (FIGS. 6A-6F) indicating the date and time the hardware settings from the Hardware Settings Form were entered into the EC-F (10) hardware settings form. An operator accesses the Hardware Test Case Docu-Vault (200-209) and retrieves the Hardware Test Case identified on the Client Request Form (FIGS. 6A-6F) as the test case to be used with EC-F (10). An operator identifies the images in the Accepted EC-F Docu-Vaults (125) associated with the Client Location and to be used in optimizing the Tensor size for EC-F.

A tensor is an 'N' dimensional array to be used for arbitrary numeric computation. It is a central data structure and a grid of values containing information about the data values, how to locate an element, and how to interpret an element. It has a grid of elements that can be indexed in various ways.

An operator accesses the Accepted EC-F Docu-Vault. An operator counts the number of image files in the Accepted EC-F Docu-Vault and uploads the number of image files in the Docu-Vault to the EC-F tensor settings. The number of image files in the Accepted EC-F Docu-Vault is entered into the 'N' Tensor value for the EC-F tensor settings. An operator time stamps the Client Request Form (FIGS. 6A-6F), with the date and time for the 'N' Tensor value for the EC-F tensor settings.

Process 303 to Determine Number of Color Channels in Images for EC-F

An operator receives Client Request Form (FIGS. 6A-6F), with the date and time the 'N' Tensor settings were entered into the EC-F Tensor Settings Form. An operator accesses the Hardware Test Case Docu-Vault (209) and retrieves the Hardware Test Case identified on the Client Request Form (FIGS. 6A-6F) as the test case to be used with EC-F (10). An operator identifies the Accepted EC-F images in the Accepted EC-F Docu-Vaults (100-125) associated with the Client Location and to be used in determining the number of color channels for EC-F.

Color channels include, but are not limited to RGB 3, BGR 3, HSV 3, and CMYK 4. An operator accesses the Accepted EC-F Docu-Vault. An operator reviews the image files in the Accepted EC-F Docu-Vault and determines if 1, 3 or 4 color channels are appropriate for the image files in the Docu-Vault. An operator uploads the number of color channels in the Accepted EC-F Docu-Vault into the Tensor color channel value for the EC-F tensor settings. An operator time stamps the Client Request Form (FIGS. 6A-6F), with the date and time the number of color channels were entered into the EC-F Tensor settings form.

Process 305 to Determine Width and Height of an Images for Use with EC-F

An operator receives Client Request Form (FIGS. 6A-6F) with the date and time the number of color channels were entered into the EC-F Tensor settings form. An operator identifies the Accepted EC-F Docu-Vault in the Accepted EC-F Docu-Vaults (125) associated with the Client Location and to be used in determining the height and width of images for EC-F. An operator accesses the Accepted EC-F Docu-Vault. An operator uses an iterative image height and iterative image width determination model to determine the optimum image pixel height and pixel width for the images in the Accepted EC-F Docu-Vaults.

An operator establishes a Determine Width and Height of an Image Rubric, rules, and algorithm for determining the optimum image pixel height and pixel width for the images in the Accepted EC-F Docu-Vault. An operator updates the Accepted EC-F Docu-Vault with a Determine Width and Height of an Image Score. The rubric may be metric, digital, subjective or any combination. The rubric, rules, algorithm provide an operator with a method for grading the outcome for determining the optimum image pixel height and pixel width for the images in the Accepted EC-F Docu-Vault and determining if an Accepted EC-F Docu-Vault is acceptable. An operator uses a value of 10, but not limited to 10 to indicate a score which is acceptable. An operator uses a value of 1, but not limited to 1 to indicate a score which is not adequate. An operator updates the Accepted EC-F Docu-Vault with the grade for the outcome for determining the optimum image pixel height and pixel width for the images in the Accepted EC-F Docu-Vault.

An operator updates the Client Request Form (FIGS. 6A-6F) with the rubric score and certifies the score.

An operator uploads the number of pixels for the image height and width in the Accepted EC-F Docu-Vault. An operator enters the number of pixels for the height in the 'H' value of the Tensor settings and the number of pixels in the 'W' value of the Tensor settings. An operator time stamps the Client Request Form (FIGS. 6A-6F), with the date and time the number of pixels were entered into height and width values in the EC-F Tensor settings form.

Process 400 to Evaluate Images and Weight Scores for EC-F

See FIG. 9. The process 400 includes the following. A process to provide image value information and select images to input into EC-F. A process 401 to select images not input into EC-F. A process 411 to input images into EC-F. A process 407 to have EC-F do artifact object detection for images NOT input into EC-F. An image artifact is any feature which appears in an image which is not present in the original imaged object. A process 415 to acquire ground truth images. A process 413 to compare detection images with Ground Truth Images. A 421 process to determine if another Epoch is required. An epoch is a process iteration in which all values, but not limited to all values, are updated.

Process 401 to Select Images for Input into EC-F

An operator receives Client Request Form (FIGS. 6A-6F) with the date and time the number of pixels were entered into height and width values in the EC-F Tensor settings form. An operator identifies the Accepted EC-F Docu-Vault in the Accepted EC-F Docu-Vaults (125) associated with the Client Location and to be used for selecting the images to be input into EC-F. An operator retrieves the Docu-Narrative start date and time and the Docu-Narrative end date and time from the Client Request Form. An operator retrieves the images in the Accepted EC-F Docu-Vault located in the Accepted EC-F Docu-Vaults associated with the Client Location with an image creation date between Docu-Narrative start date and time and the Docu-Narrative end date and time.

An operator reviews the images in the Accepted EC-F Docu-Vault for issues including, but not limited to, quality, resolution, environmental issues, and appropriateness, image not useful because of camera malfunctions, incorrect camera focal point, insufficient pixels per inch, insufficient dots per inch, and an inappropriate change in resolution. An operator checks for, but not limited in checking for, camera manufacturer camera model, camera orientation (rotation), camera firmware, date and time, YCbCr positioning, compression, X resolution, Y resolution, resolution unit, exposure time, F-number, exposure program, Exif version, date and time (original), date and time (digitized), components configuration, compressed bits per pixel, exposure bias, maximum aperture value, metering mode, flash, focal length, maker note, FlashPix version, color space, pixel X dimension, pixel Y dimension, file source, interoperability index, and interoperability version. An operator uses a value of 10, but not limited to 10 to indicate a high number of issues. An operator uses a value of 1, but not limited to 1 to indicate a low number of issues. The value is entered into the Image for Input to EC-F rubric and algorithm.

Additionally, an operator reviews the images for conditions including, but not limited to, the number of images in a Docu-Vault, the size of the individual images and the byte size of the image Docu-Vault.

An operator uses a value of 10, but not limited to 10 to indicate a high number of images and a large Docu-Vault byte size. An operator uses a value of 1, but not limited to 1 to indicate a small number of images and a small Docu-Vault byte size. The value is entered into the Image for Input to EC-F rubric and algorithm.

An operator uses a value of 10, but not limited to 10 to indicate a high number of images have been altered, concealed, falsified, or destroyed. An operator uses a value of 1, but not limited to 1 to indicate a no images have been altered, concealed, falsified, or destroyed. The value is entered into the Image for Input to EC-F rubric and algorithm.

An operator reviews the resolution of the images from the Accepted EC-F Docu-Vault to verify the resolution for each image is equivalent to the benchmark resolution from the Hardware Settings Docu-Vault (219). An operator uses an algorithm to calculate the resolution ratio between the Accepted EC-F Docu-Vault image and the standard resolution in the Hardware Settings Docu-Vault (219) An operator uses a value of 10, but not limited to 10 to indicate a high-resolution equivalency. An operator uses a value of 1, but not limited to 1 to indicate a low-resolution equivalency. The value is entered into the Image for Input to EC-F rubric and algorithm.

An operator establishes an Accepted EC-F Docu-Vault With The Images For Input To EC-F Rubric, rules, and algorithm for determining the Images for Input to EC-F Score for images in an Accepted EC-F Docu-Vault. An operator updates the Accepted EC-F Docu-Vault with an Accepted EC-F Docu-Vault with the Images For Input To EC-F Score. The rubric may be metric, digital, subjective or any combination. The rubric, rules, algorithm provide an operator with a method for grading the outcome for determining the Images For Input To EC-F Score for images in an Accepted EC-F Docu-Vault and determining if an Accepted EC-F Docu-Vault with the Images For Input To EC-F Score is acceptable. An operator uses a value of 10, but not limited to 10 to indicate a score which is acceptable. An operator uses a value of 1, but not limited to 1 to indicate a score which is not adequate. An operator updates the Accepted EC-F Docu-Vault with the grade for the outcome for determining the Images For Input To EC-F Score for images in an Accepted EC-F Docu-Vault.

An operator updates the Client Request Form (FIGS. 6A-6F) with the rubric score and certifies the score.

An operator copies the image with an acceptable Images For Input To EC-F score to the Images for Input to EC-F Docu-Vault (409).

The image copied to the Images for Input to EC-F Docu-Vault are identified with a unique Identification Number. The unique Identification Number incorporates a numeric chronological feature, and a multi-level and hierarchical sequence numbering feature.

An operator time stamps the Client Request Form (FIGS. 6A-6F), with the date and time the acceptable images were copied to the Images for Input to EC-F Docu-Vault.

An operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification using a probative Image Chain of Custody Two Level Certification Form (FIGS. 26A-26F and processes 1600-1609.

An operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification using a probative Image Chain of Custody Two Level Certification Form (FIGS. 26A-26F and processes 1600-1611).

An operator certifies the total number of images, from a Client Location, with date between the start date and the end date of the Docu-Narrative using a probative Image Chain of Custody Two Level Certification Form (FIGS. 26A-26F and processes 1600-1613).

An operator certifies, with a two-level certification, the resolution of the images in Docu-Narrative from the start date and time and the Docu-Narrative end date and time is equivalent to the benchmark resolution from the Hardware Settings Docu-Vault (219) using a probative Image Chain of Custody Two Level Certification Form (FIGS. 26A-26F and processes 1600-1615).

Process 403 to Select Images not Input into EC-F

An operator receives Client Request Form (FIGS. 6A-6F) with the date and time the acceptable images were copied to the Images for Input to EC-F Docu-Vault (409). An operator identifies the Accepted EC-F Docu-Vault in the Accepted EC-F Docu-Vaults Docu-Vault (125) associated with the Client Location and to be used for selecting the images NOT to be input into EC-F. An operator retrieves the Docu-Narrative start date and time and the Docu-Narrative end date and time from the Client Request Form (FIGS. 6A-6F). An operator retrieves the images in the Accepted EC-F Docu-Vault, located in Accepted EC-F Docu-Vaults, associated with the Client Location with an image creation date between Docu-Narrative start date and time and the Docu-Narrative end date and time. An operator reviews the images in the Accepted EC-F Docu-Vault and identifies the images with an Images for Input to EC-F Score which is NOT acceptable based on the an Images For Input To EC-F Rubric and algorithm. A value of 1, but not limited to 1 to indicates an image which is NOT acceptable. An operator copies the image with a NOT acceptable Images For Input To Ec-F Score to the Images NOT Input to EC-F Docu-Vault (405). The image copied to the Images NOT Input to EC-F Docu-Vault are identified with a unique Identification Number. The unique Identification Number incorporates a numeric chronological feature, and a multi-level and hierarchical sequence numbering feature. An operator time stamps the Client Request Form (FIGS. 6A-6F), with the date and time the NOT acceptable images were copied to the Images NOT Input to EC-F Docu-Vault.

Process 411 to Input Images into EC-F

An operator receives Client Request Form (FIGS. 6A-6F) with the date and time with the date and time when the acceptable images were copied to the Images for Input to EC-F Docu-Vault. An operator uploads the images from the Images for Input to EC-F Docu-Vault (409) into EC-F (10). An operator time stamps the Client Request Form (FIGS. 6A-6F), with the date and time when the acceptable images, from the Images for Input to EC-F Docu-Vault (409), were uploaded into EC-F (10).

Process 407 to have EC-F do Artifact Object Detection for Images NOT to be Input into EC-F An operator receives Client Request Form (FIGS. 6A-6F) with the date and time the NOT acceptable images were copied to the Images NOT Input to EC-F Docu-Vault (405). An operator retrieves the Docu-Narrative start date and time and the Docu-Narrative end date and time from the Client Request Form. An operator retrieves the images in the Images NOT Input to EC-F Docu-Vault, located in the Images NOT Input to EC-F Docu-Vault, associated with the Client Location with an image creation date between Docu-Narrative start date and time and the Docu-Narrative end date and time. An operator inputs the images from the Images NOT Input to EC-F Docu-Vault into EC-F for image detection. EC-F identifies the image bounding box starting and ending coordinates and an artifact object label. The images are copied into the Detection Images Docu-Vault (425). A bounding box refers to the coordinates of a border that encloses an image. An operator time stamps the Client Request Form (FIGS. 6A-6F), with the date and time the NOT acceptable images were input to EC-F for image detection.

Process 415 to Acquire Ground Truth Images.

An operator receives Client Request Form (FIGS. 6A-6F) with the date and time the NOT acceptable images were input to EC-F for image detection. An operator visits the Client Location and obtains ground truth images, with a camera, of the NOT acceptable images which were input to EC-F for image detection. An operator uploads the ground truth images to the Ground Truth Images Docu-Vault (417) with a unique identification number. The unique Identification Number incorporates a numeric chronological feature, and a multi-level and hierarchical sequence numbering feature. An operator time stamps the Client Request Form (FIGS. 6A-6F), with the date and time the Ground Truth Images were uploaded to the Ground Truth Images Docu-Vault.

Process 413 to Compare Detection Images with Ground Truth Images

An operator receives Client Request Form (FIGS. 6A-6F) with the date and time the Ground Truth Images were uploaded to the Ground Truth Images Docu-Vault. An operator retrieves the Docu-Narrative start date and time and the Docu-Narrative end date and time from the Client Request Form. An operator retrieves the images in the Ground Truth Images Docu-Vault, located in the Ground Truth Images Docu-Vault (417) associated with the Client Location. An operator retrieves the images in the Detection Images Docu-Vault (425), located in the Detection Images Docu-Vault, associated with the Client Location with an image creation date between Docu-Narrative start date and time and the Docu-Narrative end date and time.

An operator compares the Detection Image with the Ground Truth Image and determines the appropriate EC-F training procedure to apply to the image.

An operator time stamps the Client Request Form (FIGS. 6A-6F), with the date and time the Ground Truth Images were compared to the Detection Images and the appropriate EC-F training procedure was applied to the image.

An operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification using a probative Image Chain of Custody Two Level Certification Form (FIGS. 26A-26F and processes 1600-1617).

An operator certifies, with a two-level certification, the resolution and bounded boundaries of the images in Detection Images Docu-Vault (425) for the Docu-Narrative from the start date and time and the Docu-Narrative end date and time are equivalent to the resolution and bounded boundaries in the Ground Truth Images located in the Ground Truth Docu-Vault (417) using a probative Image Chain of Custody Two Level Certification Form (FIGS. 26A-26F and processes 1600-1619).

Process 421 to Determine if Another Epoch is Required in EC-F

An operator receives Client Request Form (FIGS. 6A-6F) with the date and time the Ground Truth Images were compared to the Detection Images and the appropriate EC-F training procedure was applied to the image. An operator reviews the images and weight scores produced by EC-F.

An operator establishes an Image and Weight Rubric, rules, and algorithm for determining scores produced by EC-F and if another Epoch is required. An operator updates the Ground Truth Docu-Vault with an Image and Weight Score. The rubric may be metric, digital, subjective or any combination. The rubric, rules, algorithm provide an operator with a method for grading the outcome for determining scores produced by EC-F, determining if another Epoch is required, and determining if an Image and Weight Score is acceptable. An operator uses a value of 10, but not limited to 10 to indicate a score which is acceptable. An operator uses a value of 1, but not limited to 1 to indicate a score which is not adequate. An operator updates the Ground Truth Docu-Vault with a grade for the outcome for determining scores produced by EC-F and if another Epoch is required.

An operator updates the Client Request Form (FIGS. 6A-6F) with the rubric score and certifies the score.

If the weight scores are not adequate an operator increase the number of Epochs setting in EC-F and initiates the EC-F procedure to perform another Epoch repeating the above steps until all of the plurality of images have been reviewed. If the weight scores are not adequate an operator time stamps the Client Request Form (FIGS. 6A-6F), with the date and time another EC-F Epoch was initiated. If the weight scores are adequate an operator time stamps the Client Request Form (FIGS. 6A-6F), with the date and time the EC-F Epoch was stopped.

Process 500 to Calculate mAP (Mean Average Precision) and Stop Epochs in EC-F See FIG. 10. Each process is shown generally in FIG. 10 and described in greater detail herein with reference to the process number. The processes include but are not limited to the following. A process to provide image value information; a process to generate prediction scores from EC-F (501). A process to convert prediction scores into class labels in EC-F (503).

The class labels provide names for categories of images; a process to calculate the confusion matrix: TN, FN, TP, FP in EC-F; and a confusion matrix provides an effective visualization of a classification performance. The columns of the matrix represent the predicted classes. The rows represent the actual classes. TP means "true positive" for correctly predicted event values. FP means "false positive" for incorrectly predicted event values. TN means "true negative" for correctly predicted no-event values. FN means "false negative" for incorrectly predicted no-event values.); a process to calculate the precision and recall metrics in EC-F. (The precision metric is the ratio of the TP to the sum of the TP+FP. The recall metric is the ratio of the TP to the sum of the TP+FN.); a process to calculate the area under the precision-recall curve in EC-F. The precision-recall curve shows the tradeoff between precision and recall for different thresholds.

The processes further include: A process to measure the average precision in EC-F (511); A process to determine if the average precision is adequate in EC-F (513); A process to calculate the precision and recall metrics in EC-F (507); A process to calculate the area under the precision-recall curve in EC-F (509); A process to measure the average precision in EC-F (511); A process to determine if the average precision is adequate in EC-F (513).

501 Process to Generate Prediction Scores from EC-F

An operator requests a prediction score from EC-F. An operator time stamps the Client Request Form (FIGS. 6A-6F), with the date and time of the prediction score from EC-F.

Process 503 to Convert Prediction Scores into Class Labels in EC-F

An operator requests the EC-F prediction scores be converted to EC-F Class Labels An operator time stamps the Client Request Form (FIGS. 6A-6F), with the date and time when the EC-F prediction scores be converted to EC-F Class Labels.

Process 505 to Calculate the Confusion Matrix for the Values TN, FN, TP, FP in EC-F An operator requests EC-F to calculate the confusion matrix for the TN, FN, TP, FP value.

An operator time stamps the Client Request Form (FIGS. 6A-6F), with the date and time when the confusion matrix for the TN, FN, TP, FP values are determined.

Process 507 to Calculate the Precision and Recall Metrics in EC-F

An operator requests EC-F to calculate the precision and recall metrics.

An operator time stamps the Client Request Form (FIGS. 6A-6F), with the date and time when the precision and recall metrics were calculated.

Process 509 to Calculate the Area Under the Precision-Recall Curve in EC-F

An operator requests EC-F to calculate the area under the precision-recall curve.

An operator time stamps the Client Request Form (FIGS. 6A-6F), with the date and time when the area under the precision-recall curve was calculated.

Process 511 to Measure the Average Precision in EC-F

An operator requests EC-F to measure the average precision.

An operator time stamps the Client Request Form (FIGS. 6A-6F), with the date and time when the average precision was calculated.

Process 513 to Determine if the Average Precision is Adequate in EC-F

An operator receives Client Request Form (FIGS. 6A-6F) with the date and time when the average precision was measured.

An operator establishes an Average Precision Rubric, rules, and algorithm for determining an Average Precision Score (mAP) and to stop an Epoch in EC-F. An operator updates the Accepted EC-F Docu-Vault with an Average Precision Score. The rubric may be metric, digital, subjective or any combination. The rubric, rules, algorithm provide an operator with a method for grading the outcome for determining an Average Precision Score (mAP) and to stop an Epoch in EC-F and determining if an Average Precision Score is acceptable. An operator uses a value of 10, but not limited to 10 to indicate a score which is acceptable. An operator uses a value of 1, but not limited to 1 to indicate a score which is not adequate. An operator updates the Accepted EC-F Docu-Vault with a grade for the outcome for determining an Average Precision Score (mAP) and to stop an Epoch in EC-F.

An operator updates the Client Request Form (FIGS. 6A-6F) with the rubric score and certifies the score.

An operator uses an EarthCam proprietary EC-SADN instruction set and an EarthCam proprietary procedure to check if a large enough percent of the target artifact objects in the images are being correctly identified in the images.

An operator uses an EarthCam proprietary EC-SADN instruction set and an EarthCam proprietary procedure to check if too many target artifact objects in the images is being incorrectly identified in the images. For example, a water truck being confused with a dump truck.

An operator uses an EarthCam proprietary EC-SADN instruction set and an EarthCam proprietary procedure and algorithm to determine the proper sample size for the Accepted EC-F Docu-Vault (125)

An operator reviews the sample images for, but not limited to, the mAP average, orientation, aspect ratio.

An operator makes a judgment to stop the Epoch.

An operator uses an EarthCam proprietary EC-SADN instruction set and an EarthCam proprietary procedure to calculate the total number of images with an image creation date between the start date and time of the Docu-Narrative and the end date and time of the Docu-Narrative.

An operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification using a probative Image Chain of Custody Two Level Certification Form (FIGS. 6A-6F, processes 1600-1621).

An operator creates a two-level certification that the images for the Client Location with an image creation date between Docu-Narrative start date and time and the Docu-Narrative end date and time are complete, there are no missing images, no images were destroyed, no image was tampered, and there were sufficient images to create an accurate Docu-Narrative using a probative Image Chain of Custody Two Level Certification Form (FIGS. 6A-6F, processes 1600-1623).

An operator certifies the total number of images with an image creation date between the start date and time of the Docu-Narrative and the end date and time of the Docu-Narrative using a probative Image Chain of Custody Two Level Certification Form (FIGS. 6A-6F, processes 1700-1701).

If the average precision scores are not adequate an operator uses EC-F again to perform the process to calculate mAP (mean average precision), repeating the above steps until all of the plurality of images have been reviewed, and stop Epochs in EC-F. An operator initiates another Epoch. If the weight scores are not adequate an operator time stamps the Client Request Form (FIGS. 6A-6F), with the date and time the average precision score is not adequate and when another EC-F Epoch was initiated. If the weight scores are adequate an operator time stamps the Client Request Form (FIGS. 6A-6F), with the date and time when the average precision score is adequate and EC-F the Epoch was stopped.

EC-IC Instruction Set

With reference to FIG. 1, the processes associated with the EC-F instruction set 10 are described above, and the processes associated with the EC-IC instruction set 20 are described below. FIG. 3 sets forth the processes associated with the EC-IC instruction set, each process is described in greater detail herein with reference to the process number. The processes include but are not limited to: A process to augment images for use in EC-IC (600); A process to normalize the batch size in EC-IC (700); and A process to optimize residual layers in EC-IC (800).

Process 600 to Augment Images for Use in EC-IC

See FIG. 11. Each process is shown generally in FIG. 11 and described in greater detail herein with reference to the process number. The processes include but are not limited to the following. A process to create criteria for augmenting images (601); A process to evaluate images for augmenting (605). A process to generate a blurred shape of the target to add to the image (607). A process to add the blurred shape to the image (609). A process to determine how much noise to add to image (611). A process to change the noise in an image (613). A process to determine how much contrast to add to image (615). A process to change the contrast in an image (617). A process to determine how much saturation to change in an image (619). A process to change the saturation in an image (621). A process to determine how much to flip an image (625). A process to flip an image (627). A process to mirror an image (631). A process to determine if augmenting is finished (629).

Process 601 to Create Criteria for Augmenting Images.

An operator receives Client Request Form (FIGS. 6A-6F) with the date and time when the average precision score is adequate and the EC-F Epoch was stopped.

An operator reviews the images in the Images for Input into EC-F Docu-Vault (400-409). An operator uses many techniques to present the same target object image with different views. Creating varying images of the of the same target object image helps improve the ability of EC-IC to better identify a target object image. Some of the techniques an operator might use include, but are not limited to, flipping the orientation of the target object image; blurring the target object image; adding digital noise to the target object image; altering the photographic contrast of the target object image; changing the photographic saturation of the target object image. An operator may apply all or only some of these techniques to a target object image.

An operator uses an EarthCam proprietary EC-SADN instruction set and an EarthCam proprietary procedure to create criteria to augment images and produce a smooth, consistent transition, aligning features between two adjacent images in the sequence; from an image to the previous image and from an image to the next image.

An operator creates criteria to produce a smooth, consistent transition for a Docu-Narrative from the Docu-Narrative start date and time and the Docu-Narrative end date and time.

An operator uses an EarthCam proprietary EC-SADN instruction set and an EarthCam proprietary procedure to establish parameters to compensate for anomalies in an image.

An operator sets the filter options for an image. The filter options include, but are not limited to, known anomalies such as rain, dirt, mud on a camera lens; and environmental conditions; and bounded box target object image which are appropriate to filter; and customer requests for filters.

An operator records the filters used and the images on which the filters are used.

An operator updates the Detection Image Docu-Vault with a Create Criteria for Augmenting Images Score. The rubric may be metric, digital, subjective or any combination. The rubric, rules, algorithm provide an operator with a method for grading the outcome for determining the appropriate Augmentation Criteria to apply to an image based on a detection image and determining if a Create Criteria for Augmenting Images Score is acceptable. An operator uses a value of 10, but not limited to 10 to indicate a score which is acceptable. An operator uses a value of 1, but not limited to 1 to indicate a score which is not adequate. An operator updates the Detection Image Docu-Vault with a grade for the outcome for determining the appropriate Augmentation Criteria to apply to an image based on a detection image.

An operator updates the Client Request Form (FIGS. 6A-6F) with the rubric score and certifies the score.

An operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification using a probative Image Chain of Custody Two Level Certification Form (FIGS. 6A-6F, processes 1700-1703).

An operator certifies the total number of images with an image creation date between the start date and time of the Docu-Narrative and the end date and time of the Docu-Narrative using a probative Image Chain of Custody Two Level Certification Form (FIGS. 6A-6F, processes 1700-1704).

An operator produces a two-level certification identifying the filters used and the images in the Accepted EC-F Docu-Vault on which the filters were applied using a probative Image Chain of Custody Two Level Certification Form (FIGS. 6A-6F, processes 1700-1705).

The unique Augmentation Criteria Identification Number incorporates a numeric chronological feature, and a multi-level and hierarchical sequence numbering feature.

An operator time stamps the Client Request Form (FIGS. 6A-6F), with the date and time when the augmentation criteria and rubric were uploaded to the Augmentation Criteria Docu-Vault.

Process 605 to Evaluate Images for Augmenting.

An operator receives Client Request Form (FIGS. 6A-6F) with the date and time when the augmentation criteria and rubric were uploaded to the Augmentation Criteria Docu-Vault.

An operator retrieves the Docu-Narrative start date and time and the Docu-Narrative end date and time from the Client Request Form.

An operator retrieves the Augmentation Criteria from the Augmentation Criteria Docu-Vault (603), associated with the Client Location with an image creation date between Docu-Narrative start date and time and the Docu-Narrative end date and time.

An operator retrieves the images in the Detection Images Docu-Vault (425), located in the Detection Images Docu-Vault, associated with the Client Location with an image creation date between Docu-Narrative start date and time and the Docu-Narrative end date and time.

An operator reviews a Detection Image and determines the appropriate Augmentation Criteria to apply to the image.

An operator reviews the mAP and associated statistics. An operator determines which augmentation filter to use based on an operator's analysis and judgement of the mAP and associated statistics.

An operator selects augmentation images from EarthCam proprietary Augmentation Image Docu-Vaults or from third party augmentation libraries. EarthCam augmentation Docu-Vaults include but are not limited blurred images, light exposure augmentation images, raindrop augmentation images, dirt on a lens augmentation images, mud on a lens augmentation images, environment augmentation images.

An operator records the augmentation images used and the Detection Images on which the augmentation was applied.

An operator uses an EarthCam proprietary EC-SADN instruction set to determine the criteria for resizing an image. The image resizing criteria include, but are not limited to, the number of pixels high, the number of pixels wide and the number of color channels.

An operator uses an EarthCam proprietary EC-SADN instruction set to augment and resize the images. For each image record which requires augmentation, the EarthCam proprietary EC-SADN instruction set creates a child image record from the parent image of the Detection Image record. The child record is a synthesized, augmented duplicate of the parent record. The child record is related to the parent record by use of a family identification number associated with the Client Identification Number and, Client Location Identification Number and the Docu-narrative start date and time and the Docu-Narrative end date and time.

An operator uses an EarthCam proprietary EC-SADN instruction set and an EarthCam proprietary procedure to ensure images from the start date and time of the Docu-Narrative to the end date and time of the Docu-Narrative have not been altered, concealed, falsified, or destroyed.

An operator uses an EarthCam proprietary EC-SADN instruction set and an EarthCam proprietary procedure to calculate the total number of images with an image creation date between the start date and time of the Docu-Narrative and the end date and time of the Docu-Narrative.

An operator uploads the Augmentation Criteria Identification Number to the Detection Image record stored in the Detection Image Docu-Vault.

An operator copies the Detection Image record stored in the Detection Image Docu-Vault to the Augmented Images Docu-Vault (623).

An operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification using a probative Image Chain of Custody Two Level Certification Form (FIGS. 6A-6F, processes 1700-1707).

An operator produces a two-level certification identifying the augmentation images used, and the parent Detection Image which required the augmentation and the child image on which the augmentation images were applied using a probative Image Chain of Custody Two Level Certification Form (FIGS. 6A-6F, processes 1700-1709).

An operator produces a two-level certification identifying the child images created for each parent image and the family identification number used using a probative Image Chain of Custody Two Level Certification Form (FIGS. 6A-6F, processes 1700-1711).

An operator certifies the total number of images with an image creation date between the start date and time of the Docu-Narrative and the end date and time of the Docu-Narrative using a probative Image Chain of Custody Two Level Certification Form (FIGS. 6A-6F, processes 1700-1713).

An operator creates a two-level certification that the images for the Client Location with an image creation date between Docu-Narrative start date and time and the Docu-Narrative end date and time are complete, there are no missing images, no images were destroyed, no image was tampered, and there were sufficient images to create an accurate Docu-Narrative using a probative Image Chain of Custody Two Level Certification Form (FIGS. 6A-6F, processes 1700-1715).

An operator time stamps the Client Request Form (FIGS. 6A-6F), with the date and time when the Detection Images and Augmentation Criteria were copied to the Augmented Images Docu-Vault. Process 607 to generate a blurred image of the target to add to the image An operator receives Client Request Form (FIGS. 6A-6F) with the date and time when the Detection Images and Augmentation Criteria were copied to the Augmented Images Docu-Vault. An operator retrieves the Docu-Narrative start date and time and the Docu-Narrative end date and time from the Client Request Form. An operator retrieves the images in the Detection Images Docu-Vault (425), associated with the Client Location with an image creation date between the Docu-Narrative start date and time and the Docu-Narrative end date and time. An operator reviews the Augmentation Criteria Identification Number in the Detection Image to determine if a blurred image is required. If a blurred image is required, an operator creates a blurred image of the target object image and uploads the blurred image to the Augmented Images Docu-Vault. The blurred image uploaded to the Augmented Image Docu-Vault is identified with a unique Augmented Image Identification Number. The unique Augmented Image Identification Number incorporates a numeric chronological feature, and a multi-level and hierarchical sequence numbering feature. An operator time stamps the Client Request Form (FIGS. 6A-6F), with the date and time when the blurred image of the target object image was created, and the blurred image was uploaded to the Augmented Images Docu-Vault.

Process 609 to Add the Blurred Shape to the Image

An operator receives Client Request Form (FIGS. 6A-6F) with the date and time when the blurred image of the target object image was created, and the blurred image was uploaded to the Augmented Images Docu-Vault. An operator retrieves the Docu-Narrative start date and time and the Docu-Narrative end date and time from the Client Request Form. An operator retrieves the images in the Augmented Images Docu-Vault (623), associated with the Client Location with an image creation date between Docu-Narrative start date and time and the Docu-Narrative end date and time. An operator reviews the Augmentation Criteria Identification Number in the Detection Image to determine if a blurred image was created and uploaded to the Augmented Images Datastore. If a blurred image was uploaded, an operator associates blurred image with the target object image in the patent and child image in the Augmented Images Docu-Vault. An operator time stamps the Client Request Form (FIGS. 6A-6F), with the date and time when the blurred image was associated with the Target object image in the Augmented Images Docu-Vault (623).

611 Process to Determine how Much Noise to Add to Image.

An operator receives Client Request Form (FIGS. 6A-6F) with the date and time when the blurred image was uploaded to the Augmented Images Docu-Vault and associated with the target object image in the Augmented Images Docu-Vault. An operator retrieves the Docu-Narrative start date and time and the Docu-Narrative end date and time from the Client Request Form. An operator retrieves the images in the Augmented Images Docu-Vault (425), associated with the Client Location with an image creation date between Docu-Narrative start date and time and the Docu-Narrative end date and time. An operator reviews the Augmentation Criteria Identification Number in the Detection Image to determine if an image with noise is required. If image noise is required, an operator creates an image with noise of the target object image and uploads the image with noise to the Augmented Images Docu-Vault. The image with noise is identified with a unique Augmented Image Identification Number. The unique Augmented Image Identification Number incorporates a numeric chronological feature, and a multi-level and hierarchical sequence numbering feature. An operator time stamps the Client Request Form (FIGS. 6A-6F), with the date and time when the image with noise of the target object image was created, and the image with noise was uploaded to the Augmented Images Docu-Vault.

Process 613 to Add Noise to an Image.

An operator receives Client Request Form (FIGS. 6A-6F) with the date and time when the image with noise of the target object image was created, and the image with noise was uploaded to the Augmented Images Docu-Vault. An operator retrieves the Docu-Narrative start date and time and the Docu-Narrative end date and time from the Client Request Form. An operator retrieves the images in the Augmented Images Docu-Vault (623), associated with the Client Location with an image creation date between Docu- Narrative start date and time and the Docu-Narrative end date and time. An operator reviews the Augmentation Criteria Identification Number in the Detection Image to determine if an image with noise was created and uploaded to the Augmented Images Datastore. If an image with noise was uploaded, an operator associates the image with noise with the target object image in the parent and child images in the Augmented Images Docu-Vault.

An operator time stamps the Client Request Form (FIGS. 6A-6F), with the date and time when the image with noise was associated with the target object image in the Augmented Images Docu-Vault (623).

Process 615 to Determine how Much Contrast to Add to Image

An operator receives Client Request Form (FIGS. 6A-6F) with the date and time when the image with noise was uploaded to the Augmented Images Docu-Vault and associated with the target object inference image in the Augmented Images Docu-Vault. An operator retrieves the Docu-Narrative start date and time and the Docu-Narrative end date and time from the Client Request Form. An operator retrieves the images in the Augmented Images Docu-Vault (425), associated with the Client Location with an image creation date between Docu-Narrative start date and time and the Docu-Narrative end date and time. An operator reviews the Augmentation Criteria Identification Number in the Detection Image to determine if an image with a change in contrast is required. If an image with a change in contrast is required, an operator creates an image with a change in contrast of the target object image and uploads the image with a change in contrast to the Augmented Images Docu-Vault. The image with a change in contrast is identified with a unique Augmented Image Identification Number. The unique Augmented Image Identification Number incorporates a numeric chronological feature, and a multi-level and hierarchical sequence numbering feature. An operator time stamps the Client Request Form (FIGS. 6A-6F), with the date and time when an image with a change in contrast of the target object image was created, and the image with a change in contract was uploaded to the Augmented Images Docu-Vault.

Process 617 to Change the Contrast in an Image.

An operator receives Client Request Form (FIGS. 6A-6F) with the date and time when the image with a change in contrast of the target object image was created, and the image with a change in contrast was uploaded to the Augmented Images Docu-Vault. An operator retrieves the Docu-Narrative start date and time and the Docu-Narrative end date and time from the Client Request Form. An operator retrieves the images in the Augmented Images Docu-Vault (623), associated with the Client Location with an image creation date between Docu-Narrative start date and time and the Docu-Narrative end date and time. An operator reviews the Augmentation Criteria Identification Number in the Detection Image to determine if an image with the change in contrast was created and uploaded to the Augmented Images Datastore. If an image with the change in contrast was uploaded, an operator associates the image with the change in contrast with the target object image in the parent and child images in the Augmented Images Docu-Vault. An operator time stamps the Client Request Form (FIGS. 6A-6F), with the date and time when the image with the change in contrast was associated with the Target object image in the Augmented Images Docu-Vault (623).

Process 619 to Determine how Much Saturation to Change in an Image

An operator receives Client Request Form (FIGS. 6A-6F) with the date and time when the image with a change in contrast was uploaded to the Augmented Images Docu-Vault and associated with the Target object image in the Augmented Images Docu-Vault. An operator retrieves the Docu-Narrative start date and time and the Docu-Narrative end date and time from the Client Request Form. An operator retrieves the images in the Augmented Images Docu-Vault (425), associated with the Client Location with an image creation date between Docu-Narrative start date and time and the Docu-Narrative end date and time. An operator reviews the Augmentation Criteria Identification Number in the Detection Image to determine if an image with a change in saturation is required. If an image with a change in saturation is required, an operator creates an image with a change in saturation of the target object image and uploads the image with a change in saturation to the Augmented Images Docu-Vault. The image with a change in saturation is identified with a unique Augmented Image Identification Number. The unique Augmented Image Identification Number incorporates a numeric chronological feature, and a multi-level and hierarchical sequence numbering feature. An operator time stamps the Client Request Form (FIGS. 6A-6F), with the date and time when an image with a change in saturation of the target object image was created, and the image with a change in saturation was uploaded to the Augmented Images Docu-Vault.

Process 621 to Change the Saturation in an Image.

An operator receives Client Request Form (FIGS. 6A-6F) with the date and time when the image with a change in saturation of the target object image was created, and the image with noise was uploaded to the Augmented Images Docu-Vault. An operator retrieves the Docu-Narrative start date and time and the Docu-Narrative end date and time from the Client Request Form. An operator retrieves the images in the Augmented Images Docu-Vault (623), associated with the Client Location with an image creation date between Docu-Narrative start date and time and the Docu-Narrative end date and time. An operator reviews the Augmentation Criteria Identification Number in the Detection Image to determine if an image with the change in saturation was created and uploaded to the Augmented Images Datastore. If an image with the change in saturation was uploaded, an operator associates the image with the change in saturation with the target object image in the parent and child images in the Augmented Images Docu-Vault. An operator time stamps the Client Request Form (FIGS. 6A-6F), with the date and time when the image with the change in saturation was associated with the Target object image in the Augmented Images Docu-Vault (623).

Process 625 to Determine how Much to Flip an Image

An operator receives Client Request Form (FIGS. 6A-6F) with the date and time when the image with a change in saturation was uploaded to the Augmented Images Docu-Vault and associated with the Target object image in the Augmented Images Docu-Vault. An operator retrieves the Docu-Narrative start date and time and the Docu-Narrative end date and time from the Client Request Form. An operator retrieves the images in the Augmented Images Docu-Vault (425), associated with the Client Location with an image creation date between Docu-Narrative start date and time and the Docu-Narrative end date and time. An operator reviews the Augmentation Criteria Identification Number in the Detection Image to determine if an image with a flip required. If an image with a flip is required, an operator creates an image with a flip of the target object image and uploads the image with a flip to the Augmented Images Docu-Vault.

The image with a flip is identified with a unique Augmented Image Identification Number. The unique Augmented Image Identification Number incorporates a numeric chronological feature, and a multi-level and hierarchical sequence numbering feature. An operator time stamps the Client Request Form (FIGS. 6A-6F), with the date and time when an image with a flip of the target object image was created, and the image with a change in contract was uploaded to the Augmented Images Docu-Vault.

Process 627 to Flip an Image.

An operator receives Client Request Form (FIGS. 6A-6F) with the date and time when the image with a flip of the target object image was created, and the image with a flip was uploaded to the Augmented Images Docu-Vault. An operator retrieves the Docu-Narrative start date and time and the Docu-Narrative end date and time from the Client Request Form. An operator retrieves the images in the Augmented Images Docu-Vault (623), associated with the Client Location with an image creation date between Docu-Narrative start date and time and the Docu-Narrative end date and time. An operator reviews the Augmentation Criteria Identification Number in the Detection Image to determine if an image with a flip was created and uploaded to the Augmented Images Datastore. If an image with a flip was uploaded, an operator associates the image with a flip with the target object image in the parent and child images in the Augmented Images Docu-Vault. An operator time stamps the Client Request Form (FIGS. 6A-6F), with the date and time when the image with a flip was associated with the Target object image in the Augmented Images Docu-Vault (623).

Process 631 to Mirror an Image in EC-IC

An operator receives Client Request Form (FIGS. 6A-6F) with the date and time when an image with a flip was associated with the Target object image in the Augmented Images Docu-Vault (623). An operator retrieves the Docu-Narrative start date and time and the Docu-Narrative end date and time from the Client Request Form. An operator retrieves the images in the Augmented Images Docu-Vault (623), associated with the Client Location with an image creation date between Docu-Narrative start date and time and the Docu-Narrative end date and time. An operator selects an image and initiates a procedure in EC-IC to mirror the image. An operator associates the mirror image with the target object image in the parent and child images in the Augmented Images Docu-Vault. The mirror image is identified with a unique Augmented Image Identification Number. The unique Augmented Image Identification Number incorporates a numeric chronological feature, and a multi-level and hierarchical sequence numbering feature. An operator time stamps the Client Request Form (FIGS. 6A-6F), with the date and time when the mirror image of the target object image was created, and the mirror image was uploaded to the Augmented Images Docu-Vault.

Process 629 to Determine if Augmenting is Finished.

An operator receives Client Request Form (FIGS. 6A-6F) with the date and time when the mirror image of the target object image was created, and the mirror image was uploaded to the Augmented Images Docu-Vault.

An operator retrieves the Docu-Narrative start date and time and the Docu-Narrative end date and time from the Client Request Form.

An operator retrieves the images in the Augmented Images Docu-Vault (623), associated with the Client Location with an image creation date between Docu-Narrative start date and time and the Docu-Narrative end date and time.

An operator retrieves the images from the Benchmark Images Docu-Vault (635).

An operator retrieves the images from the Ground Truth Images Docu-Vault (417).

An operator evaluates the parent and child images in the Augmented Images Docu-Vault related to the selected and related images in the Benchmark Images Docu-Vault and the Ground Truth Docu-Vault.

An operator evaluates the images in the Augmented Images Docu-Vault and determines if the augmenting is complete.

An operator establishes an Augmentation Complete Rubric, rules, and algorithm for determining if the augmentation process is complete. An operator updates the Augmented Images Docu-Vault with an Augmentation Complete Score. The rubric may be metric, digital, subjective or any combination. The rubric, rules, algorithm provide an operator with a method for grading the outcome of a process name and determining if an Augmentation Complete Score is acceptable. An operator uses a value of 10, but not limited to 10 to indicate a score which is acceptable. An operator uses a value of 1, but not limited to 1 to indicate a score which is not adequate. An operator updates the Augmented Images Docu-Vault with a grade for the outcome for determining if the augmentation process is complete.

An operator updates the Client Request Form (FIGS. 6A-6F) with the rubric score and certifies the score.

If the augmenting is NOT complete, an operator returns to Process 605.

If the augmenting is complete, an operator exists Process 600.

An operator time stamps the Client Request Form (FIGS. 6A-6F), with the date and time when the augmenting is NOT complete, and an operator returns to Process 605.

An operator time stamps the Client Request Form (FIGS. 6A-6F), with the date and time when the augmenting is complete, and an operator exists Process 600.

Process 700 to Normalize the Batch Size in EC-IC

See FIG. 12. Each process is shown generally in FIG. 12 and described in greater detail herein with reference to the process number. The processes include but are not limited to the following. A process to create criteria for batch size normalization, (701). A process to acquire and select image files for a normalization batch dataset, (703). A process to relate parent and child image files record identification numbers to the family index, (705). A process to run the test batch file and measure batch size normalization, (707).

Process 701 to Create Criteria for Batch Size Normalization.

An operator receives Client Request Form (FIGS. 6A-6F) with the date and time when the augmentation images were uploaded to the Augmented Images Docu-Vault (623). An operator retrieves the Docu-Narrative start date and time and the Docu-Narrative end date and time from the Client Request Form. An operator retrieves the images in the Augmented Images Docu-Vault (623), associated with the Client Location with an image creation date between Docu-Narrative start date and time and the Docu-Narrative end date and time. An operator retrieves the Hardware Specifications, from the Hardware Specifications Docu-Vault (203), for the hardware associated with the Client Location.

An operator determines how to normalize the parent image record and child image records to produce a Docu-Narrative of the Client Location where the images appear normal to the viewer. An operator determines how to normalize the images so one image appears visually consistent and conforming to the next image in the Docu-Narrative and visually consistent and conforming to the previous image in the Docu-Narrative. An operator determines how to normalize the images so all the images in the Docu-Narrative appear visually consistent to the viewer.

Using the EarthCam proprietary EC-SADN instruction set and an EarthCam proprietary procedure an operator determines the criteria for normalizing the parent and child images and inputs the criteria into the EarthCam proprietary EC-SADN instruction set. The child image records include, but are not limited to and may not include, augmented image records, ground truth image records, hardware specification records, hardware characteristics records, Accepted Test Docu-Vault records, images for input to EC-F records, and images NOT input into EC-F records. An operator determines and creates the parent and child record, and a family index. An operator relates the parent image record file identification number to the child image record identification numbers and the family index. A family index is a unique numeric identifier which functions like a person's surname.

An operator relates the child image record identification number to the parent image record identification number and the family index. An operator estimates the hardware processing speed to process the parent and child image records using an EarthCam proprietary EC-SADN instruction set and an EarthCam proprietary procedure.

The EarthCam proprietary EC-SADN instruction set and an EarthCam proprietary procedure estimates the hardware image data processing speed, from the hardware specifications, by estimating the image data processing speed of individual hardware components including, but are not limited to and may not include, the CPU speed, the CPU processing cycle time, the amount of random access memory available, the random memory block size, the hard disk read and write time, and the computer bus speed.

The EarthCam proprietary EC-SADN instruction set and an EarthCam propriety procedure, an operator estimates the average processing time to process the records for a parent and child records for an image using an algorithm which divides the size and number of parent and child records by the data processing speed. An operator estimates the total time to process all the parent and child records associated with the Client Location with an image creation date between Docu-Narrative start date and time and the Docu-Narrative end date and time for use in the Docu-Narrative.

The EarthCam proprietary EC-SADN instruction set and an EarthCam propriety procedure and algorithm to multiply the total number of parent and child records by the average processing time to process a parent and child records.

An operator uploads to the Normalization Criteria Docu-Vault (711) the following, but is not limited to the following or may not include items, hardware specifications, hardware processing speed estimates, individual component speeds, the parent record size, the number of child records, the size of the child records and the number of indices. An operator uploads the average processing time to process the records for a parent and child records and the total time to process all of the parent and child records associated with the Docu-Narrative to the Normalization Criteria Docu-Vault (711).

An operator establishes a Normalized Test Batch Rubric, rules, and algorithm for determining the average processing time and the total time to process all the parent image records and child image records for determining the Normalized Test Batch size. An operator updates the Normalization Criteria Docu-Vault with a Normalized Test Batch Score. The rubric may be metric, digital, subjective or any combination. The rubric, rules, algorithm provide an operator with a method for grading the outcome of a process for determining the average processing time and the total time to process all the parent image records and child image records for determining the Normalized Test Batch size and determining if a Normalized Test Batch Score is acceptable. An operator uses a value of 10, but not limited to 10 to indicate a score which is acceptable. An operator uses a value of 1, but not limited to 1 to indicate a score which is not adequate. An operator updates the Normalization Criteria Docu-Vault with a grade for the outcome for determining the average processing time and the total time to process all the parent image records and child image records for determining the Normalized Test Batch size.

An operator updates the Client Request Form (FIGS. 6A-6F) with the rubric score and certifies the score.

The Normalization Criteria record is identified with a unique Normalization Criteria Identification Number. The unique Normalization Criteria Identification Number incorporates a numeric chronological feature, and a multi-level and hierarchical sequence numbering feature. An operator time stamps the Client Request Form (FIGS. 6A-6F), with the date and time when the normalization criteria were uploaded to the Normalization Criteria Docu-Vault.

Process 703 to Acquire and Select Image Files for a Normalization Batch Dataset.

An operator receives Client Request Form (FIGS. 6A-6F) with the date and time when the normalization criteria were uploaded to the Normalization Criteria Docu-Vault (711). An operator retrieves the Docu-Narrative start date and time and the Docu-Narrative end date and time from the Client Request Form. An operator retrieves the Selection Criteria for Images for Input to EC-F Docu-Vault (409), associated with the Client Location with an image creation date between Docu-Narrative start date and time and the Docu-Narrative end date and time. An operator retrieves the images in the Images for Input to EC-F Docu-Vault (409), associated with the Client Location with an image creation date between Docu-Narrative start date and time and the Docu-Narrative end date and time. An operator uses the Selection Criteria to select parent and child records from the Input to EC-F Docu-Vault and copy the parent and child records into the Normalized Test Batch Docu-Vault (713). The parent and child records are identified with a unique Normalized Test Batch Identification Number. The unique Normalized Test Batch Identification Number incorporates a unique parent, child and family identification number, a numeric chronological feature, and a multi-level and hierarchical sequence numbering feature. An operator time stamps the Client Request Form (FIGS. 6A-6F), with the date and time when the parent and child records were uploaded to the Normalized Test Batch Docu-Vault.

705 Process to Normalize the Parent and Child Image Records

An operator receives Client Request Form (FIGS. 6A-6F) with the date and time when the parent and child records were uploaded to the Normalized Test Batch Docu-Vault (713). An operator retrieves the Normalization Criteria, from the Normalization Criteria Docu-Vault (711) for parent and child records in the Normalized Test Batch Docu-Vault (713), associated with the Client Location with an image creation date between Docu-Narrative start date and time and the Docu-Narrative end date and time. Using an EarthCam proprietary EC-SADN instruction set and an EarthCam proprietary procedure, an operator normalizes the parent and child records to meet the Normalization Criteria. An operator determines and creates the parent and child record indices, and a family index. An operator relates the parent record to the child records and the family index in the Normalized Test Batch Docu-Vault (713). An operator relates the child records to the parent record and the family index in the Normalized Test Batch Docu-Vault (713). An operator time stamps the Client Request Form (FIGS. 6A-6F), with the date and time when the parent and child records were restructured and indexed to meet the Normalization Criteria and were uploaded to the Normalized Test Batch Docu-Vault.

Process 707 to Run a Test Batch File and Measure Batch Size Normalization.

An operator receives Client Request Form (FIGS. 6A-6F) with the date and time when the parent and child records were restructured and indexed to meet the Normalization Criteria and were uploaded to the Normalized Test Batch Docu-Vault (713). An operator retrieves the Docu-Narrative start date and time and the Docu-Narrative end date and time from the Client Request Form. An operator retrieves the parent and child records from the Normalized Test Batch Docu-Vault (713), associated with the Client Location with an image creation date between Docu-Narrative start date and time and the Docu-Narrative end date and time. An operator runs the selected the parent and child records from the Normalized Test Batch Docu-Vault (713) in EC-IC. An operator times the total processing time to run the parent and child records from the Normalized Test Batch Docu-Vault in EC-IC.

An operator establishes a Normalized Test Batch Runtime Rubric, rules, and algorithm for determining if the normalized test batch runtime is adequate. An operator updates the Normalized Test Batch Docu-Vault with a Normalized Test Batch Runtime Score. The rubric may be metric, digital, subjective or any combination. The rubric, rules, algorithm provide an operator with a method for grading the outcome for determining if the normalized test batch runtime is adequate and determining if a Normalized Test Batch Runtime Score is acceptable. An operator uses a value of 10, but not limited to 10 to indicate a score which is acceptable. An operator uses a value of 1, but not limited to 1 to indicate a score which is not adequate. An operator updates the Normalized Test Batch Docu-Vault with a grade for the outcome for determining if the normalized test batch runtime is adequate.

An operator updates the Client Request Form (FIGS. 6A-6F) with the rubric score and certifies the score. If the amount of time to run the parent and child records from the Normalized Test Batch Docu-Vault (713) in EC-IC is adequate and meets the Normalization Criteria an operator stops the batch size normalization process.

If the amount of time to run the parent and child records from the Normalized Test Batch Docu-Vault (713) in EC-IC is NOT adequate and meets the Normalization Criteria an operator returns to Process to Create Criteria for Batch Size Normalization (701) and changes the Normalization Criteria. An operator time stamps the Client Request Form (FIGS. 6A-6F), with the date and time when amount of time to run the parent and child records from the Normalized Test Batch Docu-Vault (713) in EC-IC is adequate and meets the Normalization Criteria an operator stops the batch size normalization process.

Process 800 to Optimize Residual Layers in EC-IC

See FIG. 13. Each process is shown generally in FIG. 13 and described in greater detail herein with reference to the process number. The processes include but are not limited to the following. A process to create criteria for the number of residual layers in EC-IC, (801). A process to observe images for accuracy, (803).

Process 801 to Create Criteria for the Number of Residual Layers in EC-IC

An operator receives Client Request Form (FIGS. 6A-6F) with the date and time when the Normalized Test Batch records in the Normalized Test Batch Docu-Vault (713) meet the Normalization Criteria an operator stopped the batch size normalization process. An operator retrieves the parent and child records from the Normalized Test Batch Docu-Vault (713), associated with the Client Location with an image creation date between Docu-Narrative start date and time and the Docu-Narrative end date and time. An operator determines the number of residual layers in the parent and child records from the Normalized Test Batch Docu-Vault (713). Residual layers add more complexity to features in an image to make an image more recognizable and therefore accurate. An operator determines the accuracy of the images in the parent and child records from the Normalized Test Batch Docu-Vault. An operator determines if the accuracy is acceptable. If it is not acceptable, an operator increases the number of residual levels and determines the accuracy of the images. An operator continues this process until an operator has reached the maximum number of residual layers available in EC-IC or the accuracy of the parent and child images are adequate.

An operator uploads the number of residual layers and the accuracy score to the Residual Layers Criteria Docu-Vault. The Residual Layers Criteria record is identified with a unique Residual Layers Accuracy Criteria Identification Number. The unique Residual Layers Criteria Identification Number incorporates a numeric chronological feature, and a multi-level and hierarchical sequence numbering feature.

An operator time stamps the Client Request Form (FIGS. 6A-6F), with the date and time when the Residual Layers Accuracy Score is adequate, in the Residual Layers Accuracy Docu-Vault (713).

Process 803 to Observe Images for Accuracy.

An operator receives Client Request Form (FIGS. 6A-6F) with the date and time when the Residual Layers Accuracy Score is adequate, in the Residual Layers Accuracy Docu-Vault (713). An operator retrieves the parent and child records from the Normalized Test Batch Docu-Vault (713), associated with the Client Location with an image creation date between Docu-Narrative start date and time and the Docu-Narrative end date and time. An operator retrieves the number of residual layers and the accuracy score from the Residual Layers Criteria Docu-Vault (811) associated with the Client Location with an image creation date between Docu-Narrative start date and time and the Docu-Narrative end date and time.

An operator establishes a Residual Layers Accuracy Rubric, rules, and algorithm for determining process. An operator updates the Residual Layers Accuracy Docu-Vault with a Residual Layers Accuracy Score. The rubric may be metric, digital, subjective or any combination. The rubric, rules, algorithm provide an operator with a method for grading the outcome for determining the residual layers and if the accuracy score is adequate and determining if a Residual Layers Accuracy Score is acceptable. An operator uses a value of 10, but not limited to 10 to indicate a score which is acceptable. An operator uses a value of 1, but not limited to 1 to indicate a score which is not adequate. An operator updates the Residual Layers Accuracy Docu-Vault with a grade for the outcome for determining the residual layers and if the accuracy score is adequate.

An operator updates the Client Request Form (FIGS. 6A-6F) with the rubric score and certifies the score.

An operator observes the parent and child record images and judges the accuracy of image. An operator uses the Residual Layers Accuracy Rubric and judges if the accuracy of the images meets the accuracy requirements of the Residual Layers Criteria for the parent and child records associated with the Client location. If the accuracy of the parent and child record images does NOT meet the requirements of the Residual Layers Criteria for the parent and child records associated with the Client location, an operator returns to change the criteria for the number of residual layers (800-801). If the accuracy of the parent and child record images meets the requirements of the Residual Layers Criteria for the parent and child records associated with the Client location, an operator begins the process or optimizing images for EC-OD.

An operator certifies the total number of images with an image creation date between the start date and time of the Docu-Narrative and the end date and time of the Docu-Narrative using a probative Image Chain of Custody Two Level Certification Form (FIGS. 6A-6F, processes 1700-1717).

An operator creates a two-level certification that the images for the Client Location with an image creation date between Docu-Narrative start date and time and the Docu-Narrative end date and time are complete, there are no missing images, no images were destroyed, no image was tampered, and there were sufficient images to create an accurate Docu-Narrative using a probative Image Chain of Custody Two Level Certification Form (FIGS. 6A-6F, processes 1700-1719).

An operator time stamps the Client Request Form (FIGS. 6A-6F), with the date and time when the parent and child record images meet the requirements of the Residual Layers Criteria for the parent and child records associated with the Client location, an operator begins the process or optimizing images for EC-OD.

EC-OD Instruction Set

With reference to FIG. 1, the processes associated with the EC-F instruction set 10 and the processes associated with the EC-IC instruction set 20 are described above; the processes associated with the EC-OD instruction set 30 are described below. See FIG. 4 where each process is shown generally; the processes are described in greater detail below with reference to the process number. The processes include but are not limited to the following. A process to establish the setup specification in EC-OD, (900). A process to convert images into a format for EC-OD, (1000). A process to create a base model in EC-OD (1100). A process to establish accepted representation of images in EC-OD, (1200). A process to determine the number of epochs in EC-OD, (1300).

Process 900 to Establish a Setup Specification in EC-OD

See FIG. 14. Each process is shown generally in FIG. 14 and described in greater detail herein with reference to the process number. The processes include but are not limited to a process to the following. A process to acquire EC-OD specifications (901). A process to develop EC-OD Setup Criteria (903). A process to test if EC-OD setup criteria scores are acceptable (905).

901 Process to Acquire EC-OD Specifications.

An operator receives Client Request Form (FIGS. 6A-6F) with the date and time when the parent and child record images meet the requirements of the Residual Layers Criteria for the parent and child records associated with the Client location. An operator uses an EarthCam proprietary EC-SADN instruction set and an EarthCam proprietary procedure to ensure images from the start date and time of the Docu-Narrative to the end date and time of the have not been altered, concealed, falsified, or destroyed and authenticates the total number of images from the start date and time of the Docu-Narrative to the end date and time of the Docu-Narrative.

An operator retrieves the hardware specification records from the Hardware Specifications Docu-Vault (203), associated with the Client Location with an image creation date between Docu-Narrative start date and time and the Docu-Narrative end date and time. An operator retrieves hardware characteristics records from the Hardware Characteristics Docu-Vault (205), associated with the Client Location with an image creation date between Docu-Narrative start date and time and the Docu-Narrative end date and time.

An operator considers the following, but not limited to the following or not including the following, EC-OD requirements for benchmark categories, latency performance, throughput performance, optimization function, cost function (objectiveness score, class probability score, and bounding box regression score), Weights, Biases, Parameters, Gradients, and Final Model Summary.

An operator balances the parent and child image record batch size, and the hardware characteristics, and hardware specifications together with the EC-OD requirements. An operator establishes the EC-OD setup specifications for the Client Location.

An operator uploads the EC-OD Specifications to the EC-OD Specifications Docu-Vault (907). The EC-OD Specifications record is identified with a unique EC-OD Specifications Identification Number. The unique EC-OD Specifications Identification Number incorporates a numeric chronological feature, and a multi-level and hierarchical sequence numbering feature.

An operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification using a probative Image Chain of Custody Two Level Certification Form (FIGS. 6A-6F, Processes 1800-1801).

An operator certifies the total number of images with an image creation date between the start date and time of the Docu-Narrative and the end date and time of the Docu-Narrative using a probative Image Chain of Custody Two Level Certification Form (FIGS. 6A-6F, processes 1800-1803).

An operator creates a two-level certification that the images for the Client Location with an image creation date between Docu-Narrative start date and time and the Docu-Narrative end date and time are complete, there are no missing images, no images were destroyed, no image was tampered, and there were sufficient images to create an accurate Docu-Narrative using a probative Image Chain of Custody Two Level Certification Form (FIGS. 6A-6F, processes 1800-1805).

An operator time stamps the Client Request Form (FIGS. 6A-6F), with the date and time when the EC-OD Specifications were uploaded to the EC-OD Specifications Docu-Vault (907) for the Client Location.

Process 903 to Develop EC-OD Setup Criteria

An operator receives Client Request Form (FIGS. 6A-6F) with the date and time when the EC-OD Specifications were uploaded to the EC-OD Specifications Docu-Vault (907) for the Client Location.

An operator retrieves the EC-OD Specification records from the EC-OD Specifications Docu-Vault (907), associated with the Client Location with an image creation date between Docu-Narrative start date and time and the Docu-Narrative end date and time.

An operator reviews the EC-OD Specifications.

An operator determines an acceptable throughput rate, image accuracy and image performance for the parent and child images to be processed with EC-OD.

An operator improves the accuracy for the parent and child images to be processed with EC-OD. An operator uses, but is not limited to using, the body of an artifact object in an image, and not the artifact object in its entirety, to define the bounding box for an artifact object in an image. An operator uses an EarthCam proprietary EC-SADN instruction set and procedures to define the bounding box for an artifact object so as to determine the object in its entirety and to include the object in its entirety, at a Client Location, in a Docu-Narrative. The proprietary EC-SADN instruction set and procedures include, but is not limited to, three major functions. The first is to identify the artifact object. The second is to create a Docu-Vault of images which includes the artifact object body alone, and images of the artifact object body in its entirety. The third is to select and use images of the artifact object in its entirety. Using an artifact object image in its entirety significantly improves the accuracy of the artifact object appearance in a Docu-Narrative. High image accuracy of artifact objects in a Docu-Narrative significantly helps improve the safety of all stakeholders at the Client location.

An operator determines the bias percentage for the parent and child images to be processed with EC-OD. An operator uses EarthCam proprietary EC-SADN instruction set and procedures to determine the specific type and specific characteristics of the annotation images to be used for the object in its entirety for the parent and child images to be processed with EC-OD.

An operator uses EarthCam proprietary EC-SADN instruction set and procedures to select annotation images (623) which are relevant to the parent and child images to be processed with EC-OD.

An operator uses the EarthCam proprietary concordance-based query system and process to identify the appropriate annotation images. A concordance-based query is alphabetically arranged. Each word entry includes a full list of references from Docu-Vaults where the word is used.

An operator uses EarthCam a proprietary EC-SADN instruction set and procedures to exclude annotation images (623) which are not relevant to the parent and child images to be processed with EC-OD. An operator uses EarthCam proprietary EC-SADN instruction set and procedures to reduce the number of relevant annotation images when the Augmentation Docu-Vault (623) includes too many images in the Docu-Vault.

Imagenator is an open-source software program available from many sources, including Amazon.com. An operator uses Imagenator to convert image files to various file formats, including but not limited to, PBM RAW, TARGA, KOALA, FAXG3 or DDS. An operator uses Imagenator, in a unique method, together with the logic and process employed by the EarthCam proprietary EC-SADN instruction set and procedures to help customize the selection of augmentation images such that the statistical bias of the images selected is close to the central tendency of the augmentation image population, and the central tendency mirrors the characteristics of the parent and child images to be processed with EC-OD.

An operator uses the EarthCam proprietary EC-SADN instruction set and procedures to improve the bias percentage of the augmentation images thereby markedly improving the accuracy of the images while also decreasing the processing time for augmenting the parent and child images to be processed with EC-OD.

An operator establishes a Throughput Rate Rubric, rules, and algorithm for determining if the acceptable throughput rate, and image accuracy and image performance for the parent and child images is acceptable. An operator updates the EC-OD Setup Acceptance Criteria Docu-Vault with a Throughput Rate Score. The rubric may be metric, digital, subjective or any combination. The rubric, rules, algorithm provide an operator with a method for grading the outcome of a process name and determining if a Throughput Rate Score is acceptable. An operator uses a value of 10, but not limited to 10 to indicate a score which is acceptable. An operator uses a value of 1, but not limited to 1 to indicate a score which is not adequate. An operator updates the EC-OD Setup Acceptance Criteria Docu-Vault with a grade for the outcome for determining if the acceptable throughput rate, and image accuracy and image performance for the parent and child images is acceptable.

An operator updates the Client Request Form (FIGS. 6A-6F) with the rubric score and certifies the score.

The EC-OD Setup Acceptance Criteria record is identified with a unique EC-OD Setup Acceptance Criteria Identification Number. The unique EC-OD Setup Acceptance Criteria Identification Number incorporates a numeric chronological feature, and a multi-level and hierarchical sequence numbering feature, and Client Location.

An operator time stamps the Client Request Form (FIGS. 6A-6F), with the date and time when the EC-OD Setup Acceptance Criteria Score for the acceptable throughput rate, and image accuracy and image performance was uploaded to the EC-OD Setup Acceptance Criteria Docu-Vault (909).

Process 905 to Test if EC-OD Setup Criteria Scores are Acceptable

An operator receives Client Request Form (FIGS. 6A-6F) with the date and time when the EC-OD Setup Acceptance Criteria Score for the acceptable throughput rate, and image accuracy and image performance was uploaded to the EC-OD Setup Acceptance Criteria Docu-Vault (909). An operator retrieves the EC-OD Specification records from the EC-OD Specifications Docu-Vault (907), associated with the Client Location with an image creation date between Docu-Narrative start date and time and the Docu-Narrative end date and time. An operator retrieves the EC-OD Setup Acceptance Criteria records from the EC-OD Setup Acceptance Criteria Docu-Vault (909), associated with the Client Location with an image creation date between Docu-Narrative start date and time and the Docu-Narrative end date and time. An operator retrieves the Hardware Characteristics records from the Hardware Characteristics Docu-Vault (205), associated with the Client Location with an image creation date between Docu-Narrative start date and time and the Docu-Narrative end date and time.

An operator retrieves the augmented parent and child records from the Augmented Records Docu-Vault (623), associated with the Client Location with an image creation date between Docu-Narrative start date and time and the Docu-Narrative end date and time.

Operator authenticates and certifies the image chain of custody for the images, from a client location, with an image creation date between the start date and time of the Docu-Narrative and the end date and time of the Docu-Narrative.

Operator authenticates and certifies the images have not been altered, concealed, falsified, or destroyed by providing a two-level certification using a probative Image Chain of Custody Two Level Certification Form (FIGS. 6A-6F, processes 1800-1807).

An operator uses EC-OD to process the parent and child records from the Augmented Records Docu-Vault (623), associated with the Client Location with an image creation date between Docu-Narrative start date and time and the Docu-Narrative end date and time. An operator reviews the acceptable throughput rate, and image accuracy and image performance for the parent and child images processed with EC-OD.

An operator compares the EC-OD acceptable throughput rate, and image accuracy and image performance with the EC-OD Setup Acceptance Criteria Score. If the EC-OD performance is NOT adequate, an operator returns to process 901 and alters the EC-OD specifications. If the EC-OD performance is adequate, an operator exits process 900 and initiates process 1000. An operator time stamps the Client Request Form (FIGS. 6A-6F), with the date and time when an operator exits process 900 and initiates process 1000.

Process 1000 to Convert Images into a Format for EC-OD

Each process is shown generally in FIG. 15 and described in greater detail herein with reference to the process number. The processes include but are not limited to the following. A process to create criteria for filters in EC-OD, (1001). A process to create criteria for using filters in EC-OD, (1003). A process to apply filters to augmented images for EC-OD, (1005). A process to determine if the filters are adequate for EC-OD, (1007).

Process 1001 to Create Criteria for Filters in EC-OD

An operator receives Client Request Form (FIGS. 6A-6F) with the date and time when an operator exits process 900. An operator retrieves the Augmented parent and child records from the Augmented Records Docu-Vault (623), associated with the Client Location with an image creation date between Docu-Narrative start date and time and the Docu-Narrative end date and time. An operator reviews the parent and child records to determine which filters are required for the parent and child records.

An operator creates a Filter and Filter Specifications including, but not limited to the following and not using the following, Mean Filter (noise reduction using mean of neighborhood), Median Filter (noise reduction using median of neighborhood), blurred filter, Gaussian Smoothing (noise reduction using convolution with a Gaussian smoothing kernel), Conservative Smoothing (noise reduction using maximum and minimum of neighborhood), Crimmins Speckle Removal (more complex noise reduction by operator), Frequency Filters (including, but not limited to high and low pass image filters), Laplacian/Laplacian of Gaussian Filter (edge detection filter), Unsharp Filter (edge enhancement filter), Simple Adaptive Median filter, Decision Based Median filter, Decision Based Untrimmed Median filter.

An operator uploads the Filter and Filter Specifications to the EC-OD Filters Docu-Vault (1101). The Filter and Filter Specifications record is identified with a unique Filter and Filter Specifications Identification Number. The unique Filter and Filter Specifications Identification Number incorporates a numeric chronological feature and a multi-level and hierarchical sequence numbering feature, and Client Location. An operator time stamps the Client Request Form (FIGS. 6A-6F), with the date and time when the Filter and Filter Specifications record was uploaded to the EC-OD Filters Docu-Vault.

Process 1003 to Create Criteria for Using Filters in EC-OD

An operator retrieves the Filter and Filter Specifications record uploaded to the EC-OD Filters Docu-Vault (1101) associated with the Client Location with an image creation date between Docu-Narrative start date and time and the Docu-Narrative end date and time.

An operator retrieves the Augmented parent and child records from the Augmented Records Docu-Vault (623), associated with the Client Location with an image creation date between Docu-Narrative start date and time and the Docu-Narrative end date and time.

An operator reviews the images in the parent and child records from the Augmented Records Docu-Vault (623). An operator uses many techniques to select a filter for a parent and child image records.

An operator uses EarthCam proprietary EC-SADN instruction set and procedures to identify a blurred image.

An operator uses EarthCam proprietary EC-SADN instruction set and procedures to determine the specific characteristics of the blurring in the image.

From the characteristics and features of the blur, an operator uses EarthCam proprietary algorithm to measure the significance of the blur.

An operator compares the characteristics and features of the blurred artifact object in the current image for the existence of the blurred artifact object in the previous image and in the next image.

An operator uses an EarthCam proprietary EC-SADN instruction set and procedures to determine if the blurring in the image was caused by an inertial movement in the camera or movement of an object in the Client Location.

Based on the cause of the blurring, an operator uses EarthCam proprietary EC-SADN instruction set and procedures to precisely correct the blurring in the image.

Using a filter with the parent and child image helps EC-OD to improve the image processing throughput rate, image accuracy and image performance. Image processing time is the time required to perform the computer processing for an image. The throughput rate is the number of images a computer system can process in a given amount of time. An operator may apply all or only some of the filters to target parent and child image.

An operator establishes criteria about a target object image to determine which filter or group of filters to use with a target object image. An operator uploads an EC-OD Filter Criteria Record to the EC-OD Docu-Vault (1009).

An operator establishes an EC-OD Filter Criteria Rubric, rules, and algorithm for determining which filter or group of filters to use with a target object image. An operator updates the EC-OD Filter Criteria Docu-Vault with an EC-OD Filter Criteria Score. The rubric may be metric, digital, subjective or any combination. The rubric, rules, algorithm provide an operator with a method for grading the outcome of a process name and determining if an EC-OD Filter Criteria Score is acceptable. An operator uses a value of 10, but not limited to 10 to indicate a score which is acceptable. An operator uses a value of 1, but not limited to 1 to indicate a score which is not adequate. An operator updates the EC-OD Filter Criteria Docu-Vault with a grade for the outcome for determining which filter or group of filters to use with a target object image.

An operator updates the Client Request Form (FIGS. 6A-6F) with the rubric score and certifies the score.

The criteria uploaded to the EC-OD Filter Criteria Docu-Vault are identified with a unique EC-OD Filter Criteria Identification Number. The unique EC-OD Filter Criteria Identification Number incorporates a numeric chronological feature, and a multi-level and hierarchical sequence numbering feature, and Client Location.

An operator time stamps the Client Request Form (FIGS. 6A-6F), with the date and time when the EC-OD Filter Criteria Record was uploaded to the EC-OD Docu-Vault (1009).

Process 1005 to Apply Filters to Augmented Images for EC-OD

An operator receives Client Request Form (FIGS. 6A-6F) with the date and time when the EC-OD Filter Criteria Record was uploaded to the EC-OD Docu-Vault (1000-1009). An operator retrieves the Filters records uploaded to the EC-OD Filters Docu-Vault (1100-1101) associated with the Client Location with an image creation date between Docu-Narrative start date and time and the Docu-Narrative end date and time.

An operator retrieves the EC-OD Filter Criteria records uploaded to the EC-OD Filter Criteria Docu-Vault (1109) associated with the Client Location with an image creation date between Docu-Narrative start date and time and the Docu-Narrative end date and time. An operator retrieves the Augmented parent and child records from the Augmented Records Docu-Vault (623), associated with the Client Location with an image creation date between Docu-Narrative start date and time and the Docu-Narrative end date and time.

An operator views a parent and child image record from the Augmented Records Docu-Vault.

An operator views the related EC-OD Filter Criteria record. Using the EC-OD Filter Criteria as a guide, an operator determines the EC-OD Filter to apply to the parent and child image record. An operator applies the selected EC-OD Filter to the parent and child image record. An operator uploads the parent and child image records with the selected EC-OD Filter to the Augmented Images Docu-Vault (623). An operator time stamps the Client Request Form (FIGS. 6A-6F), with the date and time when parent and child image records with the selected EC-OD Filter were uploaded to the Augmented Images Docu-Vault (623).

Process 1007 to Determine if the Filters are Adequate for EC-OD

An operator receives Client Request Form (FIGS. 6A-6F) with the date and time when parent and child image records with the selected EC-OD Filter were uploaded to the Augmented Images Docu-Vault (623). An operator retrieves the Filters records uploaded to the EC-OD Filters Docu-Vault (1011) associated with the Client Location with an image creation date between Docu-Narrative start date and time and the Docu-Narrative end date and time. An operator retrieves the EC-OD Filter Criteria records uploaded to the EC-OD Filter Criteria Docu-Vault (1109) associated with the Client Location with an image creation date between Docu-Narrative start date and time and the Docu-Narrative end date and time. An operator retrieves the Augmented parent and child records from the Augmented Records Docu-Vault (623), associated with the Client Location with an image creation date between Docu-Narrative start date and time and the Docu-Narrative end date and time.

An operator views a parent and child image record from the Augmented Records Docu-Vault. An operator views the related EC-OD Filter Criteria record associated with the Client Location with an image creation date between Docu-Narrative start date and time and the Docu-Narrative end date and time.

An operator establishes an Augmentation Performance Rubric, rules, and algorithm for determining if a filter augmentation process is complete. An operator updates the Augmented Images Docu-Vault with an Augmentation Performance Score. The rubric may be metric, digital, subjective or any combination. The rubric, rules, algorithm provide an operator with a method for grading the outcome for determining if a filter augmentation process is complete and determining if an Augmentation Performance Score is acceptable. An operator uses a value of 10, but not limited to 10 to indicate a score which is acceptable. An operator uses a value of 1, but not limited to 1 to indicate a score which is not adequate. An operator updates the Augmented Images Docu-Vault with a grade for the outcome for determining if a filter augmentation process is complete.

An operator updates the Client Request Form (FIGS. 6A-6F) with the rubric score and certifies the score. If the EC-OD Filter performance is NOT adequate, an operator returns to process 1001 and alters the EC-OD Filter. If the EC-OD Filter performance is adequate, an operator exits process 1000 and initiates process 1100. An operator time stamps the Client Request Form (FIGS. 6A-6F), with the date and time when an operator exits process 1000 and initiates process 1100.

Process 1100 to Create a Base Model in EC-OD

See FIG. 16. Each process is shown generally in FIG. 16 and described in greater detail herein with reference to the process number. The inference of an image is a prediction for what the image represents. The speed of inference is the time it takes to process the image based on the image width and height. A base model is an image computer processing scenario which considers computer and image processing equipment characteristics, image mean average precision (mAP), image resolution, speed of image inference and image accuracy. The processes include but are not limited to: A process to acquire GPU characteristics for use in EC-OD (1101); a process to determine the resolution of the images for use in EC-OD (1103); a process to determine speed of inference of the images for use in EC-OD (1105); a process to determine the accuracy of the images for use in EC-OD (1107); a process to create criteria to compare GPU with image resolution+(speed of inference vs accuracy) of the images for use in EC-OD (1109); and a process to determine if accuracy of the images is adequate to create a base model for EC-OD (1111).

Process 1101 to Acquire GPU Characteristics for Use in EC-OD

An operator receives Client Request Form (FIGS. 6A-6F) with the date and time when an operator exits process 1000 and initiates process 1100. An operator retrieves the Graphic Processing Unit records from the Hardware Inventory Docu-Vault (223) associated with the Client Location with an image creation date between Docu-Narrative start date and time and the Docu-Narrative end date and time.

An operator retrieves the Graphic Processing Unit records from the GPU Specifications Docu-Vault (1113) associated with the Client Location with an image creation date between Docu-Narrative start date and time and the Docu-Narrative end date and time.

Using the identifying information associated with the Graphic Processing Unit from the Inventory Docu-Vault (223) and related to the Client, an operator retrieves the hardware specifications from the hardware datasheets, manuals, and factsheets.

An operator uploads the Graphic Processing Unit Specifications to the GPU Specifications Docu-Vault (1113) using a unique hardware identification number. The Graphic Processing Unit Specifications describe the specific features and components of the hardware. Using the Graphic Processing Unit Specifications from the GPU Specifications Docu-Vault (1113) and related to the Client, an operator retrieves the hardware specifications from the hardware datasheets, manuals, and factsheets. An operator uploads the hardware specifications to the GPU Specifications Docu-Vault (1113) using a unique hardware identification number. The Graphic Processing Unit Specifications describe the specific features and components of the hardware. An operator uploads the specifications to the GPU Specifications Docu-Vault using a unique GPU Specifications Identification Number. The unique GPU Specifications Identification Number incorporates a numeric chronological feature, and a multi-level and hierarchical sequence numbering feature, and Client Location.

An operator describes the Graphic Processing Unit Characteristics using the Graphic Processing Unit Specifications from the GPU Specifications Docu-Vault (1113). The Graphic Processing Unit characteristics describe aspects of the Graphic Processing Unit specifications including but not limited to capacity, speed, and mean time to failure.

An operator uploads the Graphic Processing Unit Characteristics describing the hardware associated with the Client project to the GPU Characteristics Docu-Vault (1115). The characteristics uploaded to GPU Characteristics Docu-Vault (1115) are identified with a unique GPU Characteristics Identification Number.

The unique GPU Characteristics Identification Number incorporates a numeric chronological feature, and a multi-level and hierarchical sequence numbering feature, and Client Location. An operator time stamps the Client Request Form (FIGS. 6A-6F), with the date and time when the Graphic Processing Unit Specifications are uploaded to the GPU Specifications Docu-Vault (1113). An operator time stamps the Client Request Form (FIGS. 6A-6F), with the date and time when the Graphic Processing Unit Characteristics are uploaded to the GPU Characteristics Docu-Vault (1115).

Process 1103 to Determine the Resolution of the Images

An operator receives Client Request Form (FIGS. 6A-6F) with the date and time when the Graphic Processing Unit Characteristics are uploaded to the GPU Characteristics Docu-Vault (1115). An operator retrieves the Graphic Processing Unit records from the GPU Characteristics Docu-Vault (1115) associated with the Client Location with an image creation date between Docu-Narrative start date and time and the Docu-Narrative end date and time.

An operator retrieves the Augmented parent and child records from the Augmented Records Docu-Vault (623), associated with the Client Location with an image creation date between Docu-Narrative start date and time and the Docu-Narrative end date and time.

An operator accesses the Benchmark images from the Benchmark Image Docu-Vault (635) associated with the Client Location with an image creation date between Docu-Narrative start date and time and the Docu-Narrative end date and time.

An operator compares the resolution of the Benchmark images to the resolution of augmented images from the Augmented Images Docu-Vault (623) associated with the Client Location with an image creation date between Docu-Narrative start date and time and the Docu-Narrative end date and time.

An operator uses EarthCam proprietary EC-SADN instruction set and procedures to verify the resolution of each augmented image is equivalent or superior to the resolution in the Benchmark images.

When creating a 'marketing' version of a docu-narrative, an operator uses EarthCam proprietary EC-SADN instruction set and procedures to overlap a portion of an image with a portion of the previous image.

When creating a 'marketing' version of a docu-narrative, an operator uses EarthCam proprietary EC-SADN instruction set and procedures to overlap a portion of an image with a portion of the next image.

When creating a 'marketing' version of a docu-narrative, an operator uses EarthCam proprietary EC-SADN instruction set and procedures to produce a date and time pointer for a client in the 'marketing' version of a Docu-Narrative. It does this by compensating for the overlapping of frames and images in the 'marketing' version of the Docu-Narrative.

An operator establishes an Acceptable Image Resolution Rubric, rules, and algorithm for determining the acceptableness of an image resolution for the parent and child images to be processed using a Graphic Processing Unit. An operator updates the GPU Characteristics Docu-Vault with an Acceptable Image Resolution Score. The rubric may be metric, digital, subjective or any combination. The rubric, rules, algorithm provide an operator with a method for grading the outcome of a process name and determining if an Acceptable Image Resolution Score is acceptable. An operator uses a value of 10, but not limited to 10 to indicate a score which is acceptable. An operator uses a value of 1, but not limited to 1 to indicate a score which is not adequate. An operator updates the GPU Characteristics Docu-Vault with a grade for the outcome for determining the acceptableness of an image resolution for the parent and child images to be processed using a Graphic Processing Unit.

An operator updates the Client Request Form (FIGS. 6A-6F) with the rubric score and certifies the score.

An operator determines if the Graphic Processing Unit produces acceptable parent and child image resolution.

An operator uploads the parent and child image GPU Image Resolution Score to the parent and child records from the Augmented Records Docu-Vault (623).

An operator time stamps the Client Request Form (FIGS. 6A-6F), with the date and time when the GPU Image Resolution Score for the parent and child records are uploaded to the Augmented Records Docu-Vault (623).

Process 1105 to Determine Speed of Inference of the Images.

An operator receives Client Request Form (FIGS. 6A-6F) with the date and time when the GPU Image Resolution Score for the parent and child records are uploaded to the Augmented Records Docu-Vault (623). An operator retrieves the Graphic Processing Unit records from the GPU Characteristics Docu-Vault (1115) associated with the Client Location with an image creation date between Docu-Narrative start date and time and the Docu-Narrative end date and time. An operator retrieves the Augmented parent and child records from the Augmented Records Docu-Vault (623), associated with the Client Location with an image creation date between Docu-Narrative start date and time and the Docu-Narrative end date and time.

An operator establishes an Acceptable Image Inference Rubric, rules, and algorithm for determining the inference for the parent and child images to be processed using the Graphic Processing Unit. An operator updates the GPU Characteristics Docu-Vault with an Acceptable Image Inference Score. The rubric may be metric, digital, subjective or any combination. The rubric, rules, algorithm provide an operator with a method for grading the outcome for determining the inference for the parent and child images to be processed using the Graphic Processing Unit is acceptable and determining if an Acceptable Image Inference Score is acceptable. An operator uses a value of 10, but not limited to 10 to indicate a score which is acceptable. An operator uses a value of 1, but not limited to 1 to indicate a score which is not adequate. An operator updates the GPU Characteristics Docu-Vault with a grade for the outcome for determining the inference for the parent and child images to be processed using the Graphic Processing Unit is acceptable.

An operator updates the Client Request Form (FIGS. 6A-6F) with the rubric score and certifies the score.

An operator determines if the Graphic Processing Unit produces acceptable parent and child image inference. An operator uploads the parent and child image GPU Image Inference Score to the parent and child records from the Augmented Records Docu-Vault (623). An operator time stamps the Client Request Form (FIGS. 6A-6F), with the date and time when GPU Image Inference Score for the parent and child records are uploaded to the Augmented Records Docu-Vault (623).

Process 1107 to Determine the Accuracy of the Images.

An operator receives Client Request Form (FIGS. 6A-6F) with the date and time when the GPU Image Inference Score for the parent and child records are uploaded to the Augmented Records Docu-Vault (623). An operator retrieves the Graphic Processing Unit records from the GPU Characteristics Docu-Vault (1115) associated with the Client Location with an image creation date between Docu-Narrative start date and time and the Docu-Narrative end date and time. An operator retrieves the Augmented parent and child records from the Augmented Records Docu-Vault (623), associated with the Client Location with an image creation date between Docu-Narrative start date and time and the Docu-Narrative end date and time.

An operator establishes an Acceptable Image Accuracy Rubric, rules, and algorithm for determining if the image accuracy is acceptable accuracy for the parent and child images to be processed using the Graphic Processing Unit. An operator updates the GPU Characteristics Docu-Vault with an Acceptable Image Accuracy Score. The rubric may be metric, digital, subjective or any combination. The rubric, rules, algorithm provide an operator with a method for grading the outcome for determining if the image accuracy is acceptable accuracy for the parent and child images to be processed using the Graphic Processing Unit and determining if an Acceptable Image Accuracy Score is acceptable. An operator uses a value of 10, but not limited to 10 to indicate a score which is acceptable. An operator uses a value of 1, but not limited to 1 to indicate a score which is not adequate. An operator updates the GPU Characteristics Docu-Vault with a grade for the outcome for determining if the image accuracy is acceptable accuracy for the parent and child images to be processed using the Graphic Processing Unit.

An operator updates the Client Request Form (FIGS. 6A-6F) with the rubric score and certifies the score.

An operator determines if the Graphic Processing Unit produces acceptable parent and child image accuracy. An operator uploads the parent and child image GPU Image Accuracy Score to the parent and child records from the Augmented Records Docu-Vault (623). An operator time stamps the Client Request Form (FIGS. 6A-6F), with the date and time when parent and child image GPU Image Accuracy Score to the parent and child records from the Augmented Records Docu-Vault (623).

Process 1109 to Create Criteria to Compare GPU with Image Resolution+(Speed of Inference Vs Accuracy) of the Images An operator receives Client Request Form (FIGS. 6A-6F) with the date and time when the date and time when parent and child image GPU Image Accuracy Score to the parent and child records from the Augmented Records Docu-Vault (623). An operator retrieves the GPU Characteristics record uploaded to the GPU Characteristics Docu-Vault (1115) associated with the Client Location with an image creation date between Docu-Narrative start date and time and the Docu-Narrative end date and time. An operator retrieves the Augmented parent and child records from the Augmented Records Docu-Vault (623), associated with the Client Location with an image creation date between Docu-Narrative start date and time and the Docu-Narrative end date and time. An operator reviews the images in the parent and child records from the Augmented Records Docu-Vault (623). An operator uses many techniques to select a GPU Characteristic for a parent and child image records. Using a GPU Characteristic with the parent and child image helps EC-OD to improve the resolution, inference and accuracy of an image. An operator may apply all or only some of the GPU Characteristics to target parent and child image. An operator establishes criteria about a target object image to determine which GPU Characteristics or group of GPU Characteristics to use with a target object image. An operator uploads a GPU Characteristic Criteria Score to the GPU Accuracy Criteria Docu-Vault (1117).

An operator establishes a GPU Characteristics Criteria Rubric, rules, and algorithm for determining acceptable GPU characteristics criteria. An operator updates the GPU Accuracy Criteria Docu-Vault with a GPU Characteristics Criteria Score. The rubric may be metric, digital, subjective or any combination. The rubric, rules, algorithm provide an operator with a method for grading the outcome for determining acceptable GPU characteristics criteria and determining if a GPU Characteristics Criteria Score is acceptable. An operator uses a value of 10, but not limited to 10 to indicate a score which is acceptable. An operator uses a value of 1, but not limited to 1 to indicate a score which is not adequate. An operator updates the GPU Accuracy Criteria Docu-Vault with a grade for the outcome for determining acceptable GPU characteristics criteria.

An operator updates the Client Request Form (FIGS. 6A-6F) with the rubric score and certifies the score. The criteria uploaded to the GPU Accuracy Criteria Docu-Vault are identified with a unique GPU Accuracy Criteria Identification Number. The unique GPU Accuracy Criteria Identification Number incorporates a numeric chronological feature, and a multi-level and hierarchical sequence numbering feature, and Client Location.

An operator determines if the Graphic Processing Unit produces acceptable parent and child image resolution, inference and accuracy GPU Characteristic Criteria Score.

An operator uploads the parent and child image GPU Characteristic Criteria Score to the parent and child records from the Augmented Records Docu-Vault (623). An operator time stamps the Client Request Form (FIGS. 6A-6F), with the date and time when the parent and child image GPU Characteristic Criteria Score is uploaded to the parent and child records in the Augmented Records Docu-Vault (623).

Process 1111 to Determine if Accuracy of the Images is Adequate to Create a Base Model.

An operator receives Client Request Form (FIGS. 6A-6F) with the date and time when the parent and child image GPU Characteristic Criteria Score is uploaded to the parent and child records in the Augmented Records Docu-Vault (623). An operator retrieves the GPU Accuracy Criteria record uploaded to the GPU Accuracy Criteria Docu-Vault (1113) associated with the Client Location with an image creation date between Docu-Narrative start date and time and the Docu-Narrative end date and time. An operator retrieves the Augmented parent and child records from the Augmented Records Docu-Vault (600-623), associated with the Client Location with an image creation date between Docu-Narrative start date and time and the Docu-Narrative end date and time.

An operator views a parent and child image record from the Augmented Records Docu-Vault. An operator views the related GPU Accuracy Criteria record associated with the Client Location with an image creation date between Docu-Narrative start date and time and the Docu-Narrative end date and time. If the GPU Characteristic performance is NOT adequate, an operator returns to process 1103 and alters the GPU Characteristic in the GPU Characteristics Docu-Vault (1115). If the GPU Characteristic performance is adequate, an operator exits process 1100. An operator time stamps the Client Request Form (FIGS. 6A-6F), with the date and time when an operator exits process 1100 and initiates process 1200.

Process 1200 to Establish Accepted Representation of Images in EC-OD

See FIG. 17. Each process is shown generally in FIG. 17 and described in greater detail herein with reference to the process number. The processes include but are not limited to the following. A process to select images for a sample dataset to create image Weights and Biases criteria for use in EC-OD, (1201). A process to determine if Weights and Biases criteria are adequate for use in EC-OD, (1203). A process to determine if Weights and Biases Dataset is an adequate sample to establish Weight and Bias criteria for EC-OD, (1205).

Process 1201 to Select Images for a Sample Dataset to Create Image Weights and Biases Criteria An operator receives Client Request Form (FIGS. 6A-6F) with the date and time when an operator exits process 1100. An operator retrieves the Weights and Biases records uploaded to the Weights and Biases Docu-Vault (1207) associated with the Client Location with an image creation date between Docu-Narrative start date and time and the Docu-Narrative end date and time. An operator retrieves the augmented parent and child records from the Augmented Records Docu-Vault (623), associated with the Client Location with an image creation date between Docu-Narrative start date and time and the Docu-Narrative end date and time. An operator reviews the augmented parent and child records from the Augmented Records Docu-Vault (623), associated with the Client Location with an image creation date between Docu-Narrative start date and time and the Docu-Narrative end date and time.

An operator establishes a Weights and Biases Rubric, rules, and algorithm for determining if the augmentation process is complete. An operator updates the Weights and Biases Docu-Vault with a Weights and Biases Score. The rubric may be metric, digital, subjective or any combination. The rubric, rules, algorithm provide an operator with a method for grading the outcome for determining if the augmentation process is complete and determining if a Weights and Biases Score is acceptable. An operator uses a value of 10, but not limited to 10 to indicate a score which is acceptable. An operator uses a value of 1, but not limited to 1 to indicate a score which is not adequate. An operator updates the Weights and Biases Docu-Vault with a grade for the outcome for determining if the augmentation process is complete.

An operator updates the Client Request Form (FIGS. 6A-6F) with the rubric score and certifies the score.

An operator determines if the parent and child images are appropriate to be uploaded to the Weights and Biases Docu-Vault (1207). If the parent and child record are appropriate, an operator uploads parent and child records to the Weights and Biases Docu-Vault (1207) using a unique Weights and Biases Identification Number. The unique Weights and Biases Identification Number incorporates a numeric chronological feature, and a multi-level and hierarchical sequence numbering feature, and Client Location. An operator time stamps the Client Request Form (FIGS. 6A-6F), with the date and time when the parent and child records are uploaded to the Weights and Biases Docu-Vault (1207).

Process 1203 to Determine if Weights and Biases Criteria are Adequate.

An operator receives Client Request Form (FIGS. 6A-6F) with the date and time when the parent and child records are uploaded to the Weights and Biases Docu-Vault (1207). An operator retrieves the Weights and Biases records uploaded to the Weights and Biases Docu-Vault (1207) associated with the Client Location with an image creation date between Docu-Narrative start date and time and the Docu-Narrative end date and time. An operator retrieves the Weights and Biases records uploaded to the Weights and Biases Criteria Docu-Vault (1209) associated with the Client Location with an image creation date between Docu-Narrative start date and time and the Docu-Narrative end date and time. An operator reviews the Weights and Biases parent and child records from the Weights and Biases Docu-Vault (1207), associated with the Client Location with an image creation date between Docu-Narrative start date and time and the Docu-Narrative end date and time.

An operator establishes a Parent and Child Weights and Biases Rubric, rules, and algorithm for determining if the Weights and Biases characteristics of the images in the parent and child records are an acceptable representation of the image weights and bias which must be detected and meet the Weights and Biases Criteria. An operator updates the Weights and Biases Docu-Vault with a Parent and Child Weights and Biases Score. The rubric may be metric, digital, subjective or any combination. The rubric, rules, algorithm provide an operator with a method for grading the outcome for determining if the Weights and Biases characteristics of the images in the parent and child records are an acceptable representation of the image weights and bias which must be detected and meet the Weights and Biases Criteria and determining if a Parent and Child Weights and Biases Score is acceptable. An operator uses a value of 10, but not limited to 10 to indicate a score which is acceptable. An operator uses a value of 1, but not limited to 1 to indicate a score which is not adequate. An operator updates the Weights and Biases Docu-Vault with a grade for the outcome for determining if the Weights and Biases characteristics of the images in the parent and child records are an acceptable representation of the image weights and bias which must be detected and meet the Weights and Biases Criteria.

An operator updates the Client Request Form (FIGS. 6A-6F) with the rubric score and certifies the score.

An operator reviews the Weights and Biases characteristics of the parent and child records to determine if the images in the parent and child records are an acceptable representation of the image weights and bias which must be detected and meet the Weights and Biases Criteria. If the Weights and Biases Criteria are NOT adequate, an operator removes the parent and child records from the Weights and Biases Docu-Vault (1207). If the Weights and Biases Criteria is adequate, an operator exits process 1203. An operator time stamps the Client Request Form (FIGS. 6A-6F), with the date and time when an operator exits process 1203.

Process 1205 to Determine if Weights and Biases Dataset is an Adequate Sample to Establish Weight and Bias Criteria for EC-OD.

An operator receives Client Request Form (FIGS. 6A-6F) with the date and time when an operator exits process 1203. An operator retrieves the Augmented Images records uploaded to the Augmented Images Docu-Vault (623) associated with the Client Location with an image creation date between Docu-Narrative start date and time and the Docu-Narrative end date and time. An operator retrieves the Weights and Biases records uploaded to the Weights and Biases Docu-Vault (1207) associated with the Client Location with an image creation date between Docu-Narrative start date and time and the Docu-Narrative end date and time. An operator retrieves the Weights and Biases records uploaded to the Weights and Biases Criteria Docu-Vault (1209) associated with the Client Location with an image creation date between Docu-Narrative start date and time and the Docu-Narrative end date and time.

An operator reviews the images in the Weights and Biases Docu-Vault to determine if the parent and child images provide a sufficiently accurate representation of the images required for the Docu-Narrative.

An operator establishes an Accurate Representation of the Images Rubric, rules, and algorithm for determining if the parent and child images provide a sufficiently accurate representation of the images required for the Docu-Narrative. An operator updates the Weights and Biases Docu-Vault with an Accurate Representation of the Images Score. The rubric may be metric, digital, subjective or any combination. The rubric, rules, algorithm provide an operator with a method for grading the outcome of a for determining if the parent and child images provide a sufficiently accurate representation of the images required for the Docu-Narrative and determining if an Accurate Representation of the Images Score is acceptable. An operator uses a value of 10, but not limited to 10 to indicate a score which is acceptable. An operator uses a value of 1, but not limited to 1 to indicate a score which is not adequate. An operator updates the Weights and Biases Docu-Vault with a grade for the outcome for determining if the parent and child images provide a sufficiently accurate representation of the images required for the Docu-Narrative.

An operator updates the Client Request Form (FIGS. 6A-6F) with the rubric score and certifies the score.

An operator establishes a Weights and Biases Sample Size Rubric, rules, and algorithm for determining if the Weights and Biases Sample Size is large enough to provide an accurate representation of the total population of images for the Client Location in the Augmented Images Docu-Vault. An operator updates the Augmented Images Docu-Vault with a Weights and Biases Sample Size Score. The rubric may be metric, digital, subjective or any combination. The rubric, rules, algorithm provide an operator with a method for grading the outcome for determining if the Weights and Biases Sample Size is large enough to provide an accurate representation of the total population of images for the Client Location in the Augmented Images Docu-Vault and determining if a Weights and Biases Sample Size Score is acceptable. An operator uses a value of 10, but not limited to 10 to indicate a score which is acceptable. An operator uses a value of 1, but not limited to 1 to indicate a score which is not adequate. An operator updates the Augmented Images Docu-Vault with a grade for the outcome for determining if the Weights and Biases Sample Size is large enough to provide an accurate representation of the total population of images for the Client Location in the Augmented Images Docu-Vault.

An operator updates the Client Request Form (FIGS. 6A-6F) with the rubric score and certifies the score.

If the sample size, in the Weights and Biases Docu-Vault is NOT adequate, an operator returns to process 1201. If the if the sample size, in the Weights and Biases Docu-Vault is adequate, an operator exits process 1200. An operator time stamps the Client Request Form (FIGS. 6A-6F), with the date and time when an operator exits process 1200.

Process 1300 to Determine the Number of Epochs in EC-OD

See FIG. 18. Each process is shown generally in FIG. 18 and described in greater detail herein with reference to the process number. The processes include but are not limited to the following. A process to calculate the precision and recall metrics in EC-OD, (1301). A process to calculate the area under the precision-recall curve in EC-OD, (1303). A process to measure the average precision in EC-OD, (1305). A process to determine if the average precision is adequate in EC-OD, (1307).

Process 1301 to Calculate the Precision and Recall Metrics in EC-OD

An operator requests EC-OD to calculate the precision and recall metrics.

An operator time stamps the Client Request Form (FIGS. 6A-6F), with the date and time when the precision and recall metrics were calculated for EC-OD.

Process 1303 to Calculate the Area Under the Precision-Recall Curve in EC-OD An operator request EC-OD to calculate the area under the precision-recall curve.

An operator time stamps the Client Request Form (FIGS. 6A-6F), with the date and time when the area under the precision-recall curve was calculated for EC-OD.

Process 1305 to Measure the Average Precision in EC-OD

An operator requests EC-OD to measure the average precision.

An operator time stamps the Client Request Form (FIGS. 6A-6F), with the date and time when the average precision was calculated for EC-OD.

Process 1307 to Determine if the Average Precision is Adequate in EC-OD

An operator receives Client Request Form (FIGS. 6A-6F) with the date and time when the average precision was measured for EC-OD.

An operator establishes an Average Precision is Adequate in EC-OD Rubric, rules, and algorithm for determining if the Average Precision is adequate in EC-OD. An operator updates the Augmented Images Data-Vault with an Average Precision is Adequate in EC-OD Score. The rubric may be metric, digital, subjective or any combination. The rubric, rules, algorithm provide an operator with a method for grading the outcome for determining if the Average Precision is Adequate in EC-OD. and determining if an Average Precision is adequate in EC-OD Score is acceptable. An operator uses a value of 10, but not limited to 10 to indicate a score which is acceptable. An operator uses a value of 1, but not limited to 1 to indicate a score which is not adequate. An operator updates the Augmented Images Data-Vault with a grade for the outcome for determining if the Average Precision is adequate in EC-OD. An operator updates the Client Request Form (FIGS. 6A-6F) with the rubric score and certifies the score.

If the average precision scores are not adequate an operator uses EC-OD again perform the process to calculate mAP (mean average precision) and stop Epochs in EC-OD. An operator initiates another Epoch.

If the weight scores are not adequate an operator time stamps the Client Request Form (FIGS. 6A-6F), with the date and time when the average precision score is not adequate in EC-OD, repeating the above steps until all of the plurality of images have been reviewed, and another Epoch was initiated. An operator uses an EarthCam proprietary EC-SADN instruction set and an EarthCam proprietary procedure to ensure images from the start date and time of the Docu-Narrative to the end date and time of the Do have not been altered, concealed, falsified, or destroyed and authenticates the total number of images from the start date and time of the Docu-Narrative to the end date and time of the Docu-Narrative.

Operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification using a probative Image Chain of Custody Two Level Certification Form (FIGS. 6A-6F, processes 1800-1809).

Operator certifies the total number of images with an image creation date between the start date and time of the Docu-Narrative and the end date and time of the Docu-Narrative using a probative Image Chain of Custody Two Level Certification Form (FIGS. 6A-6F, processes 1800-1811).

Operator creates a two-level certification that the images for the Client Location with an image creation date between Docu-Narrative start date and time and the Docu-Narrative end date and time are complete, there are no missing images, no images were destroyed, no image was tampered, and there were sufficient images to create an accurate Docu-Narrative using a probative Image Chain of Custody Two Level Certification Form (FIGS. 6A-6F, processes 1800-1813). If the weight scores are adequate an operator time stamps the Client Request Form (FIGS. 6A-6F), with the date and time when the average precision score is adequate in EC-OD and the Epoch was stopped.

If the EC-OD Epoch is stopped, the Docu-Narrative is completed, and all checkpoints on the Image Chain of Custody Log section of the Client Request Form are authenticated, an operator time stamps and authenticates the Image Chain of Custody Log.

Process 1815 Docu-Narrative Completed and Delivered to Client

Operator notifies Client that the Docu-Narrative between Docu-Narrative start date and time and the Docu-Narrative end date and time is complete.

Operator secures the Docu-Narrative using password protection with two-step, multi-factor authentication to open and view the Docu-Narrative. Operator provides the Client with the Docu-Narrative password. Docu-Narrative is encrypted using AES-256 compliant encryption using cryptographic keys. Operator transmits the completed Docu-Narrative to the Client. Operator authenticates and certifies the Docu-Narrative is complete by providing a two-level certification using a probative Image Chain of Custody Two Level Certification Form (see FIGS. 26A-26F and processes 1800-1815).

Operator delivers the Docu-Narrative to the Client using, but not limited to using, a secure communication channel or portable secure external data storage device. A secure communication channel uses a security standard, but is not limited to using, transport layer security standard. A security standard is also used with, but not limited to being used with, a symmetric-key technique requiring the use of, but not limited to the use of, Advanced Encryption Standard 256. A portable secure external storage device uses, but is not limited to using, a dual level password access security technique.

Client acknowledges receipt of the Docu-Narrative and confirms ability to access and view the Docu-Narrative. Operator authenticates and certifies the Client received the Docu-Narrative and was able to access and view the Docu-Narrative is by providing a two-level certification using a probative Image Chain of Custody Two Level Certification Form (see FIGS. 26A-26F and processes 1800-1815).

Resolution and Focus Device

See FIGS. 19, 20, and 21. Each element is shown generally in one or more of FIG. 19, 20, or 21 and described in greater detail herein with reference to the component number. The components include but are not limited to: A wall-size resolution and focus device to set the benchmark resolution for the camera used at a remote location. Such wall-size resolution and focus device is appropriate to the ground truth average body size of vehicles generally found at construction and civil engineering sites. Such resolution and focus device is used to create the Benchmark Image for a Client Location. The resolution and focus device also provides metrics to judge the resolution of images taken at a Client Location. Such device is used to determine the optimum hardware configuration for a Docu-Narrative before the Docu-Narrative is produced.

Resolution chart (41), is, but not limited to, approximately eight feet high and twenty-eight feet wide. Completely Illuminated by continuous, registered-frequency lighting (47). Camera (45) and camera lens (59) are positioned on table (46) at an established, precise distance from resolution chart (41). The camera and camera lens (59) are held in place by bracket clamp (58). Such bracket clamp is affixed to table (46). Such table and bracket clamp are an established precise distance from resolution chart (41). The height of Table (46) is level with the horizontal center of the resolution chart (41).

A laser pointer and measuring device (43) points to the horizontal and vertical center of resolution chart (41). Left vertical laser pointer and measuring device (42) and right vertical laser pointer and measuring device (44) align the bracket clamp (58) to the vertical center of the from resolution chart (41).

Included in the resolution chart (41) is, but not limited to, a black background grid. The foreground of the resolution chart (41) includes, but is not limited to, the following precision charts and forms: a plurality of human head profile black line drawing with multiple registered grey tone areas (58); a plurality of blue scale charts (56); a plurality of white scale charts (57); a plurality of three channel color charts (52); a plurality of four channel color charts (53), a plurality of five channel color charts (54); a plurality of black on white, high resolution line drawing shapes.

Processes 1600, 1700, and 1800 to Provide a Probative Image Chain of Custody with a Two-Level Certification A probative image chain of custody process ensures an evidentiary testimonial of the events that occurred at a client location, during a specific period of time, from images taken of the client location. A probative image chain of custody process also presents the reality of what happened at the location as a series of images. A probative image chain of custody ensures images included in the Docu-Narrative are relevant, accurate, and have sufficient weight (a measure of the credibility of the image and the image components) to be admitted into the Docu-Narrative. It documents, but is not limited to, the acquisition, custody, control, transfer, analysis, and disposition, of the images in a Docu-Narrative. It also includes methods to protect the forensic integrity of the images, such as authentication techniques to determine whether an image has been altered, concealed, falsified, or destroyed with the intent to interfere with the integrity of an image chain of custody.

A probative image chain of custody process ensures, but is not limited to, an accurate, definitive, and reliable, visual, evidentiary documentary narrative testimonial of the events. Such narrative documentary of events which occur at, not limited to, a construction site, civil engineering site, commercial site, or large client location during a specific period of time aids the safety and wellbeing of stakeholders at, but not limited to construction site, civil engineering site, commercial site, or large client location. It also provides a cost-effective tool for mitigating construction site theft and construction errors at such sites.

A probative image chain of custody process ensures a Docu-Narrative of events occurring at a site verifies compliance with government agency construction requirements and can be used as evidence in litigation.

A probative image chain of custody process provides a method for an operator, custodian of an image Docu-Vault can audit and certify that the images included in a Docu-Narrative are associated with the client location and were created within the Docu-Narrative start date and time and the Docu-Narrative end date and time. An operator, custodian of an image Docu-Vault can audit and certify the total number of images for an image chain of custody.

A probative image chain of custody process provides a method for an operator, custodian to authenticate the images are complete, there are no missing images, no images were destroyed, no image was tampered, and there were sufficient images to create an accurate and reliable Docu-Narrative.

Image Chain of Custody Log

An operator authenticates the Image Chain of Custody Log section of the Client Request Form (FIGS. 6A-6F). The authentication is provided through an interaction between an operator and an EarthCam proprietary system, protocol and instruction set. The authentication process validates and provides high confidence in an operator's identity. An operator authenticates the date and time for each Image Chain of Custody Log checkpoint entry. Each Image Chain of Custody Log checkpoint is authenticated. At the end of the Docu-Narrative process, an operator authenticates all Image Chain of Custody Log checkpoints have been authenticated. Authenticating each checkpoint in the Image Chain of Custody Log ensures an a forensic capable and evidentiary Docu-Narrative. The Image Chain of Custody Log section of the Client Request Form (FIGS. 6A-6F) includes, but is not limited to, the following Image Chain of Custody Log Checkpoints.

The nomenclature used for the process numbers in Table 1 below is: xxx-yyy, where xxx is the primary process number and yyy is the secondary process number. For example, in FIG. 5, primary process 100 includes a secondary process 101.

TABLE 1

| Image Chain of Custody Log Checkpoint | Process # |
|---|---|
| Selected Docu-Vault Candidates have been selected and the selection process is completed. | 100-101 |
| Docu-Vault Performance Tests on the Selected Docu-Vault Candidates have been completed. | 100-103 |
| Docu-Vault Security Assessment Score on the Selected Docu-Vault Candidates have been completed. | 100-105 |
| Libraires in the Accepted EC-F Docu-Vaults have been input to EC-F. | 100-115 |
| Hardware Specifications for the hardware associated with the Client project have been input to the Hardware Specifications Docu-Vault. | 200-201 |
| Hardware Characteristics, for the hardware associated with the Client project, have been input to the Hardware Characteristics Docu-Vault. | 200-207 |
| Hardware Test Case Form was uploaded to the Hardware Settings Docu-Vault. | 200-211 |
| A test run priority number assigned to the Hardware Test Case Forms to indicate the sequence in which the Hardware Test Cases will be used with a Docu-Vault. | 200-213 |
| The Hardware Test Case and Identification Number used for the Hardware Settings for EC-F. | 200-215 |
| The Hardware Settings Form was uploaded to the Hardware Settings Docu-Vault. | 200-217 |
| The hardware settings from the Hardware Settings Form were entered into the EC-F hardware settings form | 200-221 |
| The 'N' Tensor value for the EC-F tensor settings. | 300-301 |
| The number of color channels were entered into the EC-F Tensor settings form. | 300-303 |
| The number of pixels were entered into height and width values in the EC-F Tensor settings form. | 300-305 |
| The acceptable images were copied to the Images for Input to EC-F Docu-Vault. | 400-401 |
| The NOT acceptable images were copied to the Images NOT Input to EC-F Docu-Vault. | 400-403 |
| The NOT acceptable images were input to EC-F for image detection. | 400-407 |
| The Ground Truth Images were uploaded to the Ground Truth Images Docu-Vault. | 400-415 |
| The Ground Truth Images were compared to the Detection Images and the appropriate EC-F training procedure was applied to the image. | 400-413 |
| Another EC-F Epoch was initiated | 400-421 |
| The EC-F Epoch is stopped. | 400-421 |
| The prediction score from EC-F. | 500-501 |
| The EC-F prediction scores be converted to EC-F Class Labels. | 500-503 |
| The confusion matrix for the TN, FN, TP, FP values. | 500-505 |

TABLE 1-continued

| Image Chain of Custody Log Checkpoint | Process # |
|---|---|
| The precision and recall metrics were calculated. | 500-507 |
| The area under the precision-recall curve was calculated. | 500-509 |
| The average precision score is not adequate, and EC-F another Epoch was initiated. | 500-513 |
| The average precision score is adequate, and EC-F the Epoch was stopped. | 500-513 |
| The augmentation criteria and rubric were uploaded to the Augmentation Criteria Docu-Vault. | 600-600 |
| The Detection Images and Augmentation Criteria were copied to the Augmented Images Docu-Vault. | 600-605 |
| The blurred image of the target object image was created, and the blurred image was uploaded to the Augmented Images Docu-Vault. | 600-607 |
| The blurred image was associated with the Target object image in the Augmented Images Docu-Vault (623). | 600-609 |
| The image with noise of the target object image was created, and the image with noise was uploaded to the Augmented Images Docu-Vault. | 600-611 |
| When the image with contrast was associated with the Target object image in the Augmented Images Docu-Vault (623). | 600-613 |
| When an image with a change in contrast of the target object image was created, and the image with a change in contrast was uploaded to the Augmented Images Docu-Vault. | 600-615 |
| When the image with the change in contrast was associated with the Target object image in the Augmented Images Docu-Vault (623) | 600-617 |
| When an image with a change in saturation of the target object image was created, and the image with a change in saturation was uploaded to the Augmented Images Docu-Vault. | 600-619 |
| When the image with the change in saturation was associated with the Target object image in the Augmented Images Docu-Vault (623). | 600-621 |
| When an image with a flip of the target object image was created, and the image with a change in contract was uploaded to the Augmented Images Docu-Vault. | 600-625 |
| When the image with a flip was associated with the Target object image in the Augmented Images Docu-Vault (623). | 600-627 |
| When the mirror image of the target object image was created, and the mirror image was uploaded to the Augmented Images Docu-Vault. | 600-631 |
| When the normalization criteria were uploaded to the Normalization Criteria Docu-Vault. | 700-701 |
| When the parent and child records were uploaded to the Normalized Test Batch Docu-Vault. | 700-703 |
| When the parent and child records were restructured and indexed to meet the Normalization Criteria and were uploaded to the Normalized Test Batch Docu-Vault. | 700-705 |
| When amount of time to run the parent and child records from the Normalized Test Batch Docu-Vault (713) in EC-IC is adequate and meets the Normalization Criteria an operator stops the batch size normalization process. | 700-707 |
| When the Residual Layers Accuracy Score is adequate, in the Residual Layers Accuracy Docu-Vault (713). | 800-801 |
| When the parent and child record images meet the requirements of the Residual Layers Criteria for the parent and child records associated with the Client location, an operator begins the process or optimizing images for EC-OD. | 800-803 |
| When the EC-OD Specifications were uploaded to the EC-OD Specifications Docu-Vault (907) for the Client Location. | 900-901 |
| When the EC-OD Setup Acceptance Criteria Score for the acceptable throughput rate, and image accuracy and image performance was uploaded to the EC-OD Setup Acceptance Criteria Docu-Vault (909). | 900-905 |
| When the Filter and Filter Specifications record was uploaded to the EC-OD Filters Docu-Vault (1101). | 1000-1001 |
| When the EC-OD Filter Criteria Record was uploaded to the EC-OD Docu-Vault (1009). | 1000-1003 |
| When parent and child image records with the selected EC-OD Filter were uploaded to the Augmented Images Docu-Vault (623). | 1000-1005 |
| When an operator exits process 1000 and initiates process 1100. | 1000-1007 |
| When the Graphic Processing Unit Specifications are uploaded to the GPU Specifications Docu-Vault (1113) | 1100-1101 |
| When the Graphic Processing Unit Characteristics are uploaded to the GPU Characteristics Docu-Vault (1115) | 1100-1101 |
| When the GPU Image Resolution Score for the parent and child records are uploaded to the Augmented Records Docu-Vault (623). | 1100-1103 |
| When GPU Image Inference Score for the parent and child records are uploaded to the Augmented Records Docu-Vault (623). | 1100-1105 |
| When parent and child image GPU Image Accuracy Score to the parent and child records from the Augmented Records Docu-Vault (623). | 1100-1107 |
| When the parent and child image GPU Characteristic Criteria Score is uploaded to the parent and child records in the Augmented Records Docu-Vault (623) | 1100-1109 |
| When an operator exits process 1100 and initiates process 1200. | 1100-1111 |
| When the parent and child records are uploaded to the Weights and Biases Docu-Vault (1207). | 1200-1201 |
| When an operator exits process 1203. | 1200-1203 |
| When an operator exits process 1200. | 1200-1205 |

TABLE 1-continued

| Image Chain of Custody Log Checkpoint | Process # |
|---|---|
| When the precision and recall metrics were calculated for EC-OD. | 1300-1301 |
| When the average precision is calculated for EC-OD. | 1300-1305 |
| When the average precision score is not adequate in EC-OD and another Epoch was initiated. | 1300-1307 |
| When the average precision score is adequate in EC-OD and the Epoch was stopped. | 1300-1307 |

Two-Level Certification

Two operators authenticate the Image Chain of Custody Two Level Certification Form (FIGS. 26A-26F). The authentication occurs when an operator updates the Image Chain of Custody Two-Level Certification Form with the operator's identification number. The authentication process validates and provides high confidence in an operator's identity. A two-level authentication requires two different operators authenticating an Image Chain of Custody Log Checkpoint. One of the operators may be employed at a more senior management position than the other.

At each of the following processes, an operator reviews data about the image, taken by the camera. The data generated by the camera includes, but is not limited to and may not include, the image settings, including aperture, resolution, focal length, shutter speed, ISO speed, camera brand and model, date and time when the image was created, and the GPS location where the image was created.

At process 101 (FIG. 5), a process to Select Docu-Vaults [Images from the Docu-Vaults], an operator creates a probative Image Chain of Custody Two Level Certification Form (FIGS. 6A-6F). An Operator confirms the Docu-Narrative start and end date and time; confirms the Client identification, confirms the Client Location; confirms the camera location and identification (1600-1601).

An operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification using a probative Image Chain of Custody Two Level Certification Form (FIGS. 26A-26F) in process 1600-1603.

An operator certifies the total number of images, from a Client Location, with an image creation date between the start date and time of the Docu-Narrative and the end date and time of the Docu-Narrative to establish the total number of images for the image chain of custody using a probative Image Chain of Custody Two Level Certification Form (see FIGS. 26A-26F and processes 1600-1605).

An operator creates a two-level certification that the images in the Accepted EC-F Docu-Vault for the Client Location with an image creation date between Docu-Narrative start date and time and the Docu-Narrative end date and time are complete, there are no missing images, no images were destroyed, no image was tampered, and there were sufficient images to create an accurate Docu-Narrative using a probative Image Chain of Custody Two Level Certification Form (see FIGS. 26A-26F and processes 1600-1605).

An operator logs and certifies the selected Docu-Vault images that are associated with the Client Location with an image creation date between Docu-Narrative start date and time and the Docu-Narrative end date and time using a probative Image Chain of Custody Two Level Certification Form (see FIGS. 26A-26F and processes 1600-16070).

At process 401 (FIG. 9), a process to select images for input into EC-F, an operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification using a probative Image Chain of Custody Two Level Certification Form (see FIGS. 26A-26F and processes 1600-1609).

An operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification using a probative Image Chain of Custody Two Level Certification Form (see FIGS. 26A-26F and processes 1600-1611).

An operator certifies the total number of images, from a Client Location, with date between the start date and the end date of the Docu-Narrative using a probative Image Chain of Custody Two Level Certification Form (see FIGS. 26A-26F and processes 1600-1613).

An operator certifies, with a two-level certification, the resolution of the images in Docu-Narrative from the start date and time and the Docu-Narrative end date and time is equivalent to the benchmark resolution from the Hardware Settings Docu-Vault (219) in FIG. 7, using a probative Image Chain of Custody Two Level Certification Form (see FIGS. 26A-26F and processes 1600-1615).

At process 413, a process to compare detection images with Ground Truth Images, an operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification using a probative Image Chain of Custody Two Level Certification Form (see FIGS. 26A-26F and processes 1600-1617).

An operator certifies, with a two-level certification, the resolution and bounded boundaries of the images in Detection Images Docu-Vault (425) for the Docu-Narrative from the start date and time and the Docu-Narrative end date and time are equivalent to the resolution and bounded boundaries in the Ground Truth Images located in the Ground Truth Docu-Vault (417) using a probative Image Chain of Custody Two Level Certification Form (see FIGS. 26A-26F and processes 1600-1619).

Process 513 of FIG. 10 determines if the average precision is adequate in EC-F, an operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification using a probative Image Chain of Custody Two Level Certification Form (see FIGS. 26A-26F and processes 1600-1621).

An operator creates a two-level certification that the images for the Client Location with an image creation date between Docu-Narrative start date and time and the Docu-Narrative end date and time are complete, there are no missing images, no images were destroyed, no image was tampered, and there were sufficient images to create an accurate Docu-Narrative using a probative Image Chain of Custody Two Level Certification Form (see FIGS. 26A-26F and processes 1600-1623).

An operator certifies the total number of images with an image creation date between the start date and time of the Docu-Narrative and the end date and time of the Docu-Narrative using a probative Image Chain of Custody Two Level Certification Form (see FIGS. 26A-26F and processes 1600-1623).

At process 601 (FIG. 11), a process to create criteria for augmenting images, an operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification using a probative Image Chain of Custody Two Level Certification Form (see FIGS. 26A-26F and processes 1600-1623).

An operator certifies the total number of images with an image creation date between the start date and time of the Docu-Narrative and the end date and time of the Docu-Narrative using a probative Image Chain of Custody Two Level Certification Form (see FIGS. 26A-26F and processes 1700-1704).

An operator produces a two-level certification identifying the filters used and the images in the Accepted EC-F Docu-Vault on which the filters were applied using a probative Image Chain of Custody Two Level Certification Form (see FIGS. 26A-26F and processes 1700-1705).

At process 605 (see FIG. 11), a process to evaluate images for augmenting, an operator authenticates and certifies the image chain of custody for the images, from a client location, with an image creation date between the start date and time of the Docu-Narrative and the end date and time of the Docu-Narrative. An operator authenticates and certifies that the images have not been altered, concealed, falsified, or destroyed by providing a two-level certification using a probative Image Chain of Custody Two Level Certification Form (see FIGS. 26A-26F and processes 1700-1707).

An operator produces a two-level certification identifying the augmentation images used, and the parent Detection Image which required the augmentation and the child image on which the augmentation images were applied using a probative Image Chain of Custody Two Level Certification Form (see FIGS. 26A-26F and processes 1700-1709).

An operator produces a two-level certification identifying the child images created for each parent image and the family identification number used using a probative Image Chain of Custody Two Level Certification Form (See FIGS. 26A-26F and processes 1700-1711).

An operator certifies the total number of images with an image creation date between the start date and time of the Docu-Narrative and the end date and time of the Docu-Narrative using a probative Image Chain of Custody Two Level Certification Form (see FIGS. 26A-26F and processes 1700-1713).

An operator creates a two-level certification that the images for the Client Location with an image creation date between Docu-Narrative start date and time and the Docu-Narrative end date and time are complete, there are no missing images, no images were destroyed, no image was tampered, and there were sufficient images to create an accurate Docu-Narrative using a probative Image Chain of Custody Two Level Certification Form (see FIGS. 26A-26F and processes 1700-1715).

At process 803 in FIG. 13, a process to observe images for accuracy, an operator certifies the total number of images with an image creation date between the start date and time of the Docu-Narrative and the end date and time of the Docu-Narrative using a probative Image Chain of Custody Two Level Certification Form (see FIGS. 26A-26F and processes 1700-1717).

An operator creates a two-level certification that the images for the Client Location with an image creation date between Docu-Narrative start date and time and the Docu-Narrative end date and time are complete, there are no missing images, no images were destroyed, no image was tampered, and there were sufficient images to create an accurate Docu-Narrative using a probative Image Chain of Custody Two Level Certification Form (see FIGS. 26A-26F and processes 1700-1719).

At process 901 (FIG. 14), a process to acquire EC-OD specifications, an operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification using a probative Image Chain of Custody Two Level Certification Form (see FIGS. 26A-26F and processes 1800-1801).

An operator certifies the total number of images with an image creation date between the start date and time of the Docu-Narrative and the end date and time of the Docu-Narrative using a probative Image Chain of Custody Two Level Certification Form (see FIGS. 26A-26F and processes 1800-1803).

An operator creates a two-level certification that the images for the Client Location with an image creation date between Docu-Narrative start date and time and the Docu-Narrative end date and time are complete, there are no missing images, no images were destroyed, no image was tampered, and there were sufficient images to create an accurate Docu-Narrative using a probative Image Chain of Custody Two Level Certification Form (see FIGS. 26A-26F and processes 1800-1805).

At process 905 (FIG. 14), a process to test if EC-OD setup criteria scores are acceptable, Operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification using a probative Image Chain of Custody Two Level Certification Form (see FIGS. 26A-26F and processes 1800-1807).

At process 1307 (FIG. 18), a process to determine if the average precision is adequate in EC-OD, an operator authenticates and certifies the image chain of custody for the images, from a client location, with an image creation date between the start date and time of the Docu-Narrative and the end date and time of the Docu-Narrative. Operator authenticates and certifies the images have not been altered, concealed, falsified, or destroyed by providing a two-level certification using a probative Image Chain of Custody Two Level Certification Form (see FIGS. 26A-26F and processes 1800-1809).

Operator certifies the total number of images with an image creation date between the start date and time of the Docu-Narrative and the end date and time of the Docu-Narrative using a probative Image Chain of Custody Two Level Certification Form (see FIG. 26A-26F and processes 1800-1811).

Operator creates a two-level certification that the images for the Client Location with an image creation date between Docu-Narrative start date and time and the Docu-Narrative end date and time are complete, there are no missing images, no images were destroyed, no image was tampered, and there were sufficient images to create an accurate Docu-Narrative using a probative Image Chain of Custody Two Level Certification Form (see FIGS. 26A-26F and processes 1800-1813).

At process 1815 Operator authenticates and certifies the Docu-Narrative is complete by providing a two-level certification using a probative Image Chain of Custody Two Level Certification Form (see FIGS. 26A-26F and processes 1800-1815).

At process 1815 Operator authenticates and certifies the Client received the Docu-Narrative and was able to access and view the Docu-Narrative is by providing a two-level certification using a probative Image Chain of Custody Two Level Certification Form (see FIGS. 26A-26F and processes 1800-1815).

We claim:

1. A method for producing a visual record of events that occur at a location, the method comprising:
   determining a time duration to be covered by the visual record;
   determining a number of images to be included in the visual record to satisfy the time duration;
   determining a hardware configuration for an image acquisition device;
   implementing the hardware configuration on the image acquisition device;
   identifying a benchmark resolution and focus to be used for one or more images in the visual record;
   employing authentication, certification or verification procedures to establish and maintain an evidentiary chain of custody for the visual record;
   authenticating, certifying, or verifying that one or more images within the visual record have not been altered, concealed, falsified, or destroyed;
   selecting a sample image from the visual record;
   determining a quality of the sample image based on one or more of a mean average precision score of the sample image, orientation of the sample image, and an aspect ratio of the sample image, wherein the mean average precision score is indicative of differences between an image of an object and an image of a ground truth object;
   creating a base model comprising one or more characteristics of a graphics processing unit, the characteristics comprising image resolution, speed of inference or processing of each image within the visual record, and accuracy of the images, wherein accuracy is indicative of differences between an image of an object and an image of the ground truth object;
   modifying characteristics of an image such that an image in the visual record appears substantially consistent with a previous and a next image within the visual record;
   identifying a target object within the visual record;
   creating a target object model for use in identifying the target object within an image, wherein the target model comprises characteristics of the target object;
   developing target object detection specifications;
   determining whether use of the target object detection specifications to detect target objects within an image yields an acceptable detection score based on a predetermined rubric; and
   determining whether a predetermined percentage of target objects in the plurality of images have been correctly identified.

2. The method of claim 1, wherein the images comprise still images and moving visual images.

3. The method of claim 1, further comprising detecting and correcting a blurred image of a target object.

4. The method of claim 1, further comprising selecting images from the visual record, acquiring ground truth images of objects within the visual record, comparing selected images with ground truth images.

5. The method of claim 1, further comprising rebuilding images within the visual record in which a representation of a target object within an image does not accurately represent a ground truth of the target object.

6. The method of claim 1, further comprising providing documentation associated with each image in the visual record, wherein the documentation comprises information related to one or more of acquisition, custody, control, modifications, transfer, analysis, and disposition of each image, and a user's identification information, comprising the user's name, date and time of entry of the image into the visual record.

7. The method of claim 1, further comprising identifying a filter having filter characteristics to remove objects distorting an image and applying the filter to one or more images in the visual record, wherein the objects distorting an image comprise image anomalies, environmental conditions, and bounded box object images.

8. The method of claim 1, further comprising identifying each image within the visual record with a unique identification reference.

9. The method of claim 1, further comprising applying a predetermined process rubric to one or more processes of the method, wherein the process rubric provides a process metric of the process, and wherein an image is included in the visual record responsive to the process metric.

10. The method of claim 1, further comprising applying a predetermined documentation rubric to visual record documentation, the documentation rubric including information related to forensic integrity and image chain of custody of the visual record, wherein the documentation rubric generates a documentation metric of the visual record documentation, and wherein visual record documentation is included in the visual record responsive to the documentation metric.

11. The method of claim 1, wherein a forensic integrity of the visual record is validated by authenticating a chain of custody of one or more process steps within the method.

12. The method of claim 1, further comprising determining a sample size for the visual record based on client requirements related to the visual record and image accuracy.

13. The method of claim 1, further comprising tracking or accounting for images in the visual record, based on parent-child and child-parent associations, wherein a child image is an augmented or modified version of a parent image and the relationship between a parent image and a child image is maintained throughout a process of processing the visual record.

14. The method of claim 1, further comprising selecting acceptable images from among the images in the visual record, wherein the acceptable images satisfy a predetermined requirement.

15. The method of claim 1, further comprising creating and optimizing a number of residual layers in the images of the visual record, wherein the residual layers represent an index related to differences between an image of an object before and after modification of the image.

16. The method of claim 1, further comprising determining that a resolution of an image in the visual record is equivalent to the resolution of a benchmark image.

17. The method of claim 1, further comprising improving an accuracy of an image by including an entirety of an object in the image.

18. The method of claim 1, wherein a bounding box of an object includes an entirety of the object, and wherein the bounding box comprises coordinates of a border that encloses the image.

19. The method of claim 1, further comprising modifying one or both of a parent image and an associated child image such that a parent image and a child image appear visually consistent.

20. The method of claim 1, further comprising determining a criterion for modifying one or more images in the plurality of images so that the images are visually consistent and modifying one or more images in the visual record according to a determined criterion.

21. The method of claim 1, further comprising identifying and recording augmentation processes applied to an image in the visual record.

22. The method of claim 1, further comprising augmenting one or more images to produce a smooth transition between images so that an image appears consistent with a previous image and with a subsequent image.

23. The method of claim 22, wherein augmenting an image comprises resizing an image.

24. The method of claim 1, wherein the location comprises a construction site, a civil engineering site, or a commercial site, and the event activities of workers, vehicles, and construction vehicles at the site.

25. The method of claim 1, further comprising using a concordance-based query system and process to identify an object based on a boundary box associated with the image of the object.

26. The method of claim 1, further comprising identifying and defining a boundary box for use in identifying an artifact object in an image, wherein the boundary box includes an entirety of the object.

27. The method of claim 1, further comprising comparing a blurred image of a target object in a current image with an image of the target object in a previous image or with an image of the target object in a subsequent image and correcting the blurred image of the target object in the current image based on results of comparing.

28. The method of claim 1, further comprising determining whether a blurred image of the target object is caused by an inertial movement of a camera or by movement of the target object.

29. The method of claim 1, further comprising generating a blurred image of a target object wherein the blurred image is used to identify the target object using a library of blurred images of a plurality of different target objects.

30. The method of claim 1, further comprising making measurements of a three-dimensional ground truth target object, determining coordinates of the ground truth target object, quantifying one or more of a distance, height, area, and volume of the ground truth target object, and generating a digital orthophotograph of the ground truth target object, wherein the digital orthophotograph is an image that has been geometrically corrected or ortho rectified to create an image that is uniform from edge to edge.

31. The method of claim 1, wherein the rubric comprises rules and algorithms related to one or more of performance tests, optimum tensor size for an image, image weight scores, an image mean average precision for each image within the plurality of images, determining whether another epoch is required, augmenting images, normalizing images, determining an image batch size, optimizing residual layers in an image, modifying image properties so that an image appears consistent with a previous image and with a next image, identifying and detecting objects within an image, determining sufficiency of a security assessment and a hardware assessment, determining optimum image pixel width and height, determining acceptable images from among the plurality of images, determining an image weight and an average image precision score (mAP), determining a number of epochs based on an average precision score, initiating an epoch when an image weight score is below a predetermined number, determining whether an image within the visual record has passed a performance test, and optimizing residual layers in one or more of the plurality of images, criteria for filter use, acceptable throughput rate, speed of inference, GPU characteristics, and accurate image representation.

32. The method of claim 1, further comprising adding residual layers to an image and thereby rendering objects within the image more recognizable.

33. The method of claim 1, further comprising producing a benchmark image based on the benchmark resolution and focus, wherein the benchmark image defines a standard that is used for determining or controlling one or more of lighting, contrast, number of color channels, bias, noise, pixel size and resolution.

34. The method of claim 1, wherein the benchmark resolution and focus is derived from a resolution and focus chart that is appropriate for a ground truth average vehicle body size for vehicles generally found at the location, wherein the resolution and focus chart has dimensions of greater than six feet tall by twenty feet wide, wherein the resolution and focus chart provides metrics from which to determine a resolution of images within the plurality of images.

35. The method of claim 1, wherein modifying one or more images comprises filtering, normalizing, or augmenting the one or more images.

36. The method of claim 1, further comprising developing one or more rubrics related to one or more of augmenting images, normalizing a test batch related to an average image processing time, normalizing a test batch related to runtime, a throughput rate, filter use criteria, file augmentation performance, image resolution, image inference, and image accuracy.

* * * * *